United States Patent
Scott et al.

(10) Patent No.: US 7,177,610 B2
(45) Date of Patent: Feb. 13, 2007

(54) CALIBRATED LOW-NOISE CURRENT AND VOLTAGE REFERENCES AND ASSOCIATED METHODS

(75) Inventors: Jeffrey W. Scott, Austin, TX (US); G. Diwakar Vishakhadatta, Austin, TX (US); Donald A. Kerth, Austin, TX (US); Richard T. Behrens, Lafayette, CO (US); G. Tyson Tuttle, Austin, TX (US); Vishnu S. Srinivasan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 647 days.

(21) Appl. No.: 10/081,121

(22) Filed: Feb. 22, 2002

(65) Prior Publication Data

US 2002/0168942 A1 Nov. 14, 2002

Related U.S. Application Data

(63) Continuation-in-part of application No. 09/821,342, filed on Mar. 29, 2001.

(60) Provisional application No. 60/337,225, filed on Dec. 4, 2001, provisional application No. 60/273,119, filed on Mar. 2, 2001, provisional application No. 60/261,506, filed on Jan. 12, 2001.

(51) Int. Cl.
*H04B 1/06* (2006.01)
*H04B 7/00* (2006.01)

(52) U.S. Cl. .................... 455/259; 455/245.1; 455/254; 455/232.1; 455/234.2; 327/539; 327/540; 323/315; 341/120; 341/121

(58) Field of Classification Search ......... 455/197.1–3, 455/194.2, 195.1, 245.1–2, 251.1–2, 254–264, 455/323, 333, 198.1, 118, 127.1–3, 232.1, 455/233.1, 234.1–2, 246.1; 327/538–543; 323/315–316; 341/120–121
See application file for complete search history.

(56) References Cited

U.S. PATENT DOCUMENTS 3,957,037 A * 5/1976 Fletcher et al. ............. 300/384

(Continued)

FOREIGN PATENT DOCUMENTS

EP 0643477 A2 3/1995

(Continued)

OTHER PUBLICATIONS

Stephen Jantzi et al., "Quadrature Bandpass ΔΣ Modulation for Digital Radio," IEEE Journal of Solid-State Circuits, vol. 32, No. 12, Dec. 1997, pp. 1935-1950.

(Continued)

*Primary Examiner*—Matthew Anderson
*Assistant Examiner*—Tuan Tran
(74) *Attorney, Agent, or Firm*—Law Offices Maximilian R. Peterson

(57) ABSTRACT

A low-noise current reference circuitry includes a voltage source, a current source, and a controller. The voltage source generates a reference voltage. The current source provides a low-noise output current in response to a control signal. The controller provides the control signal based at least in part on the relative magnitudes of the reference voltage and a voltage derived from the output current. A low-noise voltage reference circuitry includes a reference voltage source, a voltage source, and a controller. The reference voltage source generates a reference voltage. The voltage source provides a low-noise output voltage in response to a control signal. The controller provides the control signal based at least in part on the relative magnitudes of the output voltage and the reference voltage.

25 Claims, 28 Drawing Sheets

U.S. PATENT DOCUMENTS

| | | | |
|---|---|---|---|
| 4,070,632 A | 1/1978 | Tuttle | |
| 4,236,252 A | 11/1980 | Kominami et al. | |
| 4,468,790 A | 8/1984 | Hofelt | |
| 4,562,591 A | 12/1985 | Stikvoort | |
| 4,584,659 A | 4/1986 | Stikvoort | |
| 4,604,720 A | 8/1986 | Stikvoort | |
| 4,623,926 A | 11/1986 | Sakamoto | |
| 4,627,021 A | 12/1986 | Persoon et al. | |
| 4,680,588 A | 7/1987 | Cantwell | |
| 4,692,737 A | 9/1987 | Stikvoort et al. | |
| 4,713,563 A | 12/1987 | Marshall et al. | |
| 4,797,845 A | 1/1989 | Stikvoort | |
| 4,857,928 A | 8/1989 | Gailus et al. | |
| 4,912,729 A | 3/1990 | Van Rens et al. | |
| 4,989,074 A | 1/1991 | Matsumoto | |
| 5,050,192 A | 9/1991 | Nawata | |
| 5,083,304 A | 1/1992 | Cahill | |
| 5,124,705 A | 6/1992 | Voorman | |
| 5,142,695 A | 8/1992 | Roberts et al. | |
| 5,157,343 A | 10/1992 | Voorman | |
| 5,194,826 A | 3/1993 | Huusko | |
| 5,235,410 A | 8/1993 | Hurley | |
| 5,241,310 A | 8/1993 | Tiemann | |
| 5,243,345 A | 9/1993 | Naus et al. | |
| 5,267,272 A | 11/1993 | Cai et al. | |
| 5,283,578 A | 2/1994 | Ribner et al. | |
| 5,291,123 A * | 3/1994 | Brown | 323/369 |
| 5,341,135 A | 8/1994 | Pearce | |
| 5,345,406 A | 9/1994 | Williams | |
| 5,430,890 A | 7/1995 | Vogt et al. | |
| 5,442,353 A | 8/1995 | Jackson | |
| 5,451,948 A | 9/1995 | Jekel | |
| 5,469,475 A | 11/1995 | Voorman | |
| 5,500,645 A | 3/1996 | Ribner et al. | |
| 5,557,642 A | 9/1996 | Williams | |
| 5,612,613 A * | 3/1997 | Dutt et al. | 323/314 |
| 5,712,628 A | 1/1998 | Phillips et al. | |
| 5,740,524 A | 4/1998 | Pace et al. | |
| 5,742,189 A | 4/1998 | Yoshida et al. | |
| 5,758,276 A | 5/1998 | Shirakawa et al. | |
| 5,764,171 A | 6/1998 | Stikvoort | |
| 5,828,955 A | 10/1998 | Lipowski et al. | |
| 5,859,878 A | 1/1999 | Phillips et al. | |
| 5,862,465 A | 1/1999 | Ou | |
| 5,910,749 A * | 6/1999 | Kimura | 327/541 |
| 5,949,278 A * | 9/1999 | Oguey | 327/543 |
| 5,973,601 A | 10/1999 | Campana | |
| 6,002,925 A | 12/1999 | Vu et al. | |
| 6,035,186 A | 3/2000 | Moore et al. | |
| 6,075,979 A | 6/2000 | Holtvoeth et al. | |
| 6,148,048 A | 11/2000 | Kerth et al. | |
| 6,167,245 A | 12/2000 | Welland | |
| 6,175,279 B1 * | 1/2001 | Ciccarelli et al. | 330/296 |
| 6,275,090 B1 * | 8/2001 | Burger et al. | 327/334 |
| 6,323,735 B1 | 11/2001 | Welland et al. | |
| 6,343,207 B1 | 1/2002 | Hessel et al. | |
| 6,455,170 B1 * | 9/2002 | Yasui et al. | 323/315 |
| 6,539,066 B1 | 3/2003 | Heinen | |

FOREIGN PATENT DOCUMENTS

| | | |
|---|---|---|
| GB | 2233518 A | 1/1991 |
| WO | WO 99/22456 | 5/1999 |
| WO | WO 00/01074 | 1/2000 |
| WO | WO 00/11794 | 3/2000 |
| WO | WO 00/22735 | 4/2000 |

OTHER PUBLICATIONS

Stephen Jantzi et al, "A Complex Bandpass ΔΣ Converter For Digital Radio," ISCAS, May/Jun. 1994, pp. 453-456.

"Analog Devices Delivers World's First Open Market GSM Direct Conversion Radio Chipset," Analog Devices Corporate Information Press Release, http://contentanalog.com/pressrelease/prdisplay/0,1622,102,00.html, Sep. 13, 1999, pp. 1-4.

Data Sheet, CX74017, "RF Transceiver for Single, Dual, or Tri-Band GSM/GPRS Applications," Conexant, Jan. 2, 2001, pp. 1-16.

Jacques C. Rudell et al, "A 1.9-GHz Wide-Band IF Double Conversion CMOS Receiver for Cordless Telephone Applications," IEEE Journal of Solid-State Circuits, vol. 32, No. 12, Dec. 1997, pp. 2071-2088.

Jan Crols et al., "Low-IF Topologies for High-Performance Analog Front Ends of Fully Integrated Receivers," IEEE Transactions on Circuits and Systems-II: Analog and Digital Signal Processing, vol. 45, No. 3, Mar. 1998, pp. 269-282.

Jacques C. Rudell et al., "Recent Developments In High Integration Multi-Standard CMOS Transceiver for Personal Communication Systems," invited paper at the 1998 International Symposium on Low Power Electronics, Monterey, California, 6 pgs.

Asad Abidi, "CMOS Wireless Transceivers: The New Wave," IEEE Communications Magazine, Aug. 1999, pp. 119-124.

Data Sheet, UAA3535HL, "Low Power GSM/DCS/PCS Multiband Transceiver," Philips Semiconductors, Feb. 17, 2000, pp. 1-24.

Stephen Jantzi et al., "FP 13.5: A Quadrature Bandpass ΔΣ Modulator for Digital Radio," Digest of Technical Papers, 1997 IEEE International Solid-State Circuits Conference, First Edition, Feb. 1997, pp. 216-217, 460.

S. A. Jantzi et al., "The Effects of Mismatch In Complex Bandpass ΔΣ Modulators," IEEE, 1996, pp. 227-230.

Qiuting Huang, "CMOS RF Design-The Low Power Dimension," IEEE 2000 Custom Integrated Circuits Conference, pp. 161-166.

Paolo Orsatti et al., "A 20-mA-Receive, 55-mA-Transmit, Single-Chip GSM Transceiver in 0.25-μm CMOS," IEEE Journal of Solid-State Circuits, vol. 34, No. 12, Dec. 1999, pp. 1869-1880.

Qiuting Huang et al., "The Impact of Scaling Down to Deep Submicron on CMOS RF Circuits," IEEE Journal of Solid-State Circuits, vol. 33, No. 7, Jul. 1998, pp. 1023-1036.

Behzad Razavi, "Design Considerations for Direct-Conversion Receivers," IEEE Transactions on Circuits and Systems-II: Analog and Digital Signal Processing, vol. 44, No. 6, Jun. 1997, pp. 428-435.

Farbod Behbahani et al., "CMOS Mixers and Polyphase Filters for Large Image Rejection," IEEE Journal of Solid-State Circuits, vol. 36, No. 6, Jun. 2001, pp. 873-887.

Jan Crols et al., "A Single-Chip 900 MHz CMOS Receiver Front-End With A High Performance Low-IF Topolgy," IEEE Journal of Solid-State Circuits, vol. 30, No. 12, Dec. 1995, pp. 1483-1492.

Analog Devices, Single-Chip Direct-Conversion GSM/GPRS/EDGE RFIC, Othello One, www.analog.com, 2 pgs.

Analog Devices, AD6523/AD6524, GSM Direct Conversion Radio Conversion Radio Chip Set, www.analog.com, 2 pgs.

Analog Devices, GSM 3 V Transceiver IF Subsystem, AD6432, www.analog.com, pp. 1-20.

Hitachi, "RF Transceiver IC For GSM And PCN Dual Band Cellular Systems," HD155121F, ADE-207-265(Z), 1st Edition, Nov. 1998, pp. 1-56.

Analog Devices, AD7002 Specification, LC2MOS, GSM Baseband I/O Port, Rev. B, 1997, pp. 1-16.

Analog Devices, AD20msp415, GSM/DCS1800/PCS1900, Baseband Processing Chipset, Rev. O, 1997, pp. 1-7.

Kwentus et al., "A Single-Chip Universal Digital Satellite Receiver With 480-MHz IF Input," IEEE Journal of Solid-State Circuits, vol. 34, No. 11, Nov. 1999, pp. 1634-1646.

Minnis et al., "A Low-If Polyphase Receiver For GSM Using Log-Domain Signal Processing," IEEE Radio Frequency Integrated Circuits Symposium, 2000, pp. 83-86.

Atkinson et al., "A Novel Approach To Direct Conversion RF Receivers For TDMA Applications," Analog Devices, 1999, pp. 1-5.

Crochiere et al., "Optimum FIR Digital Filter Implementations For Decimation, Interpolation, And Narrow-Band Filtering," IEEE Transactions On Acoustics, Speech, And Signal Processing, vol. ASSP-23, No. 5, Oct. 1975, pp. 444-456.

Hogenauer, "An Economical Class Of Digital Filters For Decimation and Interpolation," IEEE, 1981, pp. 155-162.

Brandt et al., "A Low-Power, Area-Efficient Digital Filter For Decimation And Interpolatiion," IEEE Journal Of Solid-State Circuits, vol. 29, No. 6, Jun. 1994, pp. 679-687.

Philips Seminconductors, "uaa3535-Low-Power GSM GPRS Triple-Band Near-Zero IF Transceiver," Oct. 1999, 4 pgs.

D'Avella et al., "An Adaptive MLSE Receiver For TDMA Digital Mobile Radio," IEEE Journal On Selected Areas In Communications, vol. 7, No. 1, Jan. 1989, pp. 122-129.

Razavi, "CMOS RF Receiver Design For Wireless LAN Applications," IEEE, 1999, pp. 275-280.

Lucent Technologies, "W3020 GSM Multiband RF Transceiver," Advance Data Sheet, Dec. 1999, pp. 1-44.

Lucent Technologies, "DSP1620 Digital Signal Processor," Data Sheet, Jun. 1998, pp. 1-178.

Steyaert et al., "A 2-V CMOS Cellular Transceiver Front-End," IEEE Journal of Solid-State Circuits, vol. 35, No. 12, Dec. 2000, pp. 1895-1907.

Paulus et al., "A CMOS IF Transceiver With Reduced Analog Complexity," IEEE Journal Of Solid-State Circuits, vol. 33, No. 12, Dec. 1998, pp. 2154-2159.

Analog Devices, "Analog Devices Delivers World's First Open Market GSM Direct Conversion Radio Chipset," Nov. 1994, 4 pgs.

"Digest Of Technical Papers," 1997 IEEE International Solid-State Circuits Conference, First Edition, Feb. 1997, 5 pgs.

RF Micro Devices, RF2968, Product Description, Blue Tooth Transceiver, Rev A19, pp. 11-199-11-222.

Texas Instruments, TRF6901, "Single Chip RF Transceiver," Mar. 2002, pp. 1-29.

Texas Instruments, TRF6900A, "Single Chip RF Transceiver," Sep. 2001, pp. 1-34.

Texas Instruments, TRF6900, Single Chip RF Transceiver, Oct. 1999, pp. 1-32.

Philips Semiconductor, "Bluetooth RF Transceiver," Data Sheet, UAA3558, Dec. 21, 2000, pp. 1-5.

Philips Semiconductor, "Image Reject 1 800 MHz Transceiver For DECT Applications," Data Sheet, UAA2067G, Oct. 22, 1996, pp. 1-24.

Philips Semiconductor, "Analog Cordless Telephone IC," Data Sheet, UAA2062, Aug. 10, 2000, pp. 1-40.

Philips Semiconductor, "900 MHz Analog Cordless Telephone IC," Data Sheet, UAA3515A, Dec. 12, 2001, pp. 1-44.

Philips Semiconductor, "Low Voltage IF I/Q Transceiver," Data Sheet, SA1638, Sep. 3, 1997, pp. 1-26.

Texas Instruments, "TCS2100 GPRS Chipset Solution," Product Bulletin, 2001, 4 pgs.

Fague, "Othello: A New Direct-Conversion Radio Chip Set Eliminates IF Stages," Analog Dialogue 33-10, 1999, pp. 1-3.

Analog Devices, AD6523/AD6524, "GSM Direct Conversion Radio Chip Set," 1999, 2 pgs.

Lucent Technologies, "Lucent CSP1089 GSM Conversion Signal Processor For Cellular Handset And Modem Applications," Product Brief, Feb. 2001, 2 pgs.

Lucent Technologies, "Lucent CSP1099 GSM Conversion Signal Processor For Cellular Handset And Modem Applications," Product Brief, Feb. 2001, 2 pgs.

Lucent Technologies, "Trident," Product Brief, Feb. 2001, 2 pgs.

Ericsson, "RF Transceiver Circuit For The Digital Enhanced Cordless Telecommunications (DECT) System," PBL40215, Jan. 2001, pp. 1-22.

Micro Linear, "ML2712 2.4GHz Transceiver," Datasheet, Aug. 2001, pp. 1-21.

Analog Devices, "GSM/GPRS/DCS1800.PCS1900 SoftFone Baseband Chipset," AD20msp430, 2000, 2 pgs.

RF Micro Devices, "Polaris Total Radio Solution," Press Release, 2002, 1 pg.

Tuttle, "Introduction To Wireless Receiver Design," Tutorial, 2002, pp. 2-58.

Rael et al., "Design Methodology Used In A Single-Chip CMOS 900 MHz Spread-Spectrum Wireless Transceiver," 35th Design Automation Conference, Jun. 1998, 6 pgs.

Troster et al., "An Interpolative Bandpass Converter On A 1.2-μm BiCMOS Analog/Digital Array," IEEE Journal Of Solid-State Circuits, vol. 28, No. 4, Apr. 1993, pp. 471-477.

Schreier et al., "Decimation For Bandpass Sigma-Delta Analog-To-Digital Conversion," IEEE, 1990, pp. 1801-1804.

Shoaei et al., "Optimal (Bandpass) Continuous-Time ΔΣ Modulator," pp. 489-492.

Schreier et al., "Bandpass Sigma-Delta Modulation," Electronics Letters, vol. 25, No. 23, Nov. 9, 1989, pp. 1560-1561.

Jantzi et al., "Bandpass Sigma-Delta Analog-To-Digital Conversion," IEEE Transactions On Circuits And Systems, vol. 38, No. 11, Nov. 1991, pp. 1406-1409.

Crols et al., "An Analog Integrated Polyphase Filter For A High Performance Low-IF Receiver," Symposium On VLSI Circuits Digest Of Technical Papers, 1995, pp. 87-88.

Aziz et al., "Performance Of Complex Noise Transfer Functions In Bandpass And Multi Band Sigma Delta Systems," IEEE, 1995, pp. 641-644.

Jantzi, "A Fourth-Order Bandpass Sigma-Delta Modulator," IEEE Journal Of Solid-State Circuits, vol. 28, No. 3, Mar. 1993, pp. 282-291.

Liu et al., "Switched-Capacitor Implementation Of Complex Filters," IEEE International Symposium On Circuits And Systems, vol. 3, 1986, 5 pgs.

Sedra et al., "Complex Analog Bandpass Filters Designed By Linearly Shifting Real Low-Pass Prototypes," IEEE International Symposium On Circuits And Systems, vol. 3, 1985, 5 pgs.

Thurston et al., "Bandpass Implementation Of The Sigms-Delta A-D Conversion Technique," International Conference On Analogue To Digital And Digital To Analogue Conversion, Sep. 1991, 7 pgs.

Rudell, et al., *"Second Generation Multi-Standard Monolithic CMOS RF Transceiver,"* University of California, Berkeley, Slides 1 through 9 (Jun. 1996).

Cho, et al., *"Multi-Standard Monolithic CMOS RF Transceiver,"* University of California, Berkeley, Slides 1 through 26 (Jun. 1996).

Copending U.S. Appl. No. 09/821,342, filed Mar. 29, 2001, "Partitioned Radio-Frequency Apparatus And Associated Method" (SilA:072).

Copending U.S. Appl. No. 09/821,340, filed Mar. 29, 2001, "Digital Interface In Radio-Frequency Apparatus And Associated Methods" (Sila:073).

Copending U.S. Appl. No. 10/075,094, filed Feb. 12, 2002, "Radio-Frequency Communication Apparatus And Associated Methods" (Sila:074).

Copending U.S. Appl. No. 10/075,098, filed Feb. 13, 2002, "Apparatus And Methods For Generating Radio Frequencies In Communication Circuitry" (Sila:075).

Copending U.S. Appl. No. 10/075,122, filed Feb. 12, 2002, "Digital Architecture For Radio-Frequency Apparatus And Associated Methods" (Sila:078).

Copending U.S. Appl. No. 10/083,633, filed Feb. 26, 2002, "Apparatus And Methods For Calibrating Signal-Processing Circuitry" (Sila:080).

Copending U.S. Appl. No. 10/081,121, filed Feb. 22, 2002, "Calibrated Low-Noise Current And Voltage References And Associated Methods" (Sila:095).

Copending U.S. Appl. No. 10/074,591, filed Feb. 13, 2002, "Apparatus For Generating Multiple Radio Frequencies In Communication Circuitry And Associated Methods" (Sila:096).

Copending U.S. Appl. No. 10/075,099, filed Feb. 12, 2002, "Notch Filter For DC Offset Reduction In Radio-Frequency Apparatus And Associated Methods" (Sila:097).

Copending U.S. Appl. No. 10/074,676, filed Feb. 12, 2002, "DC Offset Reduction In Radio-Frequency Apparatus And Associated Methods" (Sila:098).

Copending U.S. Appl. No. 10/079,058, filed Feb. 19, 2002, "Apparatus And Methods For Output Buffer Circuitry With Constant Output Power In Radio-Frequency Circuitry" (Sila:099).

Copending U.S. Appl. No. 10/081,730, filed Feb. 22, 2002, "Method And Apparatus For Synthesizing High-Frequency Signals For Wireless Communications" (Sila:106).

Copending U.S. Appl. No. 10/079,057, filed Feb. 19, 2002, "Apparatus And Method For Front-End Circuitry In Radio-Frequency Apparatus" (Sila:107).

Allen, "Complex Analog Filters Obtained From Shifted Lowpass Prototypes," Sep. 1985, 118 pgs.

Motorola Communications Semiconductor Product Division, "A 1.9 GHz Chipset For PCS Applications," Microwave Journal, No. 6, Jun. 1995, 3 pgs.

Search Report for PCT/US02/00896; Oct. 4, 2002; 7 pgs.

Copending U.S. Appl. No. 09/708,339, filed Nov. 8, 2000, "Method And Apparatus For Operating A PLL With A Phase Detector/Sample Hold Circuit For Synthesizing High-Frequency Signals For Wireless Communications" (Sila:035C1).

Copending U.S. Appl. No. 09/999,702, filed Oct. 31, 2001, "Method And Apparatus For Synthesizing Dual Band High-Frequency Signals For Wireless Communications" (Sila:060C1).

* cited by examiner

US 7,177,610 B2

CALIBRATED LOW-NOISE CURRENT AND VOLTAGE REFERENCES AND ASSOCIATED METHODS

CROSS-REFERENCE TO RELATED APPLICATIONS

This patent application is a continuation-in-part of U.S. patent application Ser. No. 09/821,342, titled "Partitioned Radio-Frequency Apparatus and Associated Methods," and filed on Mar. 29, 2001. This patent application claims priority to: Provisional U.S. Patent Application Ser. No. 60/261,506, filed on Jan. 12, 2001; Provisional U.S. Patent Application Ser. No. 60/273,119, titled "Partitioned RF Apparatus with Digital Interface and Associated Methods," filed on Mar. 2, 2001; and Provisional U.S. Patent Application Ser. No. 60/337,225, filed on Dec. 4, 2001.

Furthermore, this patent application incorporates by reference the following patent documents: U.S. patent application Ser. No. 10/075,122, titled "Digital Architecture for Radio-Frequency Apparatus and Associated Methods"; U.S. patent application Ser. No. 10/075,099, titled "Notch Filter for DC Offset Reduction in Radio-Frequency Apparatus and Associated Methods"; U.S. patent application Ser. No. 10/074,676, titled "DC Offset Reduction in Radio-Frequency Apparatus and Associated Methods"; U.S. patent application Ser. No. 10/075,094, titled "Radio-Frequency Communication Apparatus and Associated Methods"; U.S. patent application Ser. No. 10/075,098, titled "Apparatus and Methods for Generating Radio Frequencies in Communication Circuitry"; U.S. patent application Ser. No. 10/074,591, titled "Apparatus for Generating Multiple Radio Frequencies in Communication Circuitry and Associated Methods"; U.S. patent application Ser. No. 10/079,058, titled "Apparatus and Methods for Output Buffer Circuitry with Constant Output Power in Radio-Frequency Circuitry"; U.S. patent application Ser. No. 10/081,730, titled "Method and Apparatus for Synthesizing High-Frequency Signals for Wireless Communications"; U.S. patent application Ser. No. 10/079,057, titled "Apparatus and Method for Front-End Circuitry in Radio-Frequency Apparatus"; and Provisional U.S. Patent Application Ser. No. 60/337,225, filed on Dec. 4, 2001.

TECHNICAL FIELD OF THE INVENTION

This invention relates to calibrated current and voltage sources. More particularly, the invention concerns calibrated low-noise current and voltage sources and associated methods in RF apparatus, such as transmitters, receivers, and transceivers.

BACKGROUND

The proliferation and popularity of mobile radio and telephony applications has led to market demand for communication systems with low cost, low power, and small form-factor radio-frequency (RF) transceivers. As a result, recent research has focused on providing monolithic transceivers using low-cost complementary metal-oxide semiconductor (CMOS) technology. One aspect of research efforts has focused on providing an RF transceiver within a single integrated circuit (IC). The integration of transceiver circuits is not a trivial problem, as it must take into account the requirements of the transceiver's circuitry and the communication standards governing the transceiver's operation. From the perspective of the transceiver's circuitry, RF transceivers typically include sensitive components susceptible to noise and interference with one another and with external sources. Integrating the transceiver's circuitry into one integrated circuit may exacerbate interference among the various blocks of the transceiver's circuitry. Moreover, communication standards governing RF transceiver operation outline a set of requirements for noise, inter-modulation, blocking performance, output power, and spectral emission of the transceiver.

Unfortunately, no technique for addressing all of the above issues in high-performance RF receivers or transceivers, for example, RF transceivers used in cellular and telephony applications, has been developed. A need therefore exists for techniques of partitioning and integrating RF receivers or transceivers that would provide low-cost, low form-factor RF transceivers for high-performance applications, for example, in cellular handsets.

A further aspect of the invention relates to providing low-noise current and voltage references. Typically, RF apparatus, such as transmitters, receivers, and transceivers, use current and voltage references. Because of their interaction with circuitry that processes signals with relatively small magnitudes, the references should have low noise. Conventional sources, however, tend to either have relatively high noise in their output signals or have relatively high power consumption levels to generate low-noise outputs. A need therefore exists for low-noise current and/or voltage sources that consume relatively low power.

SUMMARY OF THE INVENTION

This invention relates to providing low-noise, low-drift current and/or voltage references. The current and/or voltage references may supply analog circuitry in a variety of applications, such as RF apparatus.

One aspect of the invention concerns apparatus for generating low-noise current references. In one embodiment, a low-noise current reference circuitry includes a voltage source, a current source, and a controller. The voltage source generates a reference voltage. The current source provides a low-noise output current in response to a control signal. The controller provides the control signal based at least in part on the relative magnitudes of the reference voltage and a voltage derived from the output current.

Another aspect of the invention relates to apparatus for generating low-noise voltage references. In one embodiment, a low-noise voltage reference circuitry includes a reference voltage source, a voltage source, and a controller. The reference voltage source generates a reference voltage. The voltage source provides a low-noise output voltage in response to a control signal. The controller provides the control signal based at least in part on the relative magnitudes of the output voltage and the reference voltage.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numerals used in more than one drawing denote the same, similar, or equivalent functionality, components, or blocks.

DETAILED DESCRIPTION OF THE INVENTION

This invention in part contemplates partitioning RF apparatus so as to provide highly integrated, high-performance, low-cost, and low form-factor RF solutions. One may use RF apparatus according to the invention in high-performance communication systems. More particularly, the invention in part relates to partitioning RF receiver or transceiver circuitry in a way that minimizes, reduces, or overcomes interference effects among the various blocks of the RF receiver or transceiver, while simultaneously satisfying the requirements of the standards that govern RF receiver or transceiver performance. Those standards include the Global System for Mobile (GSM) communication, Personal Communication Services (PCS), Digital Cellular System (DCS), Enhanced Data for GSM Evolution (EDGE), and General Packet Radio Services (GPRS). RF receiver or transceiver circuitry partitioned according to the invention therefore overcomes interference effects that would be present in highly integrated RF receivers or transceivers while meeting the requirements of the governing standards at low cost and with a low form-factor. The description of the invention refers to circuit partition and circuit block interchangeably.

Figure 1:
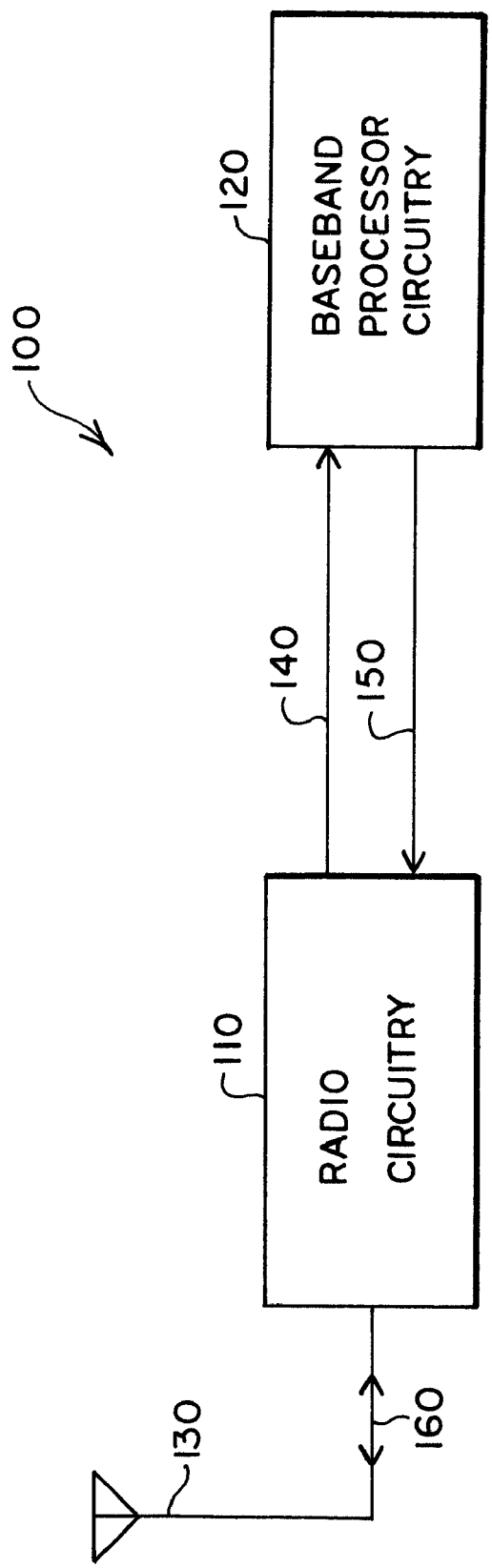
FIG. 1 illustrates the block diagram of an RF transceiver that includes radio circuitry that operates in conjunction with a baseband processor circuitry.

FIG. 1 shows the general block diagram of an RF transceiver circuitry 100 according to the invention. The RF transceiver circuitry 100 includes radio circuitry 110 that couples to an antenna 130 via a bi-directional signal path 160. The radio circuitry 110 provides an RF transmit signal to the antenna 130 via the bi-directional signal path 160 when the transceiver is in transmit mode. When in the receive mode, the radio circuitry 110 receives an RF signal from the antenna 130 via the bi-directional signal path 160.

The radio circuitry 110 also couples to a baseband processor circuitry 120. The baseband processor circuitry 120 may comprise a digital-signal processor (DSP). Alternatively, or in addition to the DSP, the baseband processor circuitry 120 may comprise other types of signal processor, as persons skilled in the art understand. The radio circuitry 110 processes the RF signals received from the antenna 130 and provides receive signals 140 to the baseband processor circuitry 120. In addition, the radio circuitry 110 accepts transmit input signals 150 from the baseband processor 120 and provides the RF transmit signals to the antenna 130.

Figure 2A:
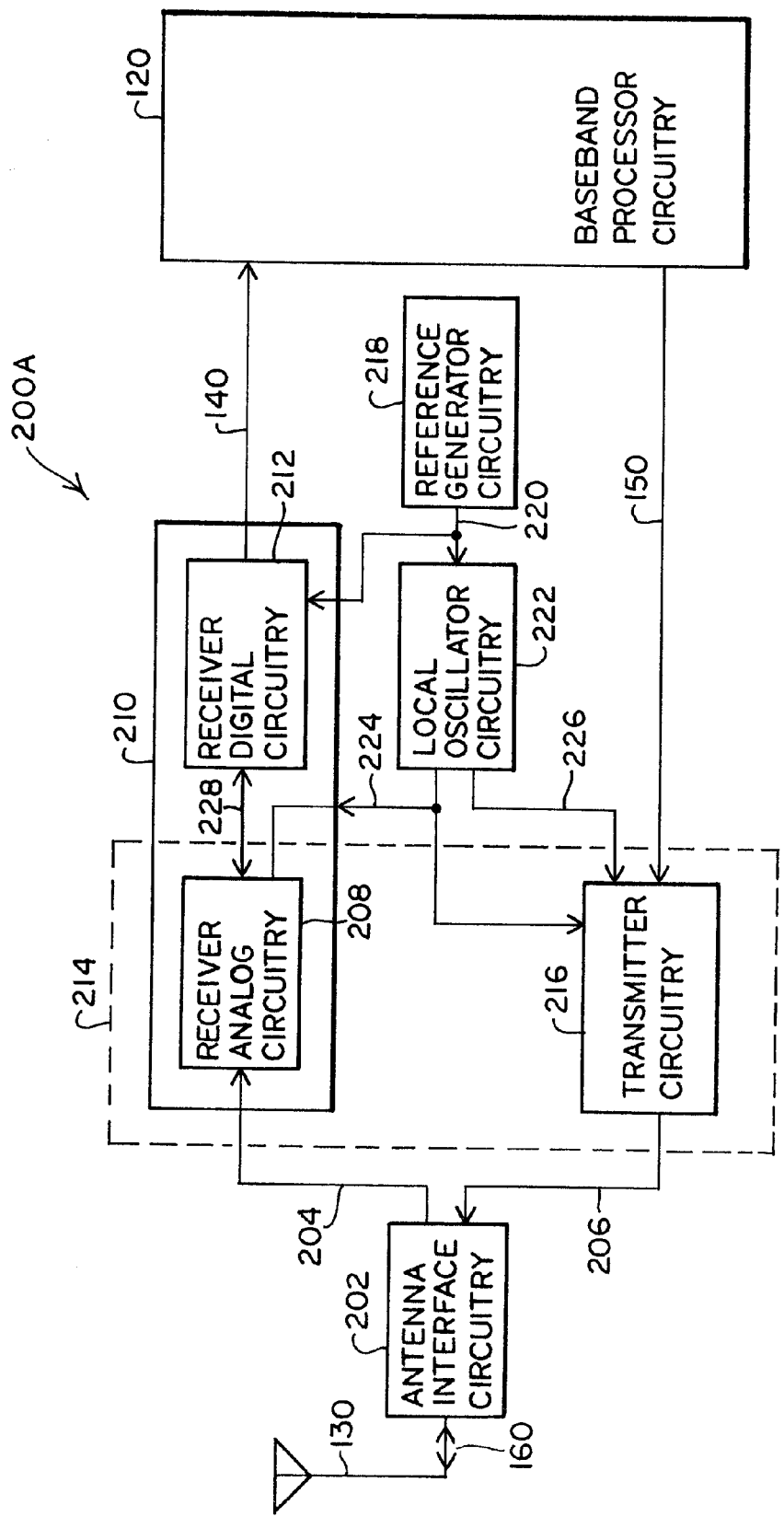
FIG. 2A shows RF transceiver circuitry partitioned according to the invention.

FIGS. 2A–2D show various embodiments of RF transceiver circuitry partitioned according to the invention. FIG. 3 and its accompanying description below make clear the considerations that lead to the partitioning of the RF transceiver circuitry as shown in FIGS. 2A–2D. FIG. 2A illustrates an embodiment 200A of an RF transceiver circuitry partitioned 20 according to the invention. In addition to the elements described in connection with FIG. 1, the RF transceiver 200A includes antenna interface circuitry 202, receiver circuitry 210, transmitter circuitry 216, reference generator circuitry 218, and local oscillator circuitry 222.

The reference generator circuitry 218 produces a reference signal 220 and provides that signal to the local oscillator circuitry 222 and to receiver digital circuitry 212. The reference signal 220 preferably comprises a clock signal, although it may include other signals, as desired. The local oscillator circuitry 222 produces an RF local oscillator signal 224, which it provides to receiver analog circuitry 208 and to the transmitter circuitry 216. The local oscillator circuitry 222 also produces a transmitter intermediate-frequency (IF) local oscillator signal 226 and provides that signal to the transmitter circuitry 216. Note that, in RF transceivers according to the invention, the receiver analog circuitry 208 generally comprises mostly analog circuitry in addition to some digital or mixed-mode circuitry, for example, analog-to-digital converter (ADC) circuitry and circuitry to provide an interface between the receiver analog circuitry and the receiver digital circuitry, as described below.

The antenna interface circuitry 202 facilitates communication between the antenna 130 and the rest of the RF transceiver. Although not shown explicitly, the antenna interface circuitry 202 may include a transmit/receive mode switch, RF filters, and other transceiver front-end circuitry, as persons skilled in the art understand. In the receive mode, the antenna interface circuitry 202 provides RF receive signals 204 to the receiver analog circuitry 208. The receiver analog circuitry 208 uses the RF local oscillator signal 224 to process (e.g., down-convert) the RF receive signals 204 and produce a processed analog signal. The receiver analog circuitry 208 converts the processed analog signal to digital format and supplies the resulting digital receive signals 228 to the receiver digital circuitry 212. The receiver digital circuitry 212 further processes the digital receive signals 228 and provides the resulting receive signals 140 to the baseband processor circuitry 120.

In the transmit mode, the baseband processor circuitry 120 provides transmit input signals 150 to the transmitter circuitry 216. The transmitter circuitry 216 uses the RF local oscillator signal 224 and the transmitter IF local oscillator signal 226 to process the transmit input signals 150 and to provide the resulting transmit RF signal 206 to the antenna interface circuitry 202. The antenna interface circuitry 202 may process the transmit RF signal further, as desired, and provide the resulting signal to the antenna 130 for propagation into a transmission medium.

The embodiment 200A in FIG. 2A comprises a first circuit partition, or circuit block, 214 that includes the receiver analog circuitry 208 and the transmitter circuitry 216. The embodiment 200A also includes a second circuit partition, or circuit block, that includes the receiver digital circuitry 212. The embodiment 200A further includes a third circuit partition, or circuit block, that comprises the local oscillator circuitry 222. The first circuit partition 214, the second circuit partition 212, and the third circuit partition 222 are partitioned from one another so that interference effects among the circuit partitions tend to be reduced. The first, second, and third circuit partitions preferably each reside within an integrated circuit device. In other words, preferably the receiver analog circuitry 208 and the transmitter circuitry 216 reside within an integrated circuit device, the receiver digital circuitry 212 resides within another integrated circuit device, and the local oscillator circuitry 222 resides within a third integrated circuit device.

Figure 2B:
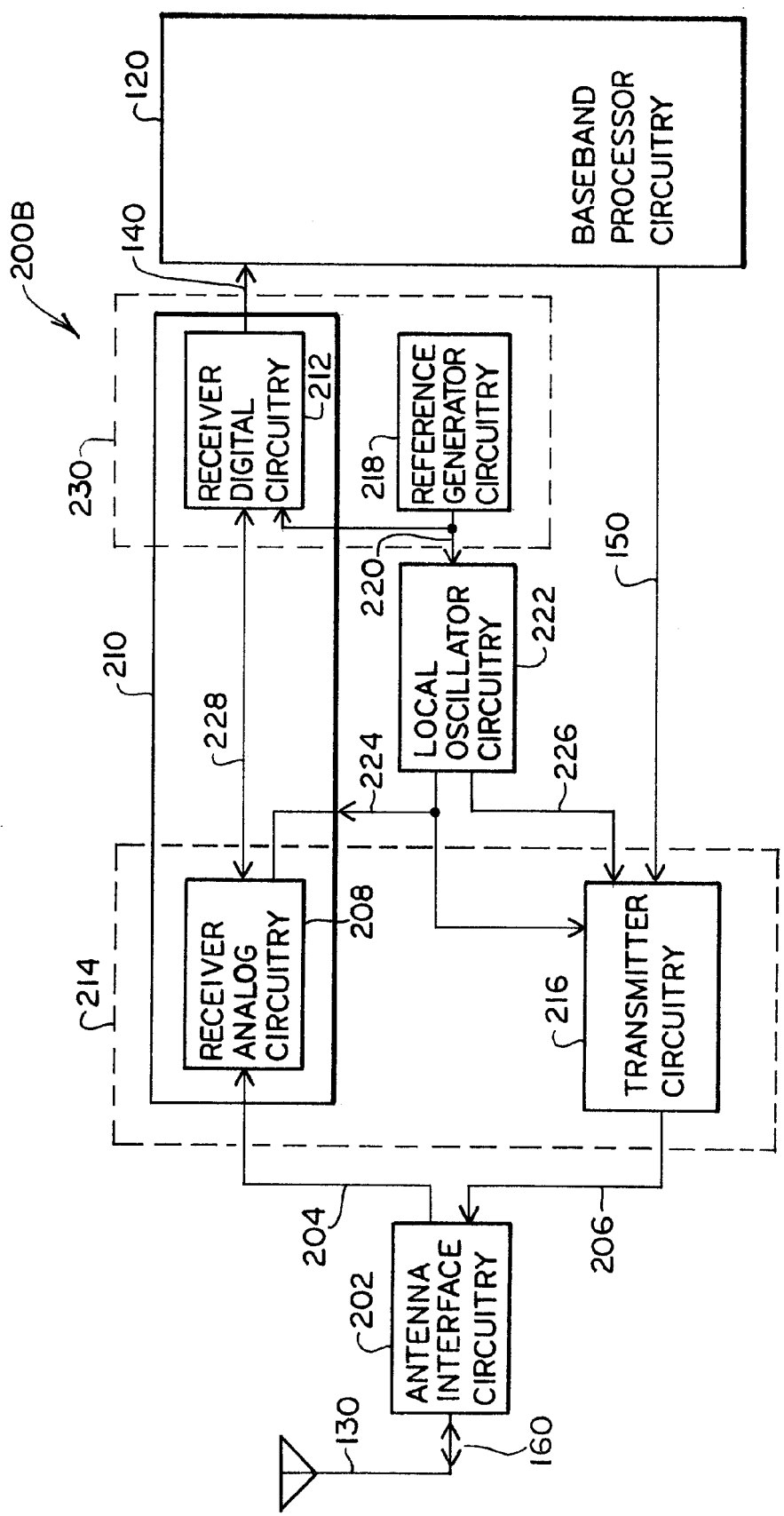
FIG. 2B depicts another embodiment of RF transceiver circuitry partitioned according to the invention, in which the reference generator circuitry resides within the same circuit partition, or circuit block, as does the receiver digital circuitry.
Figure 3:
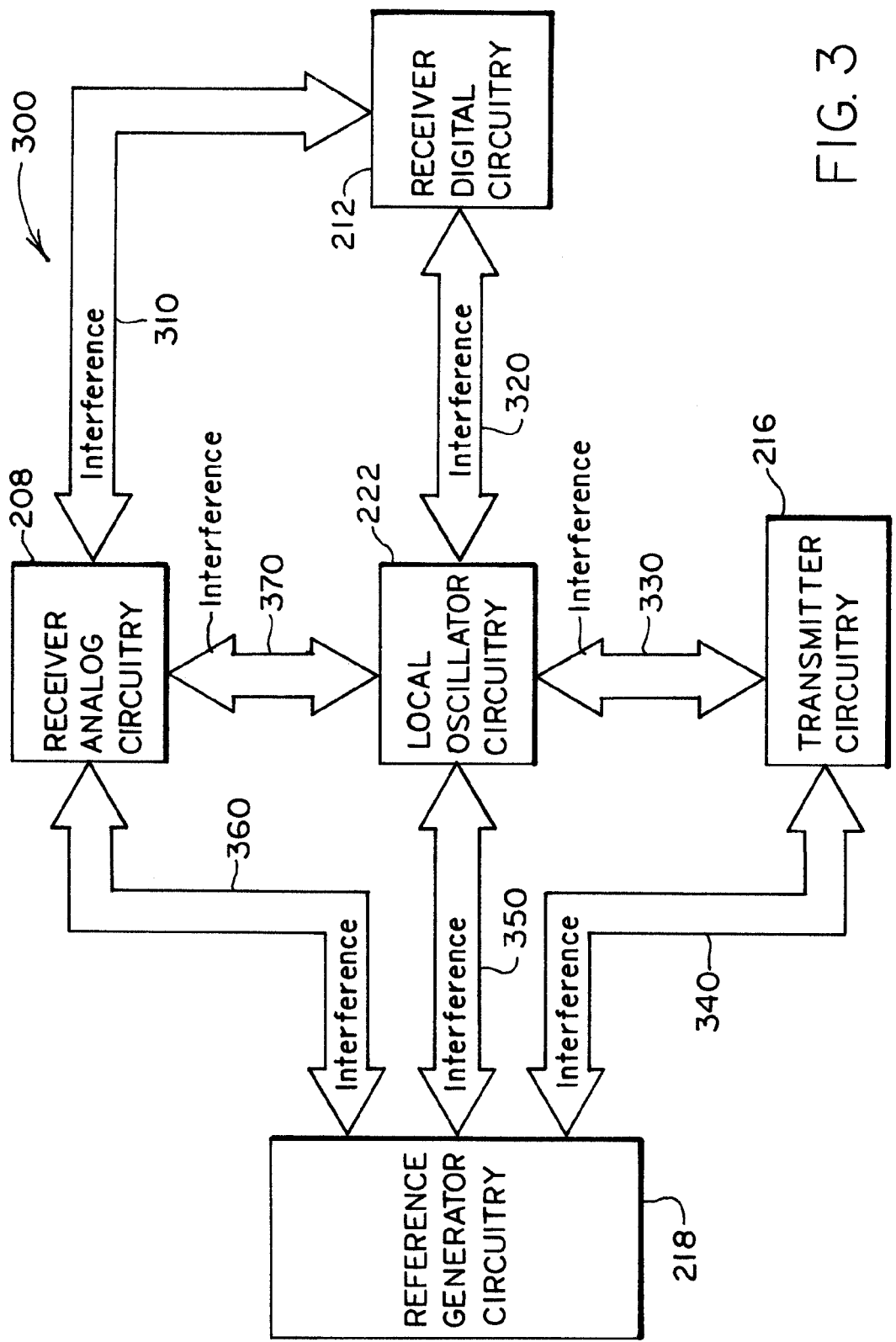
FIG. 3 illustrates interference mechanisms among the various blocks of an RF transceiver, which the embodiments of the invention in FIGS. 2A–2D, depicting RF transceivers partitioned according to the invention, seek to overcome, reduce, or minimize.

FIG. 2B shows an embodiment 200B of an RF transceiver circuitry partitioned according to the invention. The embodiment 200B has the same circuit topology as that of embodiment 200A in FIG. 2A. The partitioning of embodiment 200B, however, differs from the partitioning of embodiment 200A. Like embodiment 200A, embodiment 200B has three circuit partitions, or circuit blocks. The first and the third circuit partitions in embodiment 200B are similar to the first and third circuit partitions in embodiment 200A. The second circuit partition 230 in embodiment 200B, however, includes the reference signal generator 218 in addition to the receiver digital circuitry 212. As in embodiment 200A, embodiment 200B is partitioned so that interference effects among the three circuit partitions tend to be reduced.

Figure 2C:
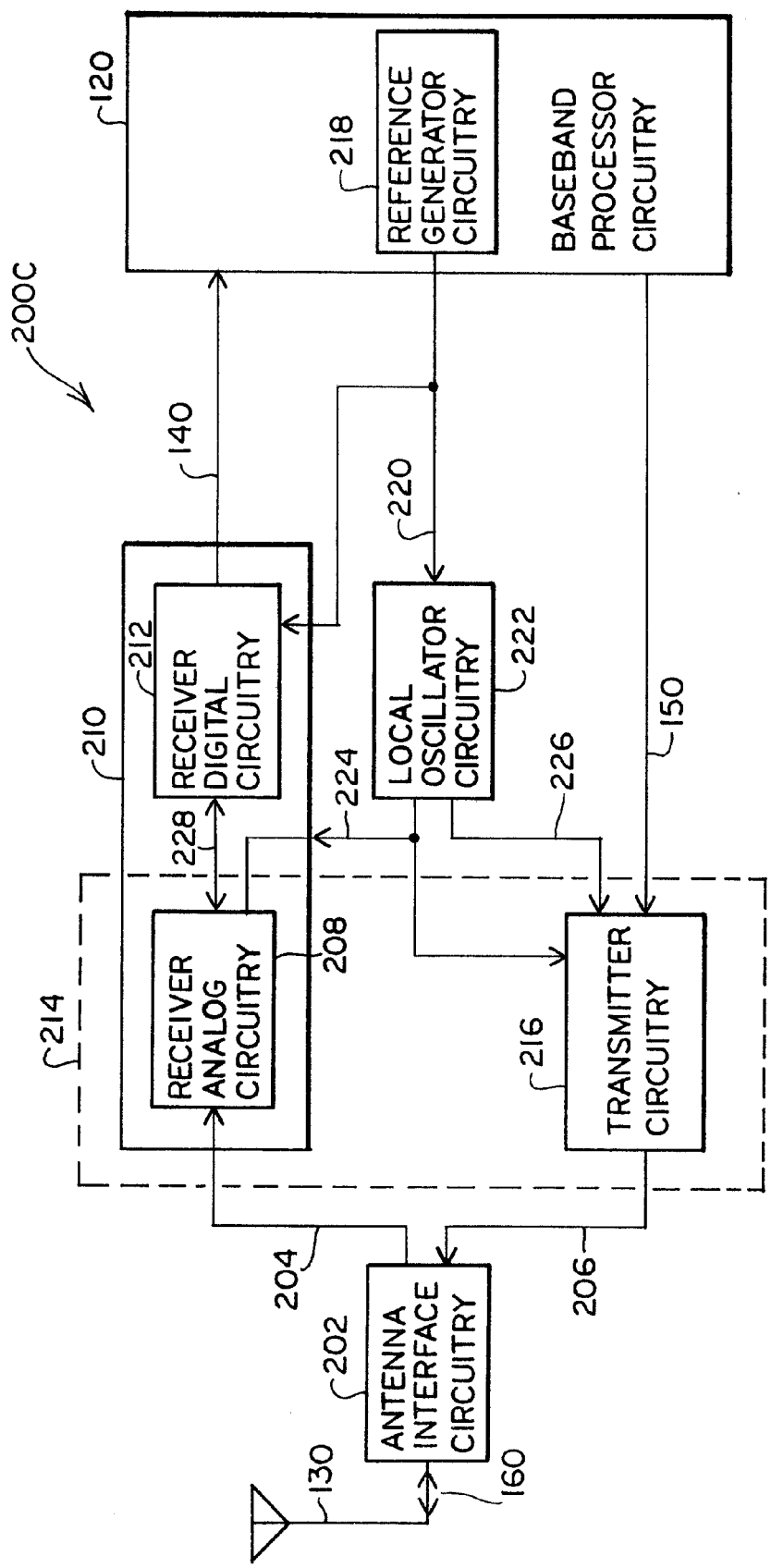
FIG. 2C illustrates yet another embodiment of RF transceiver circuitry partitioned according to invention, in which the reference generator circuitry resides within the baseband processor circuitry.

FIG. 2C illustrates an embodiment 200C, which constitutes a variation of embodiment 200A in FIG. 2A. Embodiment 200C shows that one may place the reference signal generator 218 within the baseband processor circuitry 120, as desired. Placing the reference signal generator 218 within the baseband processor circuitry 120 obviates the need for either discrete reference signal generator circuitry 218 or an additional integrated circuit or module that includes the reference signal generator 218. Embodiment 200C has the same partitioning as embodiment 200A, and operates in a similar manner.

Note that FIGS. 2A–2C show the receiver circuitry 210 as a block to facilitate the description of the embodiments shown in those figures. In other words, the block containing the receiver circuitry 210 in FIGS. 2A–2C constitutes a conceptual depiction of the receiver circuitry within the RF transceiver shown in FIGS. 2A–2C, not a circuit partition or circuit block.

Figure 2D:
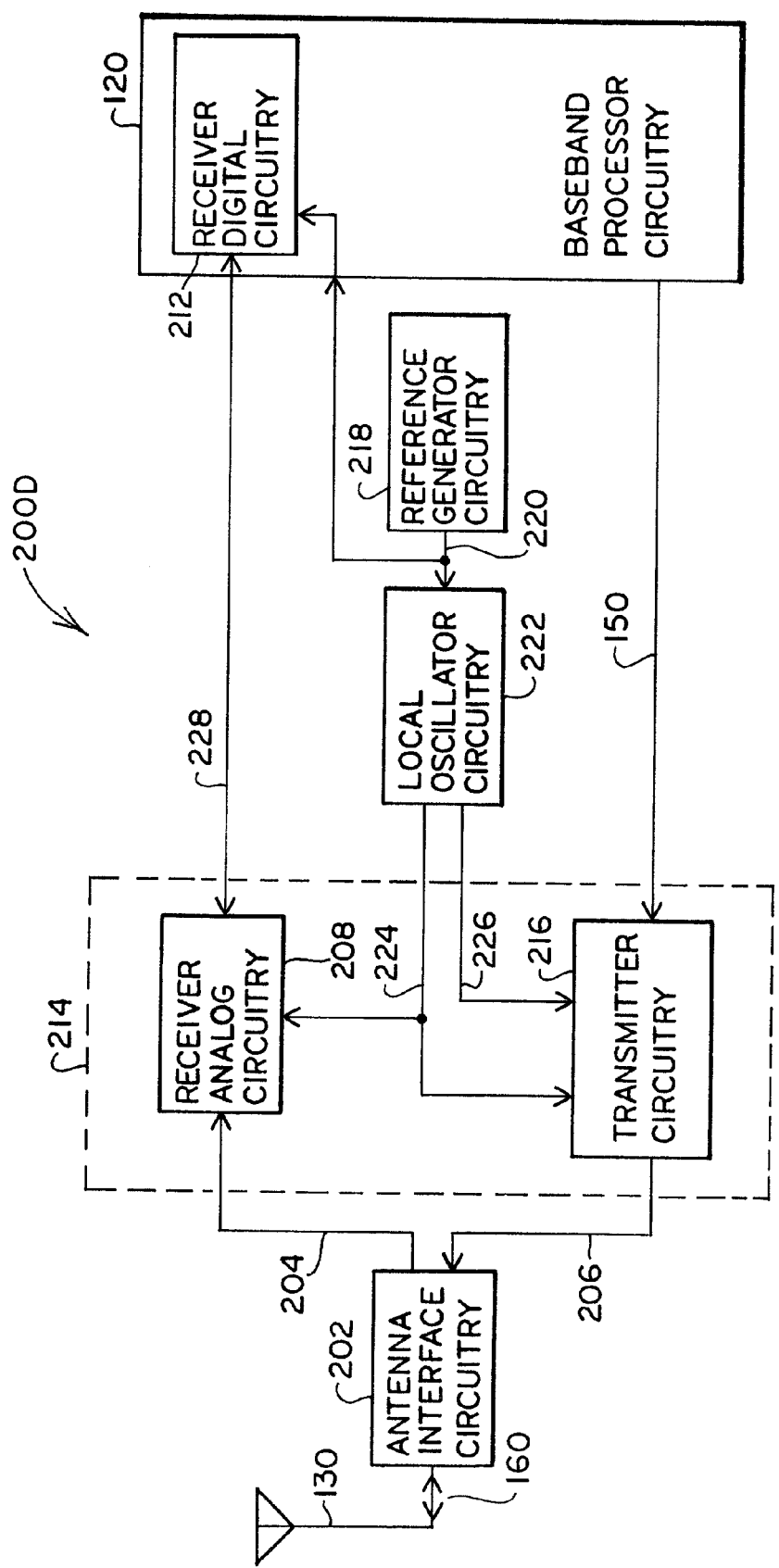
FIG. 2D shows another embodiment of RF transceiver circuitry partitioned according to the invention, in which the receiver digital circuitry resides within the baseband processor circuitry.

FIG. 2D shows an embodiment 200D of an RF transceiver partitioned according to the invention. The RF transceiver in FIG. 2D operates similarly to the transceiver shown in FIG. 2A. The embodiment 200D, however, accomplishes additional economy by including the receiver digital circuitry 212 within the baseband processor circuitry 120. As one alternative, one may integrate the entire receiver digital circuitry 212 on the same integrated circuit device that includes the baseband processor circuitry 120. Note that one may use software (or firmware), hardware, or a combination of software (or firmware) and hardware to realize the functions of the receiver digital circuitry 212 within the baseband processor circuitry 120, as persons skilled in the art who have the benefit of the description of the invention understand. Note also that, similar to the embodiment 200C in FIG. 2C, the baseband processor circuitry 120 in embodiment 200D may also include the reference signal generator 218, as desired.

The partitioning of embodiment 200D involves two circuit partitions, or circuit blocks. The first circuit partition 214 includes the receiver analog circuitry 208 and the transmitter circuitry 216. The second circuit partition includes the local oscillator circuitry 222. The first and second circuit partitions are partitioned so that interference effects between them tend to be reduced.

FIG. 3 shows the mechanisms that may lead to interference among the various blocks or components in a typical RF transceiver, for example, the transceiver shown in FIG.

2A. Note that the paths with arrows in FIG. 3 represent interference mechanisms among the blocks within the transceiver, rather than desired signal paths. One interference mechanism results from the reference signal 220 (see FIGS. 2A–2D), which preferably comprises a clock signal. In the preferred embodiments, the reference generator circuitry produces a clock signal that may have a frequency of 13 MHz (GSM clock frequency) or 26 MHz. If the reference generator produces a 26 MHz clock signal, RF transceivers according to the invention preferably divide that signal by two to produce a 13 MHz master system clock. The clock signal typically includes voltage pulses that have many Fourier series harmonics. The Fourier series harmonics extend to many multiples of the clock signal frequency. Those harmonics may interfere with the receiver analog circuitry 208 (e.g., the low-noise amplifier, or LNA), the local oscillator circuitry 222 (e.g., the synthesizer circuitry), and the transmitter circuitry 216 (e.g., the transmitter's voltage-controlled oscillator, or VCO). FIG. 3 shows these sources of interference as interference mechanisms 360, 350, and 340.

The receiver digital circuitry 212 uses the output of the reference generator circuitry 218, which preferably comprises a clock signal. Interference mechanism 310 exists because of the sensitivity of the receiver analog circuitry 208 to the digital switching noise and harmonics present in the receiver digital circuitry 212. Interference mechanism 310 may also exist because of the digital signals (for example, clock signals) that the receiver digital circuitry 212 communicates to the receiver analog circuitry 208. Similarly, the digital switching noise and harmonics in the receiver digital circuitry 212 may interfere with the local oscillator circuitry 222, giving rise to interference mechanism 320 in FIG. 3.

The local oscillator circuitry 222 typically uses an inductor in an inductive-capacitive (LC) resonance tank (not shown explicitly in the figures). The resonance tank may circulate relatively large currents. Those currents may couple to the sensitive circuitry within the transmitter circuitry 216 (e.g., the transmitter's VCO), thus giving rise to interference mechanism 330. Similarly, the relatively large currents circulating within the resonance tank of the local oscillator circuitry 222 may saturate sensitive components within the receiver analog circuitry 208 (e.g., the LNA circuitry). FIG. 3 depicts this interference source as interference mechanism 370.

The timing of the transmit mode and receive mode in the GSM specifications help to mitigate potential interference between the transceiver's receive-path circuitry and its transmit-path circuitry. The GSM specifications use time-division duplexing (TDD). According to the TDD protocol, the transceiver deactivates the transmit-path circuitry while in the receive mode of operation, and vice-versa. Consequently, FIG. 3 does not show potential interference mechanisms between the transmitter circuitry 216 and either the receiver digital circuitry 212 or the receiver analog circuitry 208.

As FIG. 3 illustrates, interference mechanisms exist between the local oscillator circuitry 222 and each of the other blocks or components in the RF transceiver. Thus, to reduce interference effects, RF transceivers according to the invention preferably partition the local oscillator circuitry 222 separately from the other transceiver blocks shown in FIG. 3. Note, however, that in some circumstances one may include parts or all of the local oscillator circuitry within the same circuit partition (for example, circuit partition 214 in FIGS. 2A–2D) that includes the receiver analog circuitry and the transmitter circuitry, as desired. Typically, a voltage-controlled oscillator (VCO) within the local oscillator circuitry causes interference with other sensitive circuit blocks (for example, the receiver analog circuitry) through undesired coupling mechanisms. If those coupling mechanisms can be mitigated to the extent that the performance characteristics of the RF transceiver are acceptable in a given application, then one may include the local oscillator circuitry within the same circuit partition as the receiver analog circuitry and the transmitter circuitry. Alternatively, if the VCO circuitry causes unacceptable levels of interference, one may include other parts of the local oscillator circuitry within the circuit partition that includes the receiver analog circuitry and the transmitter circuitry, but exclude the VCO circuitry from that circuit partition.

To reduce the effects of interference mechanism 310, RF transceivers according to the invention partition the receiver analog circuitry 208 separately from the receiver digital circuitry 212. Because of the mutually exclusive operation of the transmitter circuitry 216 and the receiver analog circuitry 208 according to GSM specifications, the transmitter circuitry 216 and the receiver analog circuitry 208 may reside within the same circuit partition, or circuit block. Placing the transmitter circuitry 216 and the receiver analog circuitry 208 within the same circuit partition results in a more integrated RF transceiver overall. The RF transceivers shown in FIGS. 2A–2D employ partitioning techniques that take advantage of the above analysis of the interference mechanisms among the various transceiver components. To reduce interference effects among the various circuit partitions or circuit blocks even further, RF transceivers according to the invention also use differential signals to couple the circuit partitions or circuit blocks to one another.

Figure 4:
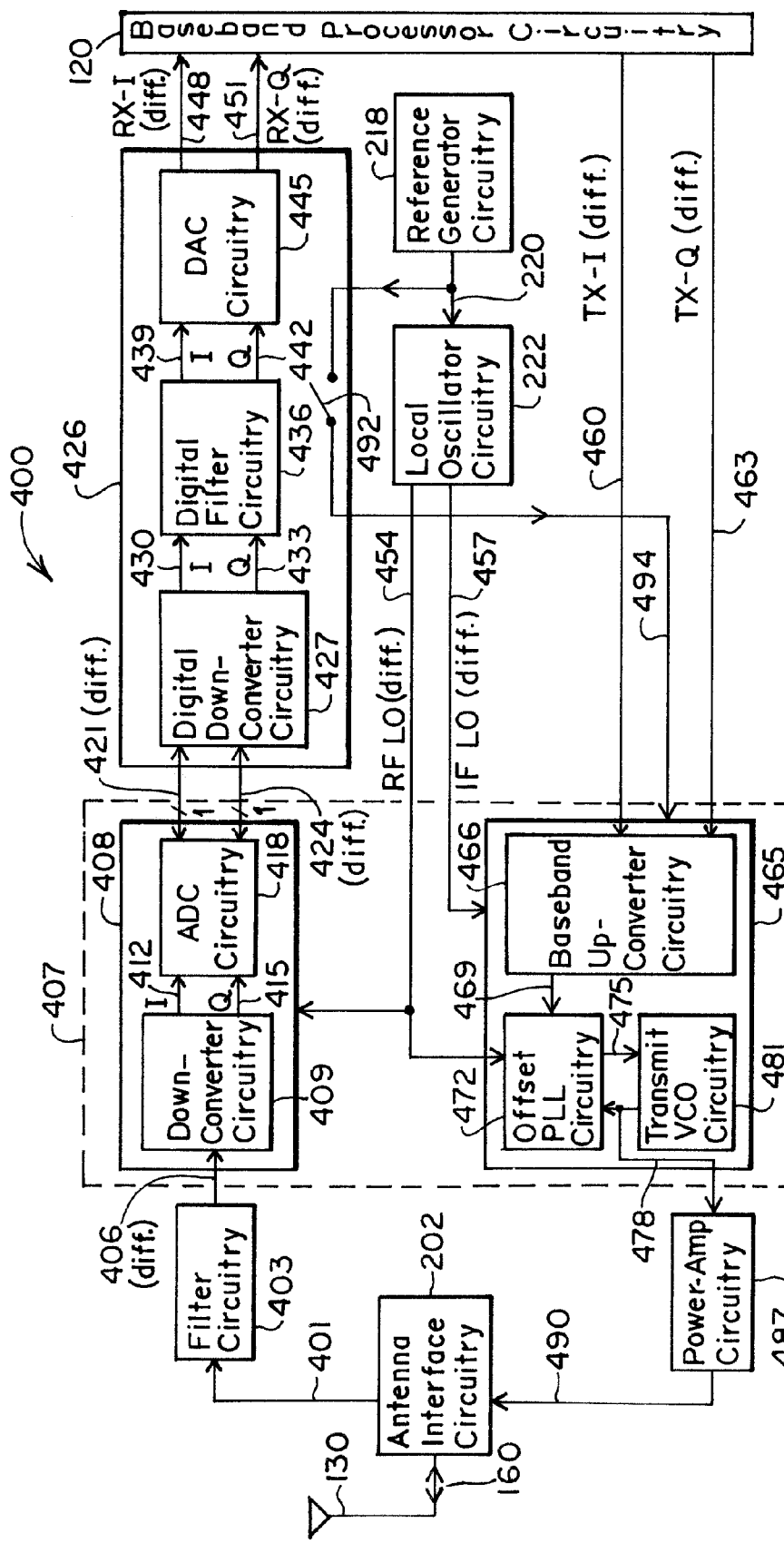
FIG. 4 shows a more detailed block diagram of RF transceiver circuitry partitioned according to the invention.

FIG. 4 shows a more detailed block diagram of an embodiment 400 of an RF transceiver partitioned according to the invention. The transceiver includes receiver analog circuitry 408, receiver digital circuitry 426, and transmitter circuitry 465. In the receive mode, the antenna interface circuitry 202 provides an RF signal 401 to a filter circuitry 403. The filter circuitry 403 provides a filtered RF signal 406 to the receiver analog circuitry 408. The receiver analog circuitry 408 includes down-converter (i.e., mixer) circuitry 409 and analog-to-digital converter (ADC) circuitry 418. The down-converter circuitry 409 mixes the filtered RF signal 406 with an RF local oscillator signal 454, received from the local oscillator circuitry 222. The down-converter circuitry 409 provides an in-phase analog down-converted signal 412 (i.e., I-channel signal) and a quadrature analog down-converted signal 415 (i.e., Q-channel signal) to the ADC circuitry 418.

The ADC circuitry 418 converts the in-phase analog down-converted signal 412 and the quadrature analog down-converted signal 415 into a one-bit in-phase digital receive signal 421 and a one-bit quadrature digital receive signal 424. (Note that FIGS. 4–8 illustrate signal flow, rather than specific circuit implementations; for more details of the circuit implementation, for example, more details of the circuitry relating to the one-bit in-phase digital receive signal 421 and the one-bit quadrature digital receive signal 424, see FIGS. 9–14.) Thus, The ADC circuitry 418 provides the one-bit in-phase digital receive signal 421 and the one-bit quadrature digital receive signal 424 to the receiver digital circuitry 426. As described below, rather than, or in addition to, providing the one-bit in-phase and quadrature digital receive signals to the receiver digital circuitry 426, the digital interface between the receiver analog circuitry 408 and the receiver digital circuitry 426 may communicate various other signals. By way of illustration, those signals may include reference signals (e.g., clock signals), control signals, logic signals, hand-shaking signals, data signals, status signals, information signals, flag signals, and/or configuration signals. Moreover, the signals may constitute single-ended or differential signals, as desired. Thus, the interface provides a flexible communication mechanism between the receiver analog circuitry and the receiver digital circuitry.

The receiver digital circuitry 426 includes digital down-converter circuitry 427, digital filter circuitry 436, and digital-to-analog converter (DAC) circuitry 445. The digital down-converter circuitry 427 accepts the one-bit in-phase digital receive signal 421 and the one-bit quadrature digital receive signal 424 from the receiver analog circuitry 408. The digital down-converter circuitry 427 converts the received signals into a down-converted in-phase signal 430 and a down-converted quadrature signal 433 and provides those signals to the digital filter circuitry 436. The digital filter circuitry 436 preferably comprises an infinite impulse response (IIR) channel-select filter that performs various filtering operations on its input signals. The digital filter circuitry 436 preferably has programmable response characteristics. Note that, rather than using an IIR filter, one may use other types of filter (e.g., finite impulse-response, or FIR, filters) that provide fixed or programmable response characteristics, as desired.

The digital filter circuitry 436 provides a digital in-phase filtered signal 439 and a digital quadrature filtered signal 442 to the DAC circuitry 445. The DAC circuitry 445 converts the digital in-phase filtered signal 439 and the digital quadrature filtered signal 442 to an in-phase analog receive signal 448 and a quadrature analog receive signal 451, respectively. The baseband processor circuitry 120 accepts the in-phase analog receive signal 448 and the quadrature analog receive signal 451 for further processing.

The transmitter circuitry 465 comprises baseband up-converter circuitry 466, offset phase-lock-loop (PLL) circuitry 472, and transmit voltage-controlled oscillator (VCO) circuitry 481. The transmit VCO circuitry 481 typically has low-noise circuitry and is sensitive to external noise. For example, it may pick up interference from digital switching because of the high gain that results from the resonant LC-tank circuit within the transmit VCO circuitry 481. The baseband up-converter circuitry 466 accepts an intermediate frequency (IF) local oscillator signal 457 from the local oscillator circuitry 222. The baseband up-converter circuitry 466 mixes the IF local oscillator signal 457 with an analog in-phase transmit input signal 460 and an analog quadrature transmit input signal 463 and provides an up-converted IF signal 469 to the offset PLL circuitry 472.

The offset PLL circuitry 472 effectively filters the IF signal 469. In other words, the offset PLL circuitry 472 passes through it signals within its bandwidth but attenuates other signals. In this manner, the offset PLL circuitry 472 attenuates any spurious or noise signals outside its bandwidth, thus reducing the requirement for filtering at the antenna 130, and reducing system cost, insertion loss, and power consumption. The offset PLL circuitry 472 forms a feedback loop with the transmit VCO circuitry 481 via an offset PLL output signal 475 and a transmit VCO output signal 478. The transmit VCO circuitry 481 preferably has a constant-amplitude output signal.

The offset PLL circuitry 472 uses a mixer (not shown explicitly in FIG. 4) to mix the RF local oscillator signal 454 with the transmit VCO output signal 478. Power amplifier circuitry 487 accepts the transmit VCO output signal 478, and provides an amplified RF signal 490 to the antenna interface circuitry 202. The antenna interface circuitry 202 and the antenna 130 operate as described above. RF transceivers according to the invention preferably use transmitter circuitry 465 that comprises analog circuitry, as shown in FIG. 4. Using such circuitry minimizes interference with the transmit VCO circuitry 481 and helps to meet emission specifications for the transmitter circuitry 465.

The receiver digital circuitry 426 also accepts the reference signal 220 from the reference generator circuitry 218. The reference signal 220 preferably comprises a clock signal. The receiver digital circuitry 426 provides to the transmitter circuitry 465 a switched reference signal 494 by using a switch 492. Thus, the switch 492 may selectively provide the reference signal 220 to the transmitter circuitry 465. Before the RF transceiver enters its transmit mode, the receiver digital circuitry 426 causes the switch 492 to close, thus providing the switched reference signal 494 to the transmitter circuitry 465.

The transmitter circuitry 465 uses the switched reference signal 494 to calibrate or adjust some of its components. For example, the transmitter circuitry 465 may use the switched reference signal 494 to calibrate some of its components, such as the transmit VCO circuitry 481, for example, as described in commonly owned U.S. Pat. No. 6,137,372, incorporated by reference here in its entirety. The transmitter circuitry 465 may also use the switched reference signal 494 to adjust a voltage regulator within its output circuitry so as to transmit at known levels of RF radiation or power.

While the transmitter circuitry 465 calibrates and adjusts its components, the analog circuitry within the transmitter circuitry 465 powers up and begins to settle. When the transmitter circuitry 465 has finished calibrating its internal circuitry, the receiver digital circuitry 426 causes the switch 492 to open, thus inhibiting the supply of the reference signal 220 to the transmitter circuitry 465. At this point, the transmitter circuitry may power up the power amplifier circuitry 487 within the transmitter circuitry 465. The RF transceiver subsequently enters the transmit mode of operation and proceeds to transmit.

Note that FIG. 4 depicts the switch 492 as a simple switch for conceptual, schematic purposes. One may use a variety of devices to realize the function of the controlled switch 492, for example, semiconductor switches, gates, or the like, as persons skilled in the art who have the benefit of the disclosure of the invention understand. Note also that, although FIG. 4 shows the switch 492 as residing within the receiver digital circuitry 426, one may locate the switch in other locations, as desired. Placing the switch 492 within the receiver digital circuitry 426 helps to confine to the receiver digital circuitry 426 the harmonics that result from the switching circuitry.

The embodiment 400 in FIG. 4 comprises a first circuit partition 407, or circuit block, that includes the receiver analog circuitry 408 and the transmitter circuitry 465. The embodiment 400 also includes a second circuit partition, or circuit block, that includes the receiver digital circuitry 426. Finally, the embodiment 400 includes a third circuit partition, or circuit block, that comprises the local oscillator circuitry 222. The first circuit partition 407, the second circuit partition, and the third circuit partition are partitioned from one another so that interference effects among the circuit partitions tend to be reduced. That arrangement tends to reduce the interference effects among the circuit partitions by relying on the analysis of interference effects provided above in connection with FIG. 3. Preferably, the first, second, and third circuit partitions each reside within an integrated circuit device. To further reduce interference effects among the circuit partitions, the embodiment 400 in FIG. 4 uses differential signals wherever possible. The notation "(diff.)" adjacent to signal lines or reference numerals in FIG. 4 denotes the use of differential lines to propagate the annotated signals.

Note that the embodiment 400 shown in FIG. 4 uses an analog-digital-analog signal path in its receiver section. In other words, the ADC circuitry 418 converts analog signals into digital signals for further processing, and later conversion back into analog signals by the DAC circuitry 445. RF transceivers according to the invention use this particular signal path for the following reasons. First, the ADC circuitry 418 obviates the need for propagating signals from the receiver analog circuitry 408 to the receiver digital circuitry 426 over an analog interface with a relatively high dynamic range. The digital interface comprising the one-bit in-phase digital receive signal 421 and the one-bit quadrature digital receive signal 424 is less susceptible to the effects of noise and interference than would be an analog interface with a relatively high dynamic range.

Second, the RF transceiver in FIG. 4 uses the DAC circuitry 445 to maintain compatibility with interfaces commonly used to communicate with baseband processor circuitry in RF transceivers. According to those interfaces, the baseband processor accepts analog, rather than digital, signals from the receive path circuitry within the RF transceiver. In an RF transceiver that meets the specifications of those interfaces, the receiver digital circuitry 426 would provide analog signals to the baseband processor circuitry 120. The receiver digital circuitry 426 uses the DAC circuitry 445 to provide analog signals (i.e., the in-phase analog receive signal 448 and the quadrature analog receive signal 451) to the baseband processor circuitry 120. The DAC circuitry 445 allows programming the common-mode level and the full-scale voltage, which may vary among different baseband processor circuitries.

Third, compared to an analog solution, the analog-digital-analog signal path may result in reduced circuit size and area (for example, the area occupied within an integrated circuit device), thus lower cost. Fourth, the digital circuitry provides better repeatability, relative ease of testing, and more robust operation than its analog counterpart. Fifth, the digital circuitry has less dependence on supply voltage variation, temperature changes, and the like, than does comparable analog circuitry.

Sixth, the baseband processor circuitry 120 typically includes programmable digital circuitry, and may subsume the functionality of the digital circuitry within the receiver digital circuitry 426, if desired. Seventh, the digital circuitry allows more precise signal processing, for example, filtering, of signals within the receive path. Eighth, the digital circuitry allows more power-efficient signal processing. Finally, the digital circuitry allows the use of readily programmable DAC circuitry and PGA circuitry that provide for more flexible processing of the signals within the receive path. To benefit from the analog-digital-analog signal path, RF transceivers according to the invention use a low-IF signal (for example, 100 KHz for GSM applications) in their receive path circuitry, as using higher IF frequencies may lead to higher performance demands on the ADC and DAC circuitry within that path. The low-IF architecture also eases image-rejection requirements, and allows on-chip integration of the digital filter circuitry 436. Moreover, RF transceivers according to the invention use the digital down-converter circuitry 427 and the digital filter circuitry 436 to implement a digital-IF path in the receive signal path. The digital-IF architecture facilitates the implementation of the digital interface between the receiver digital circuitry 426 and the receiver analog circuitry 408.

If the receiver digital circuitry 426 need not be compatible with the common analog interface to baseband processors, one may remove the DAC circuitry 445 and use a digital interface to the baseband processor circuitry 120, as desired. In fact, similar to the RF transceiver shown in FIG. 2D, one may realize the function of the receiver digital circuitry 426 within the baseband processor circuitry 120, using hardware, software, or a combination of hardware and software. In that case, the RF transceiver would include two circuit partitions, or circuit blocks. The first circuit partition, or circuit block, 407 would include the receiver analog circuitry 408 and the transmitter circuitry 465. A second circuit partition, or circuit block, would comprise the local oscillator circuitry 222. Note also that, similar to the RF transceiver shown in FIG. 2C, one may include within the baseband processor circuitry 120 the functionality of the reference generator circuitry 218, as desired.

Figure 5:
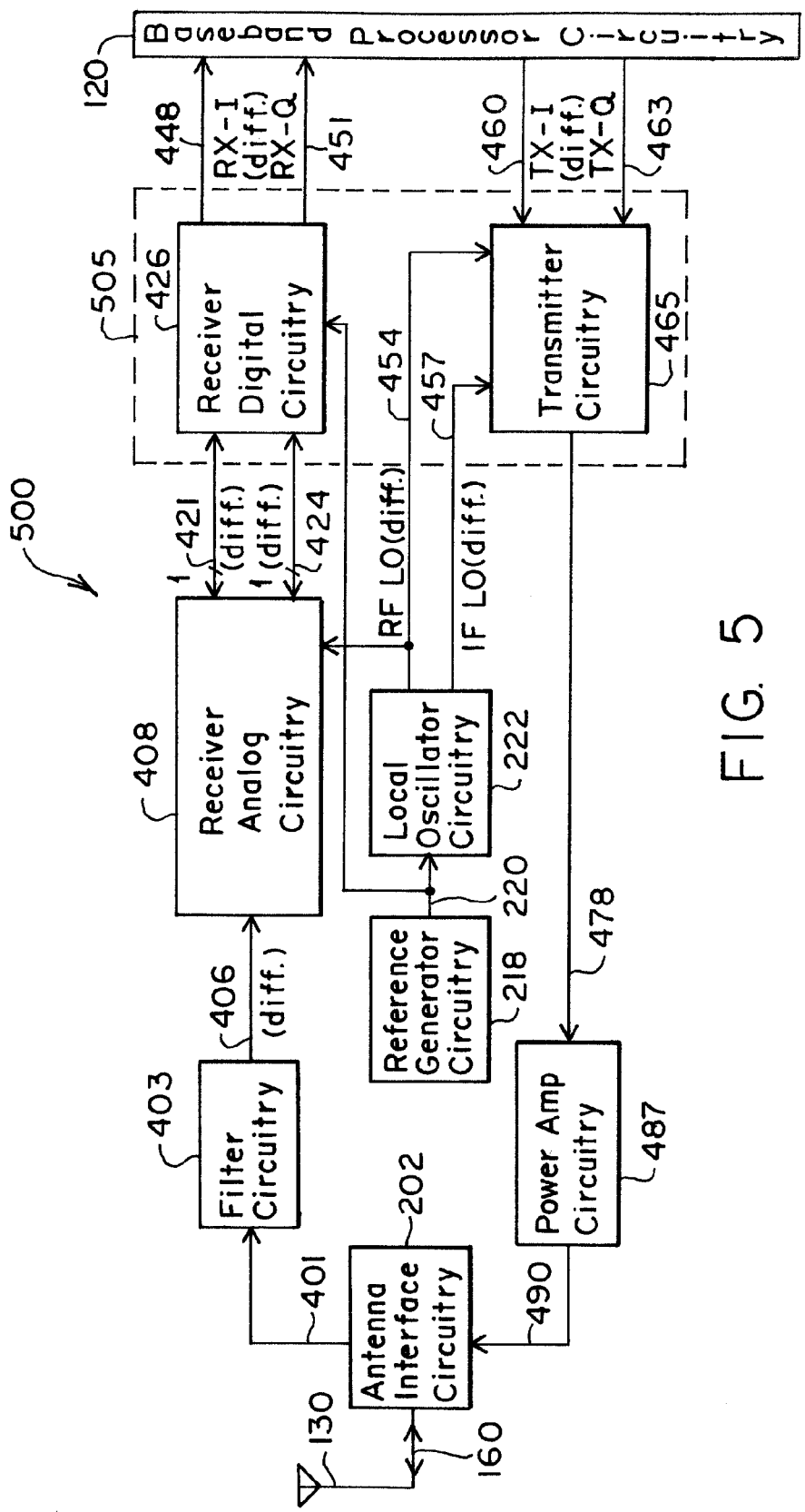
FIG. 5 illustrates an alternative technique for partitioning RF transceiver circuitry.
Figure 6:
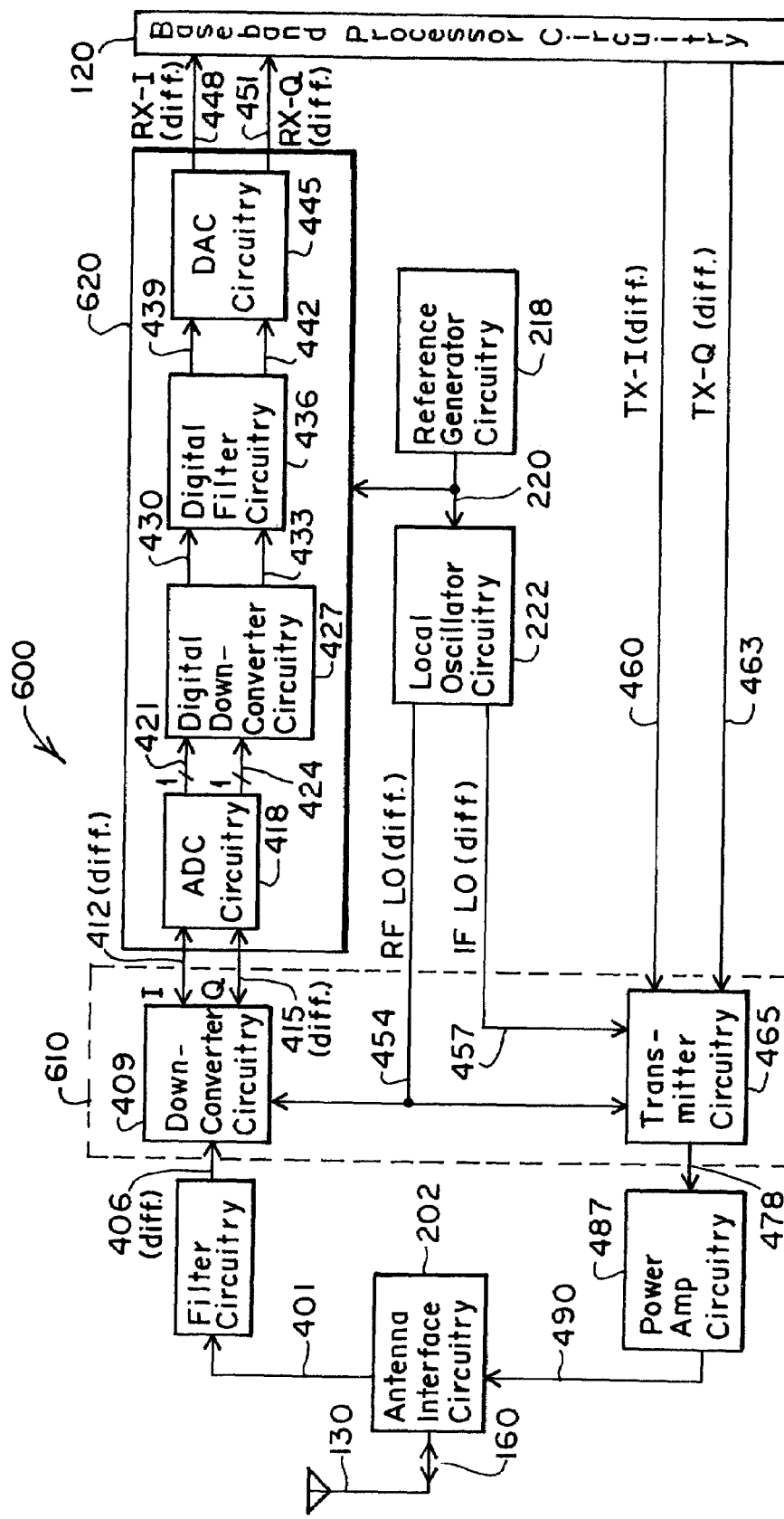
FIG. 6 shows yet another alternative technique for partitioning RF transceiver circuitry.

One may partition the RF transceiver shown in FIG. 4 in other ways. FIGS. 5 and 6 illustrate alternative partitioning of the RF transceiver of FIG. 4. FIG. 5 shows an embodiment 500 of an RF transceiver that includes three circuit partitions, or circuit blocks. A first circuit partition includes the receiver analog circuitry 408. A second circuit partition 505 includes the receiver digital circuitry 426 and the transmitter circuitry 465. As noted above, the GSM specifications provide for alternate operation of RF transceivers in receive and transmit modes. The partitioning shown in FIG. 5 takes advantage of the GSM specifications by including the receiver digital circuitry 426 and the transmitter circuitry 465 within the second circuit partition 505. A third circuit partition includes the local oscillator circuitry 222. Preferably, the first, second, and third circuit partitions each reside within an integrated circuit device. Similar to embodiment 400 in FIG. 4, the embodiment 500 in FIG. 5 uses differential signals wherever possible to further reduce interference effects among the circuit partitions.

FIG. 6 shows another alternative partitioning of an RF transceiver. FIG. 6 shows an embodiment 600 of an RF transceiver that includes three circuit partitions, or circuit blocks. A first circuit partition 610 includes part of the receiver analog circuitry, i.e., the down-converter circuitry 409, together with the transmitter circuitry 465. A second circuit partition 620 includes the ADC circuitry 418, together with the receiver digital circuitry, i.e., the digital down-converter circuitry 427, the digital filter circuitry 436, and the DAC circuitry 445. A third circuit partition includes the local oscillator circuitry 222. Preferably, the first, second, and third circuit partitions each reside within an integrated circuit device. Similar to embodiment 400 in FIG. 4, the embodiment 600 in FIG. 6 uses differential signals wherever possible to further reduce interference effects among the circuit partitions.

Figure 7:
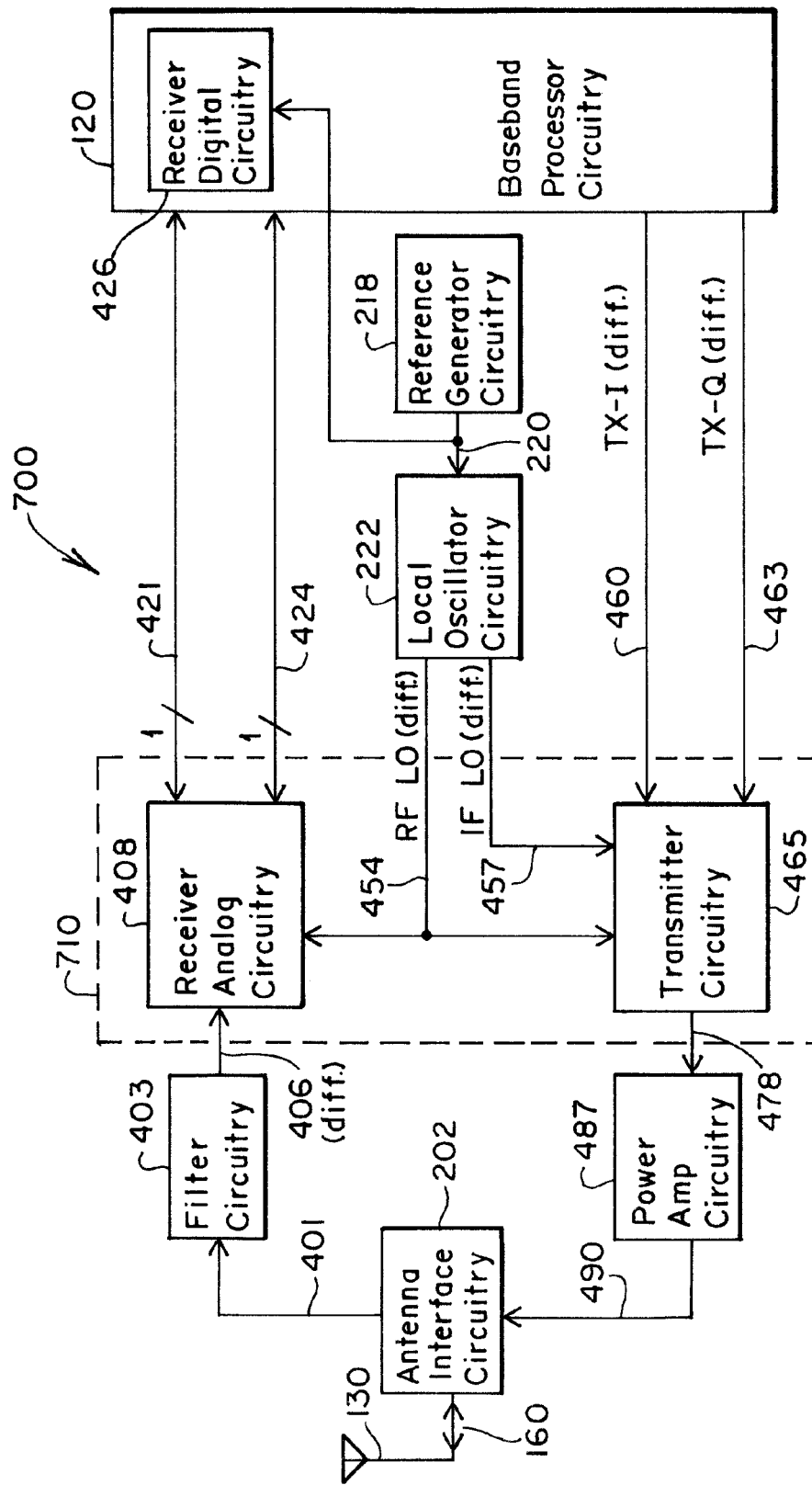
FIG. 7 depicts a more detailed block diagram of RF transceiver circuitry partitioned according to the invention, in which the receiver digital circuitry resides within the baseband processor circuitry.

FIG. 7 shows a variation of the RF transceiver shown in FIG. 4. FIG. 7 illustrates an embodiment 700 of an RF transceiver partitioned according to the invention. Note that, for the sake of clarity, FIG. 7 does not explicitly show the details of the receiver analog circuitry 408, the transmitter circuitry 465, and the receiver digital circuitry 426. The receiver analog circuitry 408, the transmitter circuitry 465, and the receiver digital circuitry 426 include circuitry similar to those shown in their corresponding counterparts in FIG. 4. Similar to the RF transceiver shown in FIG. 2D, the embodiment 700 in FIG. 7 shows an RF transceiver in which the baseband processor 120 includes the function of the receiver digital circuitry 426. The baseband processor circuitry 120 may realize the function of the receiver digital circuitry 426 using hardware, software, or a combination of hardware and software.

Because the embodiment 700 includes the function of the receiver digital circuitry 426 within the baseband processor circuitry 120, it includes two circuit partitions, or circuit blocks. A first circuit partition 710 includes the receiver analog circuitry 408 and the transmitter circuitry 465. A second circuit partition comprises the local oscillator circuitry 222. Note also that, similar to the RF transceiver shown in FIG. 2C, one may also include within the baseband processor circuitry 120 the functionality of the reference generator circuitry 218, as desired.

Figure 8:
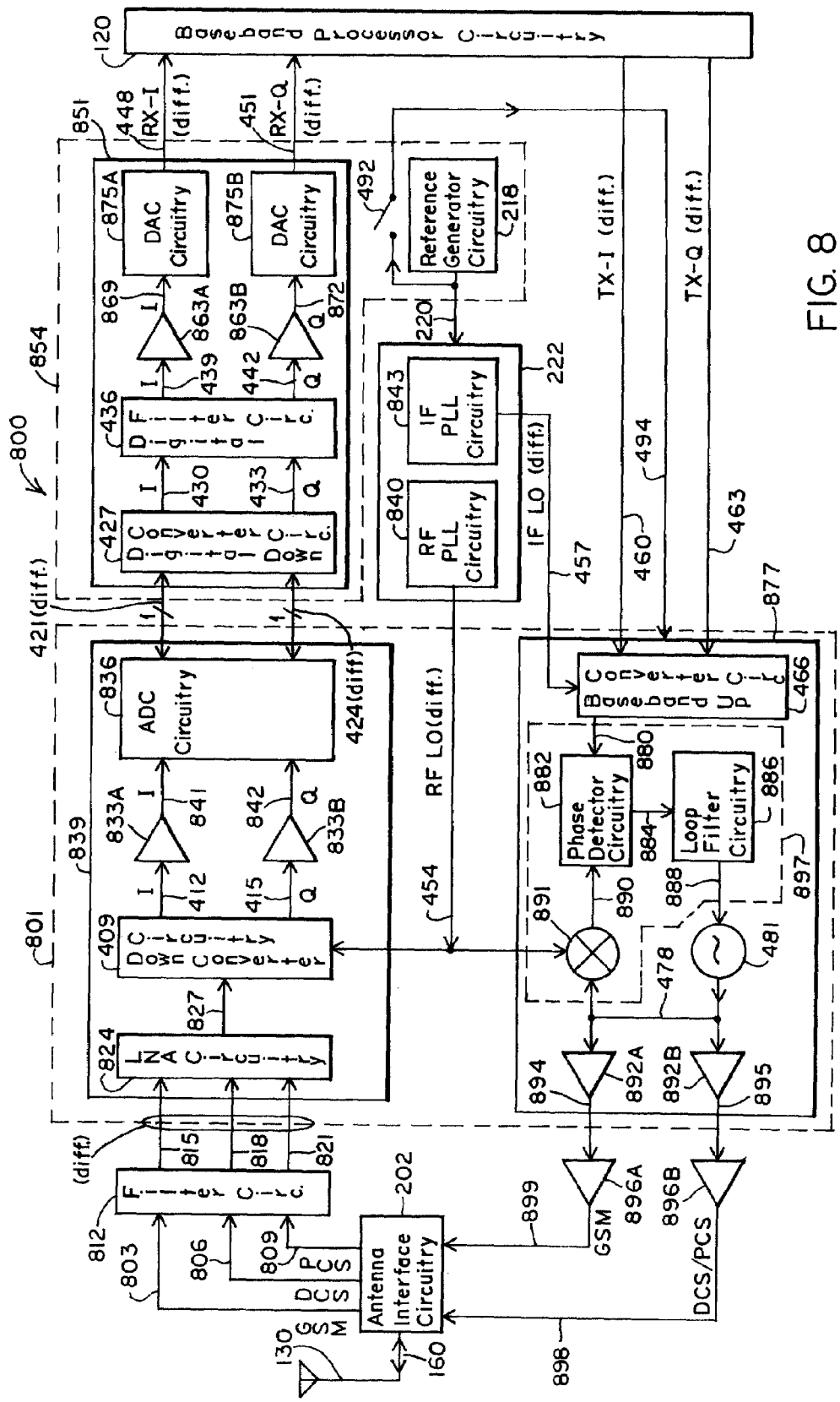
FIG. 8 illustrates a more detailed block diagram of a multi-band RF transceiver circuitry partitioned according to the invention.

FIG. 8 shows an embodiment 800 of a multi-band RF transceiver, partitioned according to the invention. Preferably, the RF transceiver in FIG. 8 operates within the GSM (925 to 960 MHz for reception and 880–915 MHz for transmission), PCS (1930 to 1990 MHz for reception and 1850–1910 MHz for transmission), and DCS (1805 to 1880 MHz for reception and 1710–1785 MHz for transmission) bands. Like the RF transceiver in FIG. 4, the RF transceiver in FIG. 8 uses a low-IF architecture. The embodiment 800 includes receiver analog circuitry 839, receiver digital circuitry 851, transmitter circuitry 877, local oscillator circuitry 222, and reference generator circuitry 218. The local oscillator circuitry 222 includes RF phase-lock loop (PLL) circuitry 840 and intermediate-frequency (IF) PLL circuitry 843. The RF PLL circuitry 840 produces the RF local oscillator, or RF LO, signal 454, whereas the IF PLL circuitry 843 produces the IF local oscillator, or IF LO, signal 457.

Table 1 below shows the preferred frequencies for the RF local oscillator signal 454 during the receive mode:

TABLE 1

| Band | RF Local Oscillator Frequency (MHz) |
|---|---|
| GSM | 1849.8–1919.8 |
| DCS | 1804.9–1879.9 |
| PCS | 1929.9–1989.9 |
| All Bands | 1804.9–1989.9 |

Table 2 below lists the preferred frequencies for the RF local oscillator signal 454 during the transmit mode:

TABLE 2

| Band | RF Local Oscillator Frequency (MHz) |
|---|---|
| GSM | 1279–1314 |
| DCS | 1327–1402 |
| PCS | 1423–1483 |
| All Bands | 1279–1483 |

During the receive mode, the IF local oscillator signal 457 is preferably turned off. In preferred embodiments, during the transmit mode, the IF local oscillator signal 457 preferably has a frequency between 383 MHz and 427 MHz. Note, however, that one may use other frequencies for the RF and IF local oscillator signals 454 and 457, as desired.

The reference generator 218 provides a reference signal 220 that preferably comprises a clock signal, although one may use other signals, as persons skilled in the art who have the benefit of the description of the invention understand.

Moreover, the transmitter circuitry 877 preferably uses high-side injection for the GSM band and low-side injection for the DCS and PCS bands.

The receive path circuitry operates as follows. Filter circuitry 812 accepts a GSM RF signal 803, a DCS RF signal 806, and a PCS RF signal 809 from the antenna interface circuitry 202. The filter circuitry 812 preferably contains a surface-acoustic-wave (SAW) filter for each of the three bands, although one may use other types and numbers of filters, as desired. The filter circuitry 812 provides a filtered GSM RF signal 815, a filtered DCS RF signal 818, and a filtered PCS RF signal 821 to low-noise amplifier (LNA) circuitry 824. The LNA circuitry 824 preferably has programmable gain, and in part provides for programmable gain in the receive path circuitry.

The LNA circuitry 824 provides an amplified RF signal 827 to down-converter circuitry 409. In exemplary embodiments according to the invention, amplified RF signal 827 includes multiple signal lines, which may be differential signal lines, to accommodate the GSM, DCS, and PCS bands. Note that, rather than using the LNA circuitry with a real output, one may use an LNA circuitry that has complex outputs (in-phase and quadrature outputs), together with a poly-phase filter circuitry. The combination of the complex LNA circuitry and the poly-phase filter circuitry provides better image rejection, albeit with a somewhat higher loss. Thus, the choice of using the complex LNA circuitry and the poly-phase filter circuitry depends on a trade-off between image rejection and loss in the poly-phase filter circuitry.

The down-converter circuitry 409 mixes the amplified RF signal 827 with the RF local oscillator signal 454, which it receives from the RF PLL circuitry 840. The down-converter circuitry 409 produces the in-phase analog down-converted signal 412 and the quadrature in-phase analog down-converted signal 415. The down-converter circuitry 409 provides the in-phase analog down-converted signal 412 and the quadrature in-phase analog down-converted signal 415 to a pair of programmable-gain amplifiers (PGAs) 833A and 833B.

The PGA 833A and PGA 833B in part allow for programming the gain of the receive path. The PGA 833A and the PGA 833B supply an analog in-phase amplified signal 841 and an analog quadrature amplified signal 842 to complex ADC circuitry 836 (i.e., both I and Q inputs will affect both I and Q outputs). The ADC circuitry 836 converts the analog in-phase amplified signal 841 into a one-bit in-phase digital receive signal 421. Likewise, the ADC circuitry 836 converts the analog quadrature amplifier signal 842 into a one-bit quadrature digital receive signal 424.

Note that RF transceivers and receivers according to the invention preferably use a one-bit digital interface. One may, however, use a variety of other interfaces, as persons skilled in the art who have the benefit of the description of the invention understand. For example, one may use a multi-bit interface or a parallel interface. Moreover, as described below, rather than, or in addition to, providing the one-bit in-phase and quadrature digital receive signals to the receiver digital circuitry 851, the digital interface between the receiver analog circuitry 839 and the receiver digital circuitry 851 may communicate various other signals. By way of illustration, those signals may include reference signals (e.g., clock signals), control signals, logic signals, hand-shaking signals, data signals, status signals, information signals, flag signals, and/or configuration signals. Furthermore, the signals may constitute single-ended or differential signals, as desired. Thus, the interface provides a flexible communication mechanism between the receiver analog circuitry and the receiver digital circuitry.

The receiver digital circuitry 851 accepts the one-bit in-phase digital receive signal 421 and the one-bit quadrature digital receive signal 424, and provides them to the digital down-converter circuitry 427. The digital down-converter circuitry 427 converts the received signals into a down-converted in-phase signal 430 and a down-converted quadrature signal 433 and provides those signals to the digital filter circuitry 436. The digital filter circuitry 436 preferably comprises an IIR channel-select filter that performs filtering operations on its input signals. Note, however, that one may use other types of filters, for example, FIR filters, as desired.

The digital filter circuitry 436 provides the digital in-phase filtered signal 439 to a digital PGA 863A and the digital quadrature filtered signal 442 to a digital PGA 863B. The digital PGA 863A and PGA 863B in part allow for programming the gain of the receive path circuitry. The digital PGA 863A supplies an amplified digital in-phase signal 869 to DAC circuitry 875A, whereas the digital PGA 863B supplies an amplified digital quadrature signal 872 to DAC circuitry 875B. The DAC circuitry 875A converts the amplified digital in-phase signal 869 to the in-phase analog receive signal 448. The DAC circuitry 875B converts the amplified digital quadrature signal 872 signal into the quadrature analog receive signal 451. The baseband processor circuitry 120 accepts the in-phase analog receive signal 448 and the quadrature analog receive signal 451 for further processing, as desired.

Note that the digital circuit blocks shown in the receiver digital circuitry 851 depict mainly the conceptual functions and signal flow. The actual digital-circuit implementation may or may not contain separately identifiable hardware for the various functional blocks. For example, one may re-use (in time, for instance, by using multiplexing) the same digital circuitry to implement both digital PGA 863A and digital PGA 863B, as desired.

Note also that, similar to the RF transceiver in FIG. 4, the RF transceiver in FIG. 8 features a digital-IF architecture. The digital-IF architecture facilitates the implementation of the one-bit digital interface between the receiver digital circuitry 426 and the receiver analog circuitry 408. Moreover, the digital-IF architecture allows digital (rather than analog) IF-filtering, thus providing all of the advantages of digital filtering.

The transmitter circuitry 877 comprises baseband up-converter circuitry 466, transmit VCO circuitry 481, a pair of transmitter output buffers 892A and 892B, and offset PLL circuitry 897. The offset PLL circuitry 897 includes offset mixer circuitry 891, phase detector circuitry 882, and loop filter circuitry 886. The baseband up-converter circuitry 466 accepts the analog in-phase transmit input signal 460 and the analog quadrature transmit input signal 463, mixes those signals with the IF local oscillator signal 457, and provides a transmit IF signal 880 to the offset PLL circuitry 897. The offset PLL circuitry 897 uses the transmit IF signal 880 as a reference signal. The transmit IF signal 880 preferably comprises a modulated single-sideband IF signal but, as persons skilled in the art who have the benefit of the description of the invention understand, one may use other types of signal and modulation, as desired.

The offset mixer circuitry 891 in the offset PLL circuitry 897 mixes the transmit VCO output signal 478 with the RF local oscillator signal 454, and provides a mixed signal 890 to the phase detector circuitry 882. The phase detector circuitry 882 compares the mixed signal 890 to the transmit IF signal 880 and provides an offset PLL error signal 884 to the loop filter circuitry 886. The loop filter circuitry 886 in turn provides a filtered offset PLL signal 888 to the transmit VCO circuitry 481. Thus, the offset PLL circuitry 897 and the transmit VCO circuitry 481 operate in a feedback loop. Preferably, the output frequency of the transmit VCO circuitry 481 centers between the DCS and PCS bands, and its output is divided by two for the GSM band.

Transmitter output buffers 892A and 892B receive the transmit VCO output signal 478 and provide buffered transmit signals 894 and 895 to a pair of power amplifiers 896A and 896B. The power amplifiers 896A and 896B provide amplified RF signals 899 and 898, respectively, for transmission through antenna interface circuitry 202 and the antenna 130. Power amplifier 896A provides the RF signal 899 for the GSM band, whereas power amplifier 896B supplies the RF signal 898 for the DCS and PCS bands. Persons skilled in the art who have the benefit of the description of the invention, however, understand that one may use other arrangements of power amplifiers and frequency bands. Moreover, one may use RF filter circuitry within the output path of the transmitter circuitry 877, as desired.

The embodiment 800 comprises three circuit partitions, or circuit blocks. A first circuit partition 801 includes the receiver analog circuitry 839 and the transmitter circuitry 877. A second circuit partition 854 includes the receiver digital circuitry 851 and the reference generator circuitry 218. Finally, a third circuit partition comprises the local oscillator circuitry 222. The first circuit partition 801, the second circuit partition 854, and the third circuit partition are partitioned from one another so that interference effects among the circuit partitions tend to be reduced. That arrangement tends to reduce the interference effects among the circuit partitions because of the analysis of interference effects provided above in connection with FIG. 3. Preferably, the first, second, and third circuit partitions each reside within an integrated circuit device. To further reduce interference effects among the circuit partitions, the embodiment 800 in FIG. 8 uses differential signals wherever possible. The notation "(diff.)" adjacent to signal lines or reference numerals in FIG. 8 denotes the use of differential lines to propagate the annotated signals.

Note that, similar to the RF transceiver shown in FIG. 4 and described above, the embodiment 800 shown in FIG. 8 uses an analog-digital-analog signal path in its receiver section. The embodiment 800 uses this particular signal path for reasons similar to those described above in connection with the transceiver shown in FIG. 4.

Like the transceiver in FIG. 4, if the receiver digital circuitry 851 need not be compatible with the common analog interface to baseband processors, one may remove the DAC circuitry 875A and 875B, and use a digital interface to the baseband processor circuitry 120, as desired. In fact, similar to the RF transceiver shown in FIG. 2D, one may realize the function of the receiver digital circuitry 851 within the baseband processor circuitry 120, using hardware, software, or a combination of hardware and software. In that case, the RF transceiver would include two circuit partitions, or circuit blocks. The first circuit partition 801 would include the receiver analog circuitry 839 and the transmitter circuitry 877. A second circuit partition would comprise the local oscillator circuitry 222. Note also that, similar to the RF transceiver shown in FIG. 2C, in the embodiment 800, one may include within the baseband processor circuitry 120 the functionality of the reference generator circuitry 218, as desired.

Another aspect of the invention includes a configurable interface between the receiver digital circuitry and the receiver analog circuitry. Generally, one would seek to minimize digital switching activity within the receiver analog circuitry. Digital switching activity within the receiver analog circuitry would potentially interfere with the sensitive analog RF circuitry, for example, LNAs, or mixers. As described above, the receiver analog circuitry includes analog-to-digital circuitry (ADC), which preferably comprises sigma-delta-type ADCs. Sigma-delta ADCs typically use a clock signal at their output stages that generally has a pulse shape and, thus, contains high-frequency Fourier series harmonics. Moreover, the ADC circuitry itself produces digital outputs that the receiver digital circuitry uses. The digital switching present at the outputs of the ADC circuitry may also interfere with sensitive analog circuitry within the receiver analog circuitry.

Figure 9A:
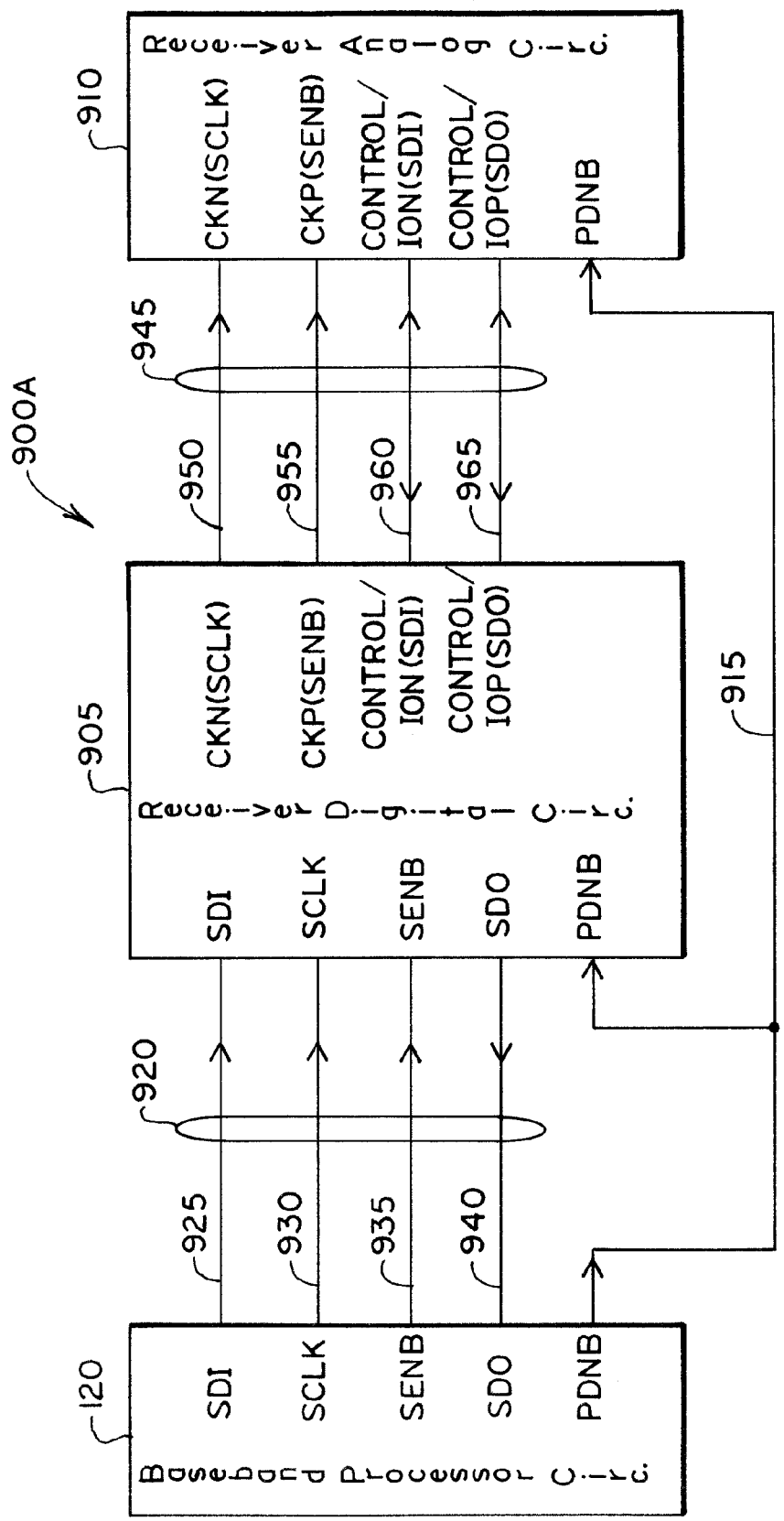
FIG. 9A shows a block diagram of an embodiment of the interface between the receiver digital circuitry and receiver analog circuitry in an RF transceiver according to the invention.

The invention contemplates providing RF apparatus according to the invention, for example, receivers and transceivers, that include an interface circuitry to minimize or reduce the effects of interference from digital circuitry within the RF apparatus. FIG. 9A shows an embodiment 900A of an interface between the receiver digital circuitry 905 and the receiver analog circuitry 910. The interface includes configurable interface signal lines 945. The baseband processor circuitry 120 in the transceiver of FIG. 9A communicates configuration, status, and setup information with both the receiver digital circuitry 905 and the receiver analog circuitry 910. In the preferred embodiments of RF transceivers according to the invention, the baseband processor circuitry 120 communicates with the receiver digital circuitry 905 and the receiver analog circuitry 910 by sending configuration data to read and write registers included within the receiver digital circuitry 905 and the receiver analog circuitry 910.

The receiver digital circuitry 905 communicates with the baseband processor circuitry 120 through a set of serial interface signal lines 920. The serial interface signal lines 920 preferably include a serial data-in (SDI) signal line 925, a serial clock (SCLK) signal line 930, a serial interface enable (SENB) signal line 935, and a serial data-out (SDO) signal line 940. The transceiver circuitry and the baseband processor circuitry 120 preferably hold all of the serial interface signal lines 920 at static levels during the transmit and receive modes of operation. The serial interface preferably uses a 22-bit serial control word that comprises 6 address bits and 16 data bits. Note, however, that one may use other serial interfaces, parallel interfaces, or other types of interfaces, that incorporate different numbers of signal lines, different types and sizes of signals, or both, as desired. Note also that, the SENB signal is preferably an active-low logic signal, although one may use a normal (i.e., an active-high) logic signal by making circuit modifications, as persons skilled in the art understand.

The receiver digital circuitry 905 communicates with the receiver analog circuitry 910 via configurable interface signal lines 945. Interface signal lines 945 preferably include four configurable signal lines 950, 955, 960, and 965, although one may use other numbers of configurable signal lines, as desired, depending on a particular application. In addition to supplying the serial interface signals 920, the baseband processor circuitry 120 provides a control signal 915, shown as a power-down (PDNB) signal in FIG. 9A, to both the receiver digital circuitry 905 and the receiver analog circuitry 910. The receiver digital circuitry 905 and the receiver analog circuitry 910 preferably use the power-down (PDNB) signal as the control signal 915 to configure the functionality of the interface signal lines 945. In other words, the functionality of the interface signal lines 945 depends on the state of the control signal 915. Also, the initialization of the circuitry within the receive path and the transmit path of the transceiver occurs upon the rising edge of the PDNB signal. Note that the PDNB signal is preferably an active-low logic signal, although one may use a normal (i.e., an active-high) logic signal, as persons skilled in the art would understand. Note also that, rather than using the PDNB signal, one may use other signals to control the configuration of the interface signal lines 945, as desired.

In the power-down or serial interface mode (i.e., the control signal 915 (for example, PDNB) is in the logic low state), interface signal line 950 provides the serial clock (SCLK) and interface signal line 955 supplies the serial interface enable signal (SENB). Furthermore, interface signal line 960 provides the serial data-in signal (SDI), whereas interface signal line 965 supplies the serial data-out (SDO) signal. One may devise other embodiments according to the invention in which, during this mode of operation, the transceiver may also perform circuit calibration and adjustment procedures, as desired (for example, the values of various transceiver components may vary over time or among transceivers produced in different manufacturing batches. The transceiver may calibrate and adjust its circuitry to take those variations into account and provide higher performance).

In the normal receive mode of operation (i.e., the control signal, PDNB, is in the logic-high state), interface signal line 950 provides a negative clock signal (CKN) and interface signal line 955 supplies the positive clock signal (CKP). Furthermore, interface signal line 960 provides a negative data signal (ION), whereas interface signal line 965 supplies a positive data signal (IOP).

In preferred embodiments of the invention, the CKN and CKP signals together form a differential clock signal that the receiver digital circuitry 905 provides to the receiver analog circuitry 910. The receiver analog circuitry 910 may provide the clock signal to the transmitter circuitry within the RF transceiver in order to facilitate calibration and adjustment of circuitry, as described above. During the receive mode, the receiver analog circuitry 910 provides the ION and IOP signals to the receiver digital circuitry 905. The ION and IOP signals preferably form a differential data signal. As noted above, the transceiver disables the transmitter circuitry during the receive mode of operation.

In preferred embodiments according to the invention, clock signals CKN and CKP are turned off when the transmitter circuitry is transmitting signals. During the transmit mode, interface signal lines 960 and 965 preferably provide two logic signals from the receiver digital circuitry 905 to the receiver analog circuitry 910. The signal lines may provide input/output signals to communicate data, status, information, flag, and configuration signals between the receiver digital circuitry 905 and the receiver analog circuitry 910, as desired. Preferably, the logic signals control the output buffer of the transmit VCO circuitry. Note that, rather than configuring interface signal lines 960 and 965 as logic signal lines, one may configure them in other ways, for example, analog signal lines, differential analog or digital signal lines, etc., as desired. Furthermore, the interface signal lines 960 and 965 may provide signals from the receiver digital circuitry 905 to the receiver analog circuitry 910, or vice-versa, as desired.

In addition to using differential signals, RF transceivers according to the invention preferably take other measures to reduce interference effects among the various transceiver circuits. Signals CKN, CKP, ION, and IOP may constitute voltage signals, as desired. Depending on the application, the signals CKN, CKP, ION, and IOP (or logic signals in the transmit mode) may have low voltage swings (for example, voltage swings smaller than the supply voltage) to reduce the magnitude and effects of interference because of the voltage switching on those signals.

In preferred embodiments according to the invention, signals CKN, CKP, ION, and IOP constitute current, rather than voltage, signals. Moreover, to help reduce the effects of interference even further, RF transceivers according to the invention preferably use band-limited signals. RF transceivers according to the invention preferably use filtering to remove some of the higher frequency harmonics from those signals to produce band-limited current signals.

Table 3 below summarizes the preferred functionality of the configurable interface signal lines 950, 955, 960, and 965 as a function of the state of the control signal 915 (for example, PDNB):

TABLE 3

| Signal Line | Control = 0 | Control = 1 (During Reception) | Control = 1 (During Transmission) |
| --- | --- | --- | --- |
| 950 | SCLK | CKN | (CKN off) |
| 955 | SENB | CKP | (CKP off) |
| 960 | SDI | ION | Logic Signal |
| 965 | SDO | IOP | Logic Signal |

Using configurable interface signal lines 945 in the interface between the receiver digital circuitry 905 and the receiver analog circuitry 910 allows using the same physical connections (e.g., pins on an integrated-circuit device or electrical connectors on a module) to accomplish different functionality. Thus, the configurable interface between the receiver digital circuitry 905 and the receiver analog circuitry 910 makes available the physical electrical connections available for other uses, for example, providing ground pins or connectors around sensitive analog signal pins or connectors to help shield those signals from RF interference. Moreover, the configurable interface between the receiver digital circuitry 905 and the receiver analog circuitry 910 reduces packaging size, cost, and complexity.

Figure 9B:
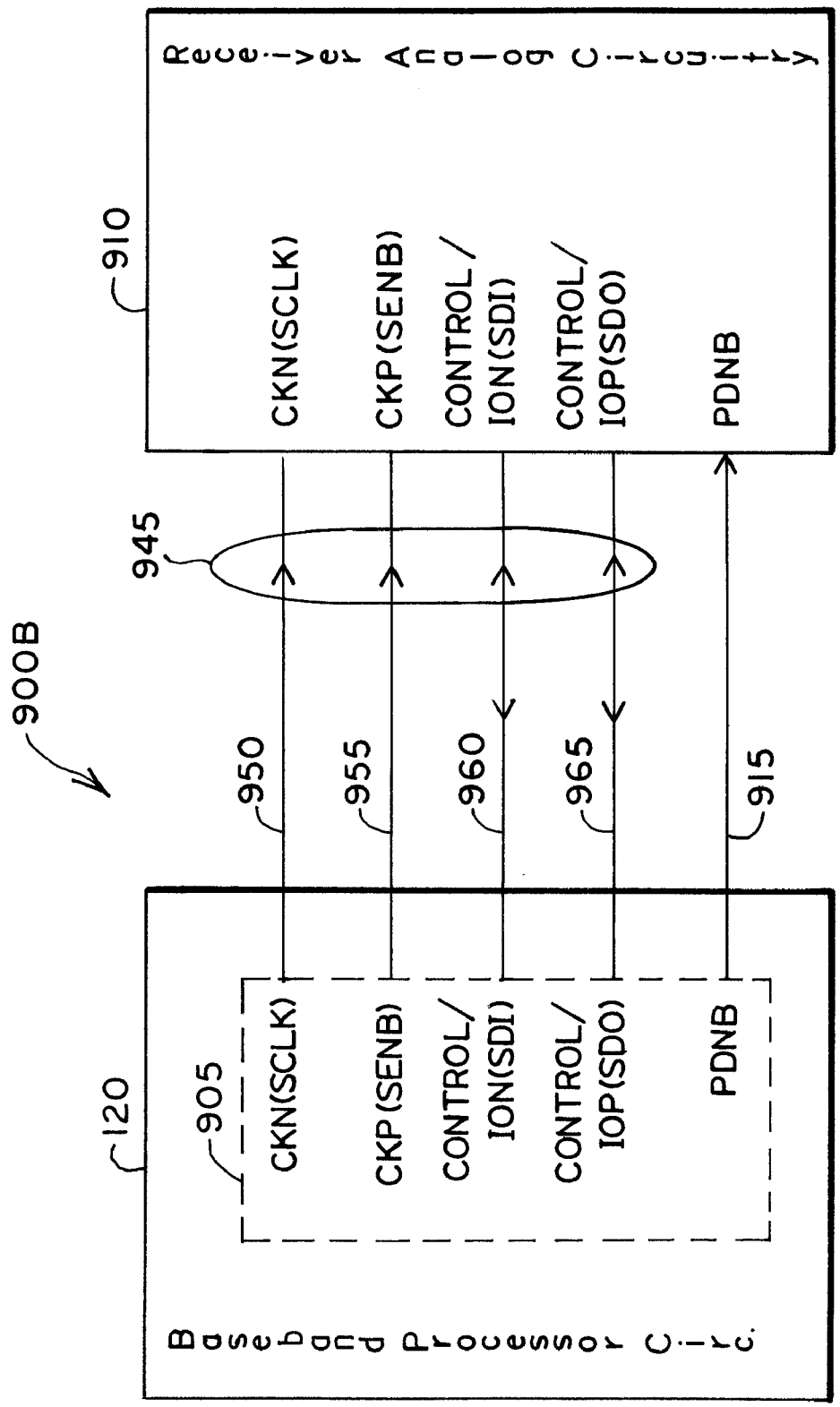
FIG. 9B depicts a block diagram of another embodiment of the interface between the baseband processor circuitry and the receiver analog circuitry in an RF transceiver according to the invention, in which the receiver digital circuitry resides within the baseband processor circuitry.

FIG. 9B shows an embodiment 900B that includes a configurable interface according to the invention. Here, the baseband processor circuitry 120 subsumes the functionality of the receiver digital circuitry 905. The baseband processor circuitry 120 realizes the functionality of the receiver digital circuitry 905, using hardware, software, or both, as desired. Because the baseband processor circuitry 120 has subsumed the receiver digital circuitry 905, the baseband processor circuitry 120 may communicate with the receiver analog circuitry 910 using configurable interface signal lines 945, depending on the state of the control signal 915 (e.g., the PDNB signal). The configurable interface signal lines 945 perform the same functions described above in connection with FIG. 9A, depending on the state of the control signal 915. As noted above, one may reconfigure the interface signal lines 960 and 965 during transmit mode to implement desired functionality, for example, logic signals.

Figure 10:
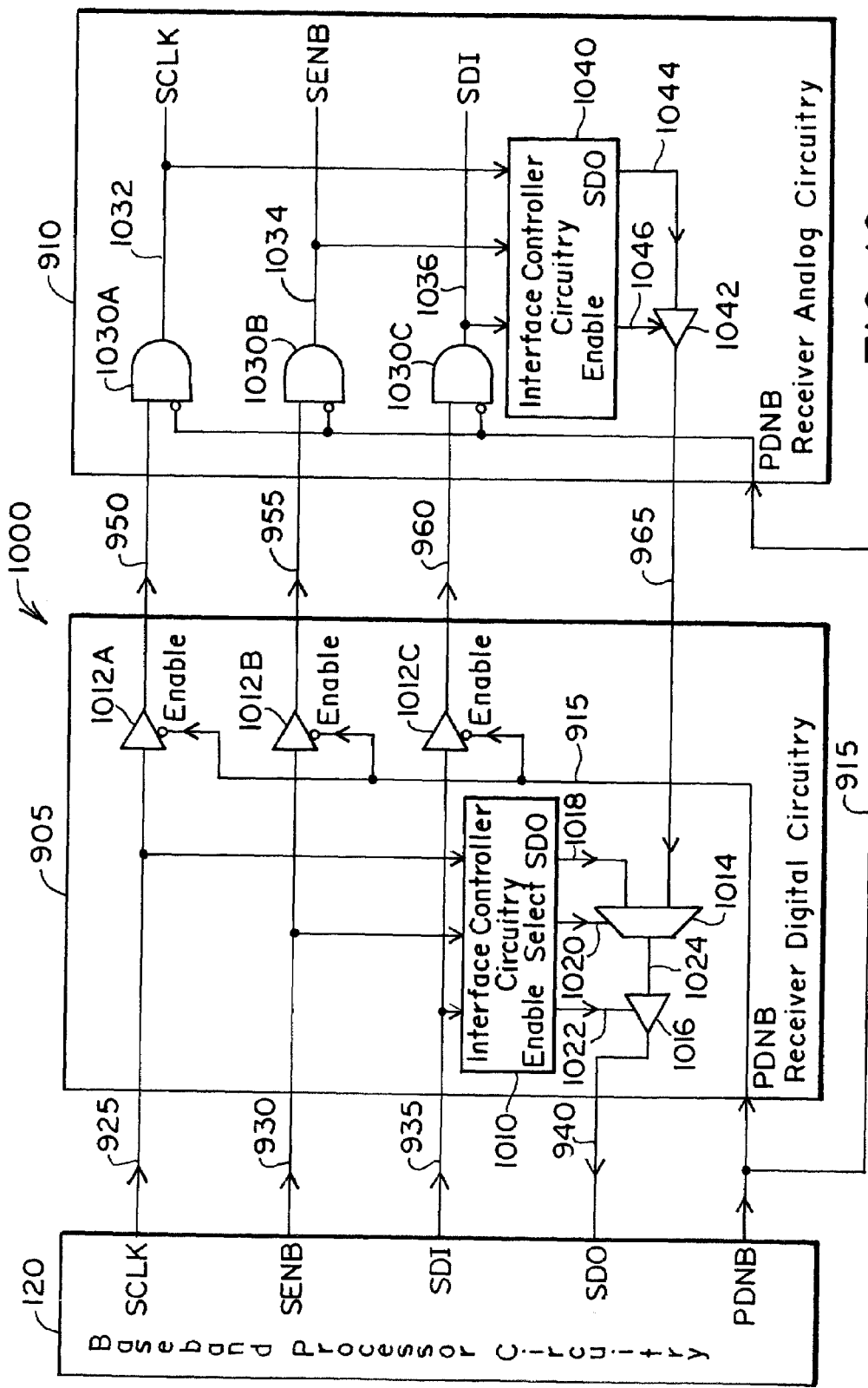
FIG. 10 illustrates a more detailed block diagram of the interface between the receiver analog circuitry and the receiver digital circuitry, with the interface configured as a serial interface.

FIG. 10 shows a conceptual block diagram of an embodiment 1000 of a configurable interface according to the invention within an RF transceiver in the power-down or serial interface mode (i.e., the control signal 915 is in a logic-low state). A logic low state on the control signal 915 enables the driver circuitry 1012A, 1012B, and 1012C, thus providing the configurable serial interface signal lines 950, 955, and 960 to the receiver analog circuitry 910. Similarly, the logic low state on the control signal 915 causes the AND gates 1030A, 1030B, and 1030C to provide configurable interface signal lines 950, 955, and 960 to other circuitry within the receiver analog circuitry 910. The outputs of the AND gates 1030A, 1030B, and 1030C comprise a gated SCLK signal 1032, a gated SENB signal 1034, and a gated SDI signal 1036, respectively.

Interface controller circuitry 1040 accepts as inputs the gated SCLK signal 1032, the gated SENB signal 1034, and the gated SDI signal 1036. The interface controller circuitry 1040 resides within the receiver analog circuitry 910 and produces a receiver analog circuitry SDO signal 1044 and an enable signal 1046. By controlling tri-state driver circuitry 1042, the enable signal 1046 controls the provision of the receiver analog circuitry SDO signal 1044 to the receiver digital circuitry 905 via the configurable interface signal line 965.

Interface controller circuitry 1010 within the receiver digital circuitry 905 accepts the SCLK signal 925, the SENB signal 930, and the SDI signal 935 from the baseband processor circuitry 120. By decoding those signals, the interface controller circuitry 1010 determines whether the baseband processor circuitry 120 intends to communicate with the receiver digital circuitry 905 (e.g., the baseband processor circuitry 120 attempts to read a status or control register present on the receiver digital circuitry 905). If so, the interface controller circuitry 1010 provides the SCLK signal 925, the SENB signal 930, and the SDI signal 935 to other circuitry (not shown explicitly) within the receiver digital circuitry 905 for further processing.

Interface controller circuitry 1010 provides as output signals a receiver digital circuitry SDO signal 1018, a select signal 1020, and an enable signal 1022. The receiver digital circuitry SDO signal 1018 represents the serial data-out signal for the receiver digital circuitry 905, i.e., the serial data-out signal that the receiver digital circuitry 905 seeks to provide to the baseband processor circuitry 120. The interface controller circuitry 1010 supplies the select signal 1020 to multiplexer circuitry 1014. The multiplexer circuitry 1014 uses that signal to selectively provide as the multiplexer circuitry output signal 1024 either the receiver digital circuitry SDO signal 1018 or the receiver analog circuitry SDO signal 1044, which it receives through configurable interface signal line 965. Tri-state driver circuitry 1016 provides the multiplexer circuitry output signal 1024 to the baseband processor circuitry 120 under the control of the enable signal 1022.

Tri-state driver circuitry 1012A, 1012B, and 1012C use an inverted version of the control signal 915 as their enable signals. Thus, a logic high value on the control signal 915 disables the driver circuitry 1012A, 1012B, and 1012C, thus disabling the serial interface between the receiver digital circuitry 905 and the receiver analog circuitry 910. Similarly, AND gates 1030A, 1030B, and 1030C use an inverted version of the control signal 915 to gate interface signal lines 950, 955, and 960. In other words, a logic high value on the control signal 915 inhibits logic switching at the outputs of AND gates 1030A, 1030B, and 1030C, which reside on the receiver analog circuitry 910.

Figure 11A:
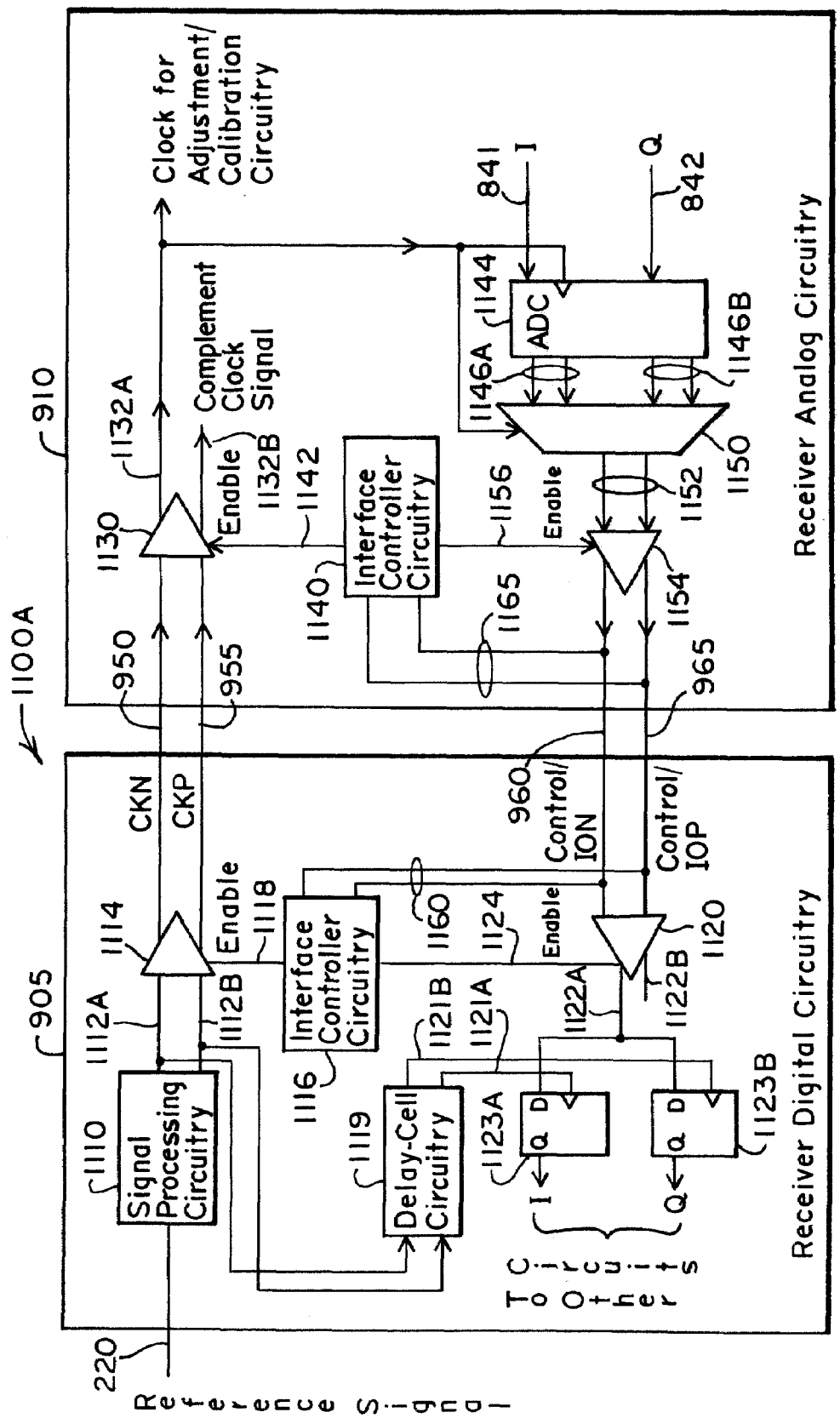
FIG. 11A shows a more detailed block diagram of an embodiment of the interface between the receiver analog circuitry and the receiver digital circuitry, with the interface configured as a data and clock signal interface.

FIG. 11A shows a conceptual block diagram of an embodiment 1100A of a configurable interface according to the invention, in an RF transceiver operating in the normal receive mode of operation (i.e., the control signal 915 is in a logic-high state). As noted above, in this mode, the receiver digital circuitry 905 provides a clock signal to the receiver analog circuitry 910 through the configurable interface signal lines 950 and 955. Configurable interface signal line 950 provides the CKN signal, whereas configurable interface signal line 955 supplies the CKP signal. Also in this mode, the receiver analog circuitry 910 provides a data signal to the receiver digital circuitry 905 through the configurable interface signal lines 960 and 965.

The receiver digital circuitry 905 provides the CKN and CKP signals to the receiver analog circuitry 910 by using clock driver circuitry 1114. The clock driver circuitry 1114 receives a clock signal 1112A and a complement clock signal 1112B from signal processing circuitry 1110. Signal processing circuitry 1110 receives the reference signal 220 and converts it to the clock signal 1112A and complement clock signal 1112B. Interface controller circuitry 1116 provides an enable signal 1118 that controls the provision of the CKN and CKP clock signals to the receiver analog circuitry 910 via the interface signal lines 950 and 955, respectively.

Receiver analog circuitry 910 includes clock receiver circuitry 1130 that receives the CKN and CKP clock signals and provides a clock signal 1132A and a complement clock signal 1132B. Interface controller circuitry 1140 within the receiver analog circuitry 910 provides an enable signal 1142 that controls the operation of the clock receiver circuitry 1130. The clock signal 1132A clocks the ADC circuitry 1144, or other circuitry (for example, calibration circuitry), or both, as desired. Note that, rather than using the clock signal 1132A, one may use the complement clock signal 1132B, or both the clock signal 1132A and the complement clock signal 1132B, by making circuit modifications as persons skilled who have the benefit of the description of the invention understand. The ADC circuitry 1144 provides to multiplexer circuitry 1150 a one-bit differential in-phase digital signal 1146A and a one-bit differential quadrature digital signal 1146B. The multiplexer circuitry 1150 provides a one-bit differential digital output signal 1152 to data driver circuitry 1154. The output signal 1152 therefore constitutes multiplexed I-channel data and Q-channel data. The data driver circuitry 1154 supplies the differential data signal comprising ION and IOP to the receiver digital circuitry 905, using the configurable interface signal lines 960 and 965, respectively.

The clock signal 1132A also acts as the select signal of multiplexer circuitry 1150. On alternating edges of the clock signal 1132A, the multiplexer circuitry 1150 selects, and provides to, the data driver circuitry 1154 the one-bit differential in-phase digital signal 1146A (i.e., I-channel data) and the one-bit differential quadrature digital signal 1146B (i.e., Q-channel data). The interface controller circuitry 1140 supplies an enable signal 1156 to the data driver circuitry 1154 that controls the provision of the configurable interface signal 960 and the configurable interface signal 965 to the receiver digital circuitry 905 via the configurable interface signal lines 960 and 965.

The receiver digital circuitry 905 includes data receiver circuitry 1120. Data receiver circuitry 1120 accepts from the receiver analog circuitry 910 the signals provided via the configurable interface signal lines 960 and 965. The data receiver circuitry 1120 provides a pair of outputs 1122A and 1122B. An enable signal 1124, supplied by the interface controller circuitry 1116, controls the operation of the data receiver circuitry 1120.

The receiver digital circuitry 905 also includes a delay-cell circuitry 1119 that accepts as its inputs the clock signal 1112A and the complement clock signal 1112B. The delay-cell circuitry 1119 constitutes a delay-compensation circuit. In other words, ideally, the signal-propagation delay of the delay-cell circuitry 1119 compensates for the delays the signals experience as they propagate from the receiver digital circuitry 905 to the receiver analog circuitry 910, and back to the receiver digital circuitry 905.

The delay-cell circuitry 1119 provides as its outputs a clock signal 1121A and a complement clock signal 1121B. The clock signal 1121A and the complement clock signal 1121B clock a pair of D flip-flop circuitries 1123A and 1123B, respectively. The D flip-flop circuitries 1123A and 1123B latch the output 1122A of the data receiver circuitry 1120 alternately. In other words, the clock signal 1121A causes the latching of the I-channel data by the D flip-flop circuitry 1123A, whereas the complement clock signal 1121B causes the D flip-flop circuitry 1123B to latch the Q-channel data.

The output signals of the delay-cell circuitry 1119 help the receiver digital circuitry 905 to sample the I-channel data and the Q-channel data that it receives from the receiver analog circuitry 910. The receiver digital circuitry 905 receives multiplexed I-channel data and the Q-channel data through the ION signal 960 and the IOP signal 965. Thus, the D flip-flop circuitries 1123A and 1123B perform a de-multiplexing function on the multiplexed I-channel data and Q-channel data.

In the normal receive or transmit modes, (i.e., the control signal 915 is in the logic-high state), interface signal line 950 provides the negative clock signal (CKN) and interface signal line 955 supplies the positive clock signal (CKP). In preferred embodiments of the invention, the CKN and CKP signals together form a differential clock signal that the receiver digital circuitry 905 provides to the receiver analog circuitry 910.

During the receive mode, interface signal line 960 provides the negative data signal (ION), whereas interface signal line 965 supplies the positive data signal (IOP). The ION and IOP signals preferably form a differential data signal.

In the transmit mode, the data signal may function as an input/output signal to communicate data, status, information, flag, and/or configuration signals between the receiver digital circuitry 905 and the receiver analog circuitry 910. Preferably, the interface signal lines 960 and 965 function as two logic signal lines in the transmit mode. As noted above, the transceiver disables the receiver circuitry during the transmit mode of operation. In RF transceivers partitioned according to the invention (see, e.g., FIGS. 2A–2D, 4, and 8), the clock receiver circuitry 1130 may provide the clock signal 1132A, the complement clock signal 1132B, or both, to transmitter circuitry (partitioned together with the receiver analog circuitry 910) for circuit calibration, circuit adjustment, and the like, as described above.

In the transmit mode, once circuit calibration and adjustment has concluded, however, the clock driver circuitry 1114 uses the enable signal 1118 to inhibit the propagation of the CKN and CKP clock signals to the receiver analog circuitry 910. In this manner, the clock driver circuitry 1114 performs the function of the switch 492 in FIGS. 4 and 8. Note that, during the normal transmit mode of operation, the ADC circuitry 1144 does not provide any data to the receiver digital circuitry 905 via the ION and IOP signals because, according to the TDD protocol, the receiver path circuitry is inactive during the normal transmit mode of operation. Instead, the receiver digital circuitry 905 provides control signals to the receiver analog circuitry 910 via interface signal lines 960 and 965.

During the transmit mode, the interface controller circuitry 1116 provides control signals via signal lines 1160 to the interface signal lines 960 and 965. The interface controller circuitry 1140 receives the control signals via signal lines 1165 and provides them to various blocks within the receiver analog circuitry, as desired. During the receive mode, the interface controller circuitry 1116 inhibits (e.g., high-impedance state) the signal lines 1160. Similarly, the interface controller circuitry 1140 inhibits the signal lines 1165 during the receive mode.

For the purpose of conceptual illustration, FIG. 11A shows the interface controller circuitry 1116 and the interface controller circuitry 1140 as two blocks of circuitry distinct from the interface controller circuitry 1010 and the interface controller circuitry 1040 in FIG. 10, respectively. One may combine the functionality of the interface controller circuitry 1116 with the functionality of the interface controller circuitry 1010, as desired. Likewise, one may combine the functionality of interface controller circuitry 1140 with the functionality of the interface controller circuitry 1040, as desired. Moreover, one may combine the functionality of the signal processing circuitries 1110 with the functionality of the interface controller circuitry 1116 and the interface controller circuitry 1140, respectively. Combining the functionality of those circuits depends on various design and implementation choices, as persons skilled in the art understand.

Figure 11B:
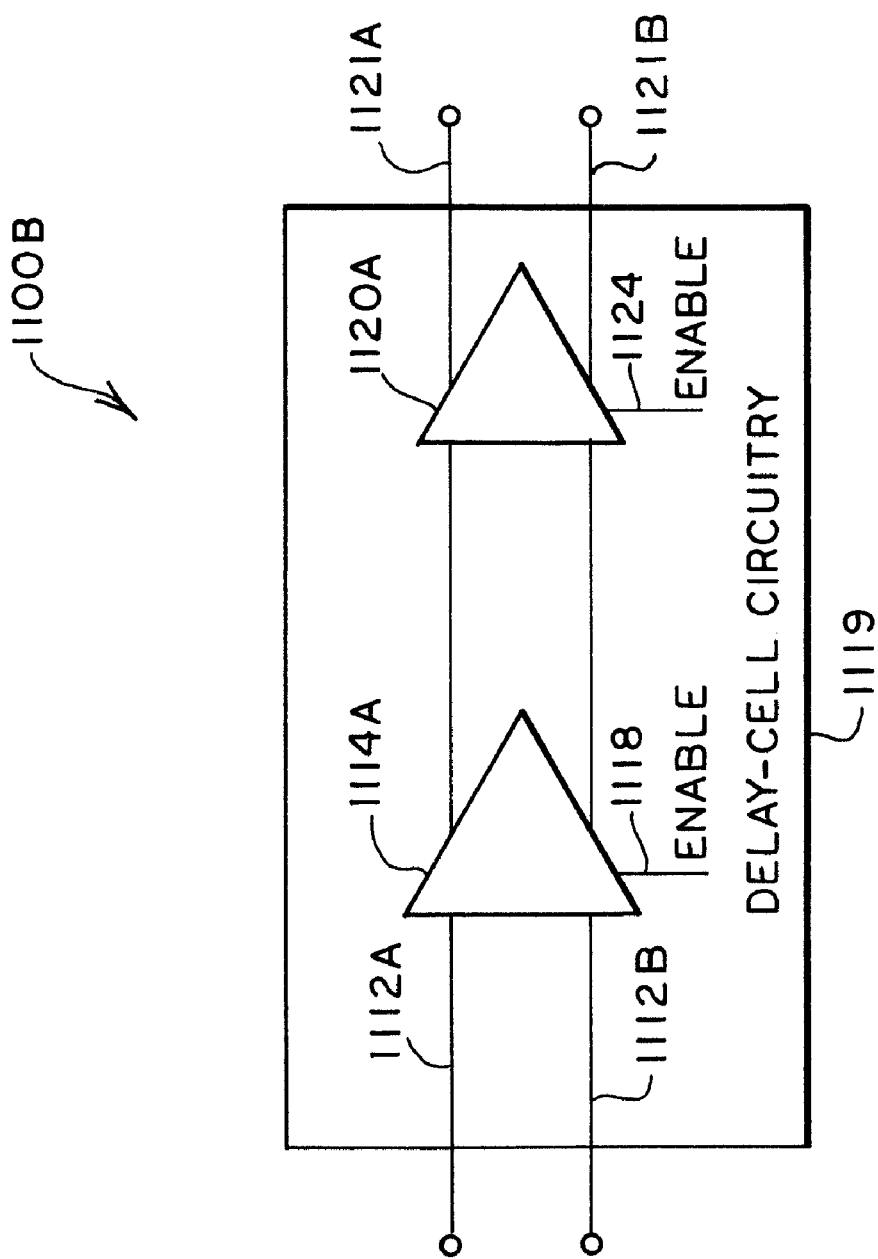
FIG. 11B illustrates a block diagram of an embodiment of a delay-cell circuitry that includes a clock driver circuitry in tandem with a clock receiver circuitry.

FIG. 11B illustrates a block diagram of a preferred embodiment 1100B of a delay-cell circuitry 1119 according to the invention. The delay-cell circuitry 1119 includes a replica of the clock driver circuitry 1114A in tandem with a replica of the data receiver circuitry 1120A. In other words, the block labeled "1114A" is a replica of the clock driver circuitry 1114, and the block labeled "1120A" is a replica of the data receiver circuitry 1120. (Note that the delay-cell circuitry 1119 may alternatively include a replica of the data driver circuitry 1154 in tandem with a replica of the clock receiver circuitry 1130.) The replica of the clock driver circuitry 1114A accepts the clock signal 1112A and the complement clock signal 1112B. The replica of the clock driver circuitry 1114A provides its outputs to the replica of the data receiver circuitry 1120A. The replica of the data receiver circuitry 1120A supplies the clock signal 1121A and the complement clock signal 1121B. The clock signal 1121A and the complement clock signal 1121B constitute the output signals of the delay-cell circuitry 1119. The delay-cell circuitry 1119 also receives as inputs enable signals 1118 and 1124 (note that FIG. 11A does not show those input signals for the sake of clarity). The enable signal 1118 couples to the replica of the clock driver circuitry 1114A, whereas the enable signal 1124 couples to the replica of the data receiver circuitry 1120A.

Note that FIG. 11B constitutes a conceptual block diagram of the delay-cell circuitry 1119. Rather than using distinct blocks 1114A and 1120A, one may alternatively use a single block that combines the functionality of those two blocks, as desired. Moreover, one may use a circuit that provides an adjustable, rather than fixed, delay, as desired. Note also that the embodiment 1100B of the delay-cell circuitry 1119 preferably compensates for the delay in the clock driver circuitry 1114 in FIG. 11A. In other words, the delay-cell circuitry 1119 preferably compensates sufficiently for the round-trip delay in the signals that travel from the receiver digital circuitry 905 to the receiver analog circuitry 910 and back to the receiver digital circuitry 905 to allow for accurate sampling in the receiver digital circuitry of the I-channel data and the Q-channel data. Note that in the embodiment 1100B, the replica of the clock driver circuitry 1114A mainly compensates for the round-trip delay, whereas the replica of the data receiver circuitry 1120A converts low-swing signals at the output of the replica of the clock driver circuitry 1114A into full-swing signals.

The receiver digital circuitry 905 and the receiver analog circuitry 910 preferably reside within separate integrated-circuit devices. Because those integrated-circuit devices typically result from separate semiconductor fabrication processes and manufacturing lines, their process parameters may not match closely. As a result, the preferred embodiment 1100B of the delay-cell circuitry 1119 does not compensate for the delay in the clock receiver circuitry 1130, the data driver circuitry 1154, and the data receiver circuitry 1120 in FIG. 11A.

Note, however, that if desired, the delay-cell circuitry 1119 may also compensate for the signal delays of the clock receiver circuitry 1130, the data driver circuitry 1154, and the data receiver circuitry 1120. Thus, in situations where one may match the process parameters of the receiver digital circuitry 905 and the receiver analog circuitry 910 relatively closely (for example, by using thick-film modules, silicon-on-insulator, etc.), the delay-cell circuitry 1119 may also compensate for the delays of other circuit blocks. As another alternative, one may use a delay-cell circuitry 1119 that provides an adjustable delay and then program the delay based on the delays in the receiver digital circuitry 905 and the receiver analog circuitry 910 (e.g., provide a matched set of receiver digital circuitry 905 and receiver analog circuitry 910), as persons skilled in the art who have the benefit of the description of the invention understand. Furthermore, rather than an open-loop arrangement, one may use a closed-loop feedback circuit implementation (e.g., by using a phase-locked loop circuitry) to control and compensate for the delay between the receiver analog circuitry 910 and the receiver digital circuitry 905, as desired.

Note that the digital circuit blocks shown in FIGS. 11A and 11B depict mainly the conceptual functions and signal flow. The actual circuit implementation may or may not contain separately identifiable hardware for the various functional blocks. For example, one may combine the functionality of various circuit blocks into one circuit block, as desired.

Figure 12:
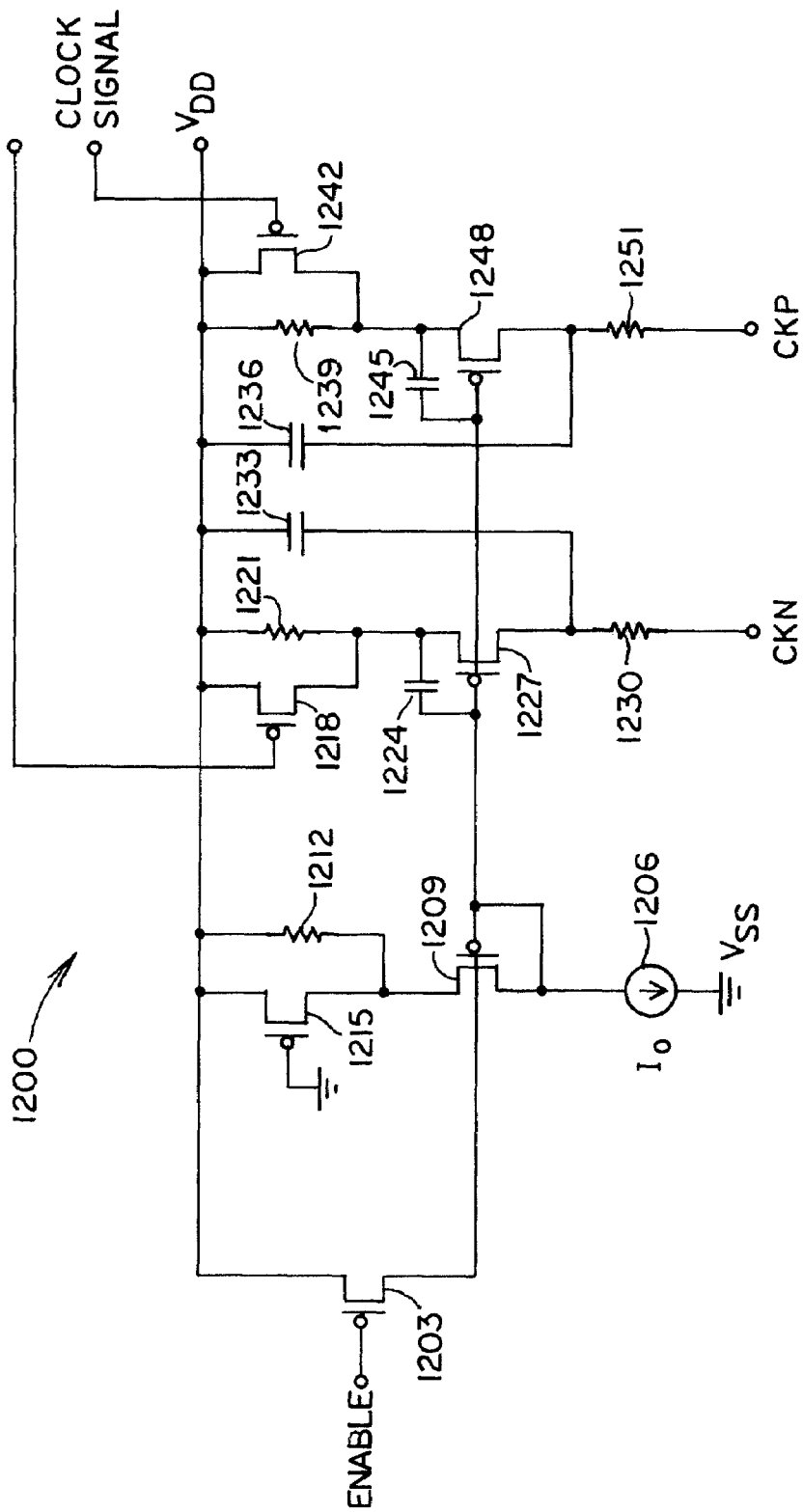
FIG. 12 depicts a schematic diagram of an embodiment of a signal-driver circuitry used to interface the receiver analog circuitry and the receiver digital circuitry according to the invention.

FIG. 12 shows a schematic diagram of a preferred embodiment 1200 of a signal-driver circuitry according to the invention. One may use the signal-driver circuitry as the clock driver circuitry 1114 and the data driver circuitry 1154 in FIG. 11A. In the latter case, the input signals to the signal-driver circuitry constitute the output signals 1152 and the enable signal 1156, whereas the output signals of the signal-receiver circuitry constitute the ION and IOP signals 960 and 965, respectively, in FIG. 11A.

The signal-driver circuitry in FIG. 12 constitutes two circuit legs. One circuit leg includes MOSFET devices 1218 and 1227 and resistor 1230. The second leg includes MOSFET devices 1242 and 1248 and resistor 1251. The input clock signal controls MOSFET devices 1218 and 1242. Current source 1206, MOSFET devices 1209 and 1215, and resistor 1212 provide biasing for the two circuit legs.

MOSFET devices 1227 and 1248 drive the CKN and CKP output terminals through resistors 1230 and 1251, respectively. Depending on the state of the clock signal, one leg of the signal-driver circuitry conducts more current than the other leg. Put another way, the signal-driver circuitry steers current from one leg to the other in response to the clock signal (i.e., in response to the clock signal, one leg of the circuit turns on and the other leg turns off, and vice-versa). As a result, the signal-driver circuitry provides a differential clock signal that includes current signals CKN and CKP.

If the enable signal is high, MOSFET device 1203 is off and therefore does not affect the operation of the rest of the circuit. In that case, a current $I_o$ flows through the current source 1206 and diode-connected MOSFET device 1209. The flow of current generates a voltage at the gate of MOSFET device 1209. MOSFET devices 1227 and 1248 share the same gate connection with MOSFET device 1209. Thus, MOSFET devices 1227 and 1248 have the same gate-source voltage, $V_{gs}$, as MOSFET device 1209 when the appropriate MOSFET devices are in the on state.

MOSFET devices 1218 and 1242 cause current steering between the first and second circuit legs. Only one of the MOSFET devices 1218 and 1242 is in the on state during the operation of the circuit. Depending on which MOSFET device is in the on state, the mirroring current $I_o$ flows through the circuit leg that includes the device in the on state.

Resistors 1221 and 1239 provide a small trickle current to the circuit leg that includes the MOSFET device (i.e., MOSFET device 1218 or MOSFET device 1242) that is in the off state. The small trickle current prevents the diode-connected MOSFET devices in the signal receiver circuitry (see FIG. 13) from turning off completely. The trickle current helps to reduce the delay in changing the state of the circuit in response to transitions in the input clock signal. The trickle currents also help to reduce transient signals at the CKP and CKN terminals and, thus, reduce interference effects.

Capacitors 1224 and 1245 provide filtering so that when MOSFET device 1218 and MOSFET device 1242 switch states, the currents through the first and second circuit legs (CKN and CKP circuit legs) do not change rapidly. Thus, capacitors 1224 and 1245 reduce the high-frequency content in the currents flowing through the circuit legs into the CKN and CKP terminals. The reduced high-frequency (i.e., band-limited) content of the currents flowing through the CKN and CKP terminals helps reduce interference effects to other parts of the circuit, for example, the LNA circuitries, as described above. Capacitors 1233 and 1236 and resistors 1230 and 1251 help to further reduce the high-frequency content of the currents flowing through the CKN and CKP terminals. Thus, the circuit in FIG. 12 provides smooth steering of current between the two circuit legs and therefore reduces interference effects with other circuitry.

When the enable signal goes to the low state, MOSFET device 1203 turns on and causes MOSFET device 1209 to turn off. MOSFET devices 1227 and 1248 also turn off, and the circuit becomes disabled. Note that the enable signal may be derived from the power-down PDNB signal.

Figure 13A:
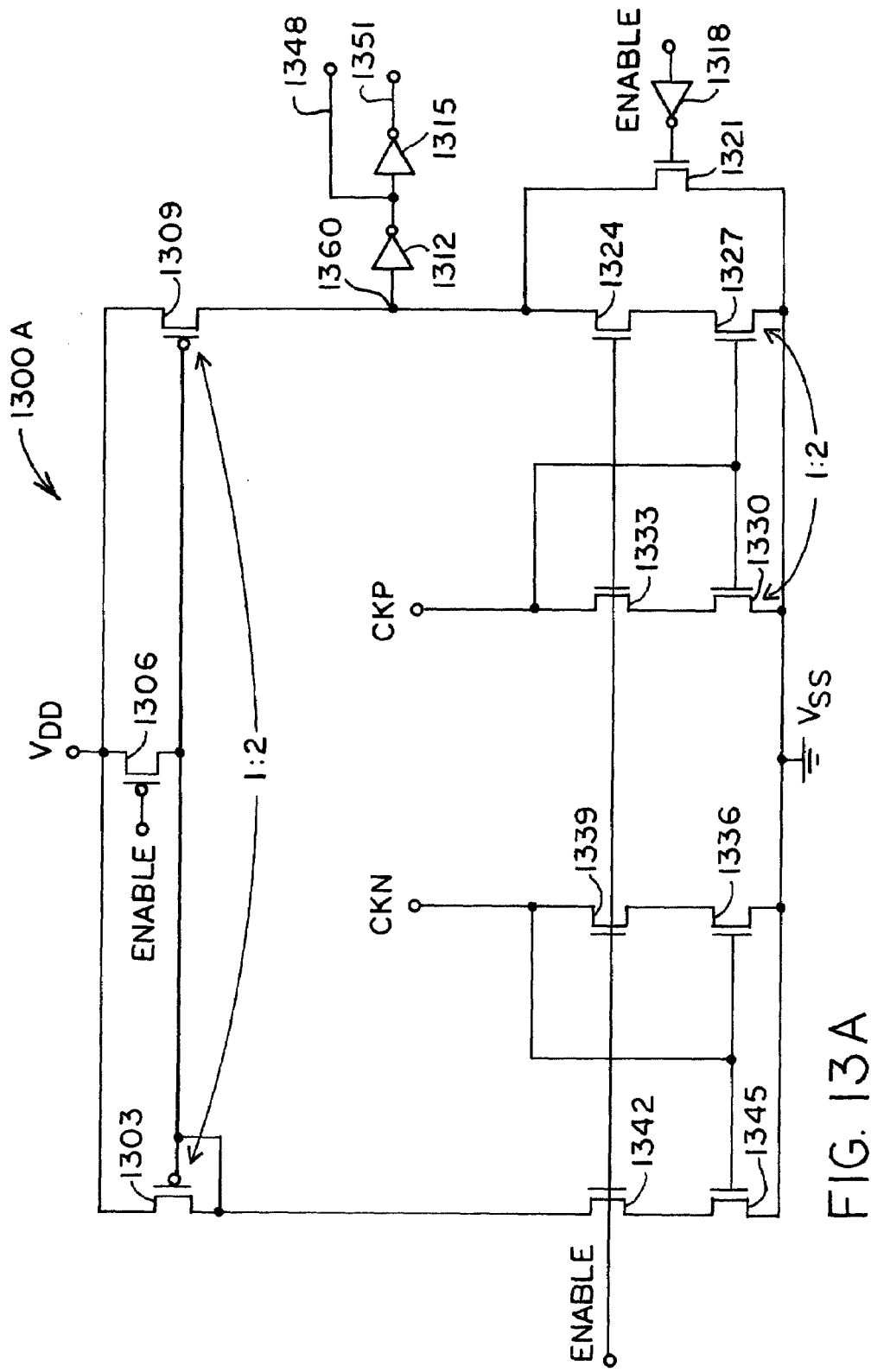
FIGS. 13A and 13B illustrate schematic diagrams of embodiments of signal-receiver circuitries used to interface the receiver analog circuitry and the receiver digital circuitry according to the invention.

FIG. 13A shows a schematic diagram of an exemplary embodiment 1300A of a signal-receiver circuitry according to the invention. One may use the signal-receiver circuitry as the clock receiver circuitry 1130 and the data receiver circuitry 1120 in FIG. 11A. In the latter case, the input signals to the signal-receiver circuitry constitute the ION and IOP signals 960 and 965 and the enable signal 1124, whereas the output signals constitute the signals at the outputs 1122A and 1122B, respectively, in FIG. 11A.

The signal receiver circuitry in FIG. 13A helps to convert differential input currents into CMOS logic signals. The signal-receiver circuitry in FIG. 13A constitutes two circuit legs. The first circuit leg includes MOSFET devices 1303, 1342, and 1345. The second leg includes MOSFET devices 1309, 1324, and 1327. Note that, preferably, the scaling of MOSFET devices 1303 and 1309 provides a current gain of 1:2 between them. Likewise, the scaling of MOSFET devices 1330 and 1327 preferably provides a current gain of 1:2 between them. The current gains help to reduce phase noise in the signal-receiver circuitry.

MOSFET devices 1339, 1342, 1333, and 1324 provide enable capability for the circuit. When the enable input is in the high state, MOSFET devices 1339, 1342, 1333, and 1324 are in the on state. MOSFET devices 1345 and 1336 are current mirrors, as are MOSFET devices 1303 and 1309. MOSFET devices 1330 and 1327 also constitute current mirrors.

The currents flowing through the CKN and CKP terminals mirror to the MOSFET devices 1327 and 1309. The actual current flowing through the second circuit leg depends on the currents that MOSFET device 1327 and MOSFET device 1309 try to conduct; the lower of the two currents determines the actual current that flows through the second circuit leg.

The difference between the currents that MOSFET device 1327 and MOSFET device 1309 try to conduct flows through the parasitic capacitance at node 1360. The current flow charges or discharges the capacitance at node 1360, thus making smaller the drain-source voltage ($V_{ds}$) of whichever of MOSFET devices 1327 and 1309 that seeks to carry the higher current. Ultimately, the lower of the currents that MOSFET devices 1327 and 1309 seek to conduct determines the current through the second leg of the circuit.

A pair of inverters 1312 and 1315 provide true and complement output signals 1351 and 1348, respectively. The signal receiver circuitry therefore converts differential input currents into CMOS logic output signals.

Figure 13B:
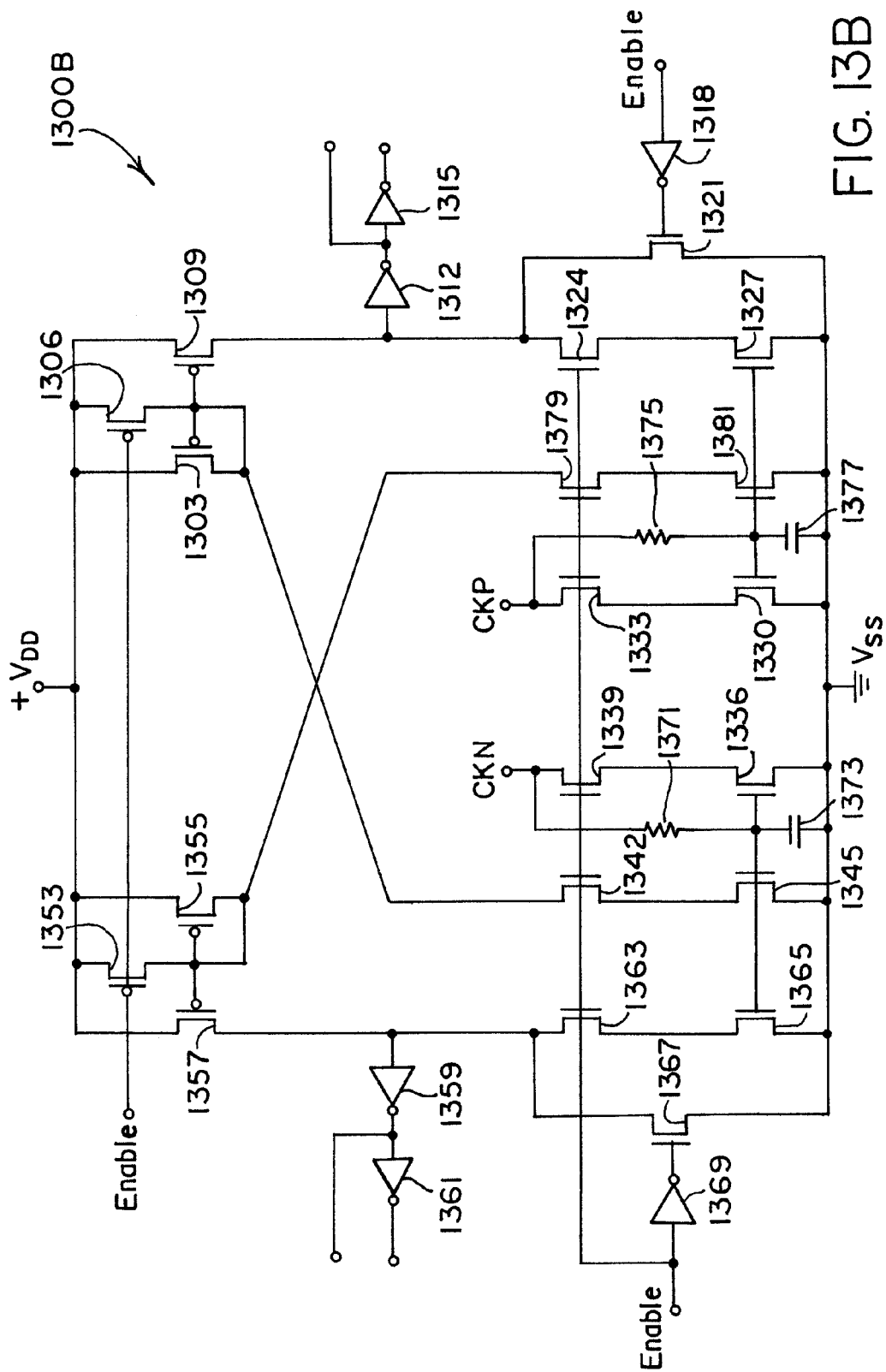

In exemplary embodiments of the invention, the signal receiver circuitry provides fully differential output signals. FIG. 13B shows an embodiment 1300B of such a signal receiver circuitry. One may use embodiment 1300B in a similar manner and application as embodiment 1300A, using the same input signals, as desired. Unlike embodiment 1300A, however, embodiment 1300B includes fully differential circuitry to generate fully differential output signals.

Embodiment 1300B includes the same devices as does embodiment 1300A, and the common devices operate in a similar manner. Furthermore, embodiment 1300B includes additional devices and components. Embodiment 1300B constitutes two circuit legs and replica of those circuit legs. The first circuit leg includes MOSFET devices 1303, 1342, and 1345. The replica of the first circuit leg includes devices 1355, 1379, and 1381. The second circuit leg includes MOSFET devices 1309, 1324, and 1327. The replica of the second circuit leg include devices 1357, 1363, and 1365. The scaling of MOSFET devices 1303 and 1309 provides a current gain of 1:2 between them, as does the scaling of MOSFET devices 1330 and 1327. Likewise, scaling of MOSFET devices 1355 and 1357 provides a current gain of 1:2 between them, as does the scaling of MOSFET devices 1336 and 1365. The current gains help to reduce phase noise in the signal-receiver circuitry.

Embodiment 1300B generally operates similarly to embodiment 1300A. Devices 1381, 1379, 1355, 1353, 1357, 1363, 1365, 1367, 1369, 1359, and 1361 perform the same functions as do devices 1345, 1342, 1303, 1306, 1309, 1324, 1327, 1321, 1318, 1312, and 1315, respectively. The enable function also operates similarly to embodiment 1300A. Resistors 1371 and 1375 and capacitors 1373 and 1377 filter the input clock (e.g., 13 MHz clock). Inverters 1312, 1315, 1361, and 1359 provide fully differential true and complement output signals.

Figure 14:
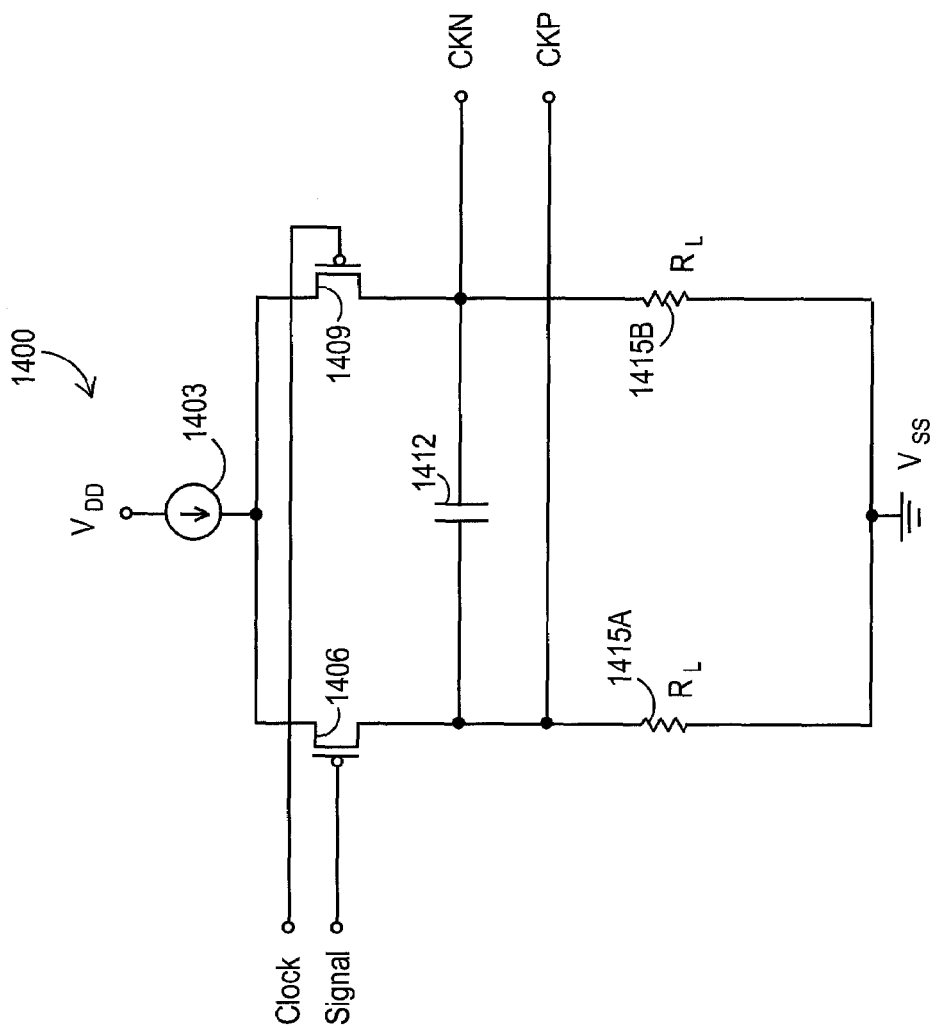
FIG. 14 shows a schematic diagram of another signal-driver circuitry that one may use to interface the receiver analog circuitry and the receiver digital circuitry according to the invention.

FIG. 14 shows an embodiment 1400 of an alternative signal-driver circuitry according to the invention. The signal-driver circuitry in FIG. 14 includes two circuit legs. The first circuit leg includes MOSFET device 1406 and resistor 1415A. The second circuit leg includes MOSFET device 1409 and resistor 1415B. A current source 1403 supplies current to the two circuit legs.

The input clock signal controls MOSFET devices 1406 and 1409. MOSFET devices 1406 and 1409 drive the CKP and CKN output terminals, respectively. Depending on the state of the clock signal, one leg of the signal-driver circuitry conducts current. Put another way, the signal-driver circuitry steers current from one leg to the other in response to the clock signal. As a result, the signal-driver circuitry provides a differential clock signal that includes signals CKN and CKP. Capacitor 1412 filters the output signals CKN and CKP. Put another way, capacitor 1412 provides band-limiting of the output signals CKN and CKP. Note that the current source 1403 supplies limited-amplitude signals by providing current through resistors 1415A and 1415B.

Note that the signal-driver circuitries (clock driver and data driver circuitries) according to the invention preferably provide current signals CKN and CKP. Similarly, signal-receiver circuitries (clock receiver and data receiver circuitries) according to the invention preferably receive current signals. As an alternative, one may use signal-driver circuitries that provide as their outputs voltage signals, as desired. One may also implement signal-receiver circuitries that receive voltage signals, rather than current signals. As noted above, depending on the application, one may limit the frequency contents of those voltage signals, for example, by filtering, as desired.

Generally, several techniques exist for limiting noise, for example, digital switching-noise, in the interface between the receiver analog circuitry and the receiver digital circuitry according to the invention. Those techniques include using differential signals, using band-limited signals, and using amplitude-limited signals. RF apparatus according to the invention may use any or all of those techniques, as desired. Furthermore, one may apply any or all of those techniques to interface circuitry that employs voltage or current signals, as persons of ordinary skill in the art who have the benefit of the description of the invention understand.

Note also that the RF transceiver embodiments according to the invention lend themselves to various choices of circuit implementation, as a person skilled in the art who have the benefit of the description of the invention understand. For example, as noted above, each of the circuit partitions, or circuit blocks, of RF transceivers partitioned according to the invention, resides preferably within an integrated circuit device. Persons skilled in the art, however, will appreciate that the circuit partitions, or circuit blocks, may alternatively reside within other substrates, carriers, or packaging arrangements. By way of illustration, other partitioning arrangements may use modules, thin-film modules, thick-film modules, isolated partitions on a single substrate, circuit-board partitions, and the like, as desired, consistent with the embodiments of the invention described here.

One aspect of the invention contemplates partitioning RF transceivers designed to operate within several communication channels (e.g., GSM, PCS, and DCS). Persons skilled in the art, however, will recognize that one may partition according to the invention RF transceivers designed to operate within one or more other channels, frequencies, or frequency bands, as desired.

Moreover, the partitioning of RF transceivers according to the invention preferably applies to RF apparatus (e.g., receivers or transceivers) with a low-IF, digital-IF architecture. Note, however, that one may apply the partitioning and interfacing concepts according to the invention to other RF receiver or transceiver architectures and configurations, as persons of ordinary skill in the art who have the benefit of the description of the invention understand. By way of illustration, one may use the partitioning and interface concepts according to the invention in RF apparatus that includes:

low-IF receiver circuitry;
low-IF receiver circuitry and offset-PLL transmitter circuitry;
low-IF receiver circuitry and direct up-conversion transmitter circuitry;
direct-conversion receiver circuitry;
direct-conversion receiver circuitry and offset-PLL transmitter circuitry; or
direct-conversion receiver circuitry and direct up-conversion transmitter circuitry.

As an example of the flexibility of the partitioning concepts according to the invention, one may include the LO circuitry in one partition, the receiver digital circuitry in a second partition, and the transmitter up-converter circuitry and the receiver analog circuitry in a third partition. As another illustrative alternative, one may include the LO circuitry and the transmitter up-converter circuitry within one circuit partition, depending on the noise and interference characteristics and specifications for a particular implementation.

Note that, in a typical direct-conversion RF receiver or transceiver implementation, the receiver digital circuitry would not include the digital down-converter circuitry (the receiver analog circuitry, however, would be similar to the embodiments described above). Furthermore, in a typical direct up-conversion transmitter circuitry, one would remove the offset PLL circuitry and the transmit VCO circuitry from the transmitter circuitry. The LO circuitry would supply the RF LO signal to the up-conversion circuitry of the transmitter circuitry, rather than the offset-PLL circuitry. Also, in a direct up-conversion implementation, the LO circuitry typically does not provide an IF LO signal.

Furthermore, as noted above, one may use the partitioning and interface concepts according to the invention not only in RF transceivers, but also in RF receivers for high-performance applications. In such RF receivers, one may partition the receiver as shown in FIGS. 2A–2D and 4–8, and as described above. In other words, the RF receiver may have a first circuit partition that includes the receiver analog circuitry, and a second circuit partition that includes the receiver digital circuitry.

The RF receiver may also use the digital interface between the receiver analog circuitry and the receiver digital circuitry, as desired. By virtue of using the receiver analog circuitry and the receiver digital circuitry described above, the RF receiver features a low-IF, digital-IF architecture. In addition, as noted above with respect to RF transceivers according to the invention, depending on performance specifications and design goals, one may include all or part of the local oscillator circuitry within the circuit partition that includes the receiver analog circuitry, as desired. Partitioning RF receivers according to the invention tends to reduce the interference effects between the circuit partitions.

As noted above, although RF apparatus according to the invention use a serial interface between the receiver analog circuitry and the receiver digital circuitry, one may use other types of interface, for example, parallel interfaces, that incorporate different numbers of signal lines, different types and sizes of signals, or both, as desired. Moreover, the clock driver circuitries and the data driver circuitries may generally constitute signal-driver circuitries that one may use in a variety of digital interfaces between the receiver analog circuitry and the receiver digital circuitry according to the invention.

Likewise, the clock receiver circuitries and data receiver circuitries may generally constitute signal-receiver circuitries that one may use in a variety of digital interfaces between the receiver analog circuitry and the receiver digital circuitry according to the invention. In other words, one may use signal-driver circuitries and signal-receiver circuitries to implement a wide variety of digital interfaces, as persons of ordinary skill who have the benefit of the description of the invention understand.

Another aspect of the invention relates to calibrated low-noise references, including current and voltage references. Analog circuitry, such as receivers, typically operate on and process signals of relatively small magnitudes. For example, the RF transceiver shown in FIG. 8 uses LNA circuitries to amplify received RF signals that have small amplitudes. Signal processing analog circuitry also uses current and voltage references for proper circuit operation, for example, biasing various devices or setting full-scale values.

Any noise added by the reference sources may corrupt the low-magnitude signals within the circuit and produce noisy or undesired output signals. Furthermore, any drift by the references may cause erroneous or undesired output signals. To combat those problems, the inventive concepts described here contemplate low-drift, low-noise current and/or voltage references.

Conceptually, the low-noise references according to the invention use a low-noise stage to derive a low-noise, low-drift reference signal (current or voltage) from a low-drift source that may have relatively high noise levels or density at its output. The low-noise stages themselves may have relatively large drift as a result of physical and/or environmental changes. By using the output of the low-drift source as a reference signal in calibration operations, the low-noise stages provide current and/or voltage reference signals with low drift and low noise. One may apply these concept to provide a low-noise current reference, a low-noise voltage reference, or a low-noise current and voltage reference, as desired.

Figure 15:
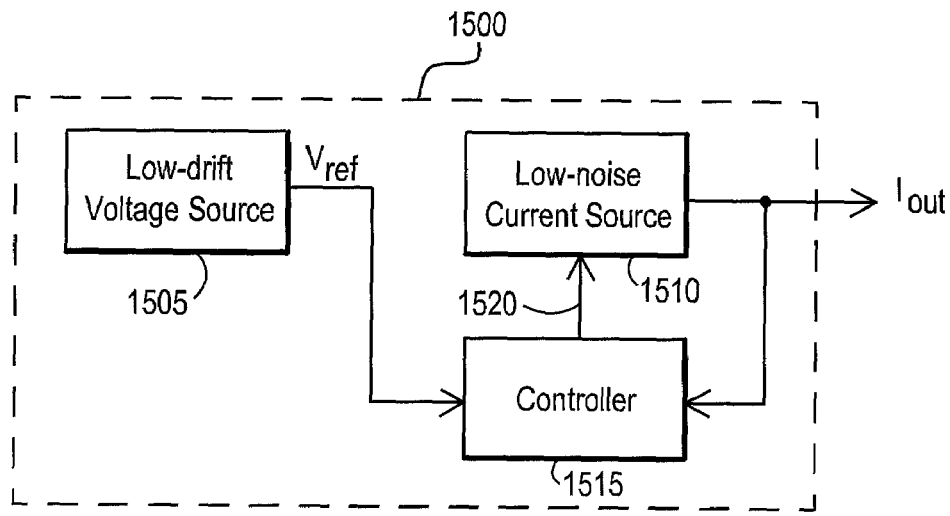
FIG. 15 depicts an exemplary embodiment according to the invention of a low-noise current reference.

FIG. 15 shows an exemplary embodiment according to the invention of a low-noise current reference 1500. Low-noise current reference 1500 can generate a low-noise, low-drift output current, $I_{out}$, derived from a low-drift voltage that has relatively high noise content.

Low-noise current reference 1500 includes low-drift voltage source 1505, low-noise current source 1510, and controller 1515. Low-drift voltage source 1505 generates a reference voltage, $V_{ref}$, that it supplies to controller 1515. Low-drift voltage source 1505 may generate relatively high noise levels at its output. Low-noise current source 1510 generates a low-noise output current, $I_{out}$.

Controller 1515 uses reference voltage, $V_{ref}$, or a signal derived from it (for example, by scaling) and output current, $I_{out}$, in a feedback loop to control output current, $I_{out}$. By comparing the level of output current, $I_{out}$, with a desired current level derived from reference voltage, $V_{ref}$, controller 1515 supplies control signal 1520 to low-noise current source 1510. In response, low-noise current source 1510 supplies an output current, $I_{out}$, that matches a desired output current level relatively closely. Control signal 1520 may include one or more individual control signals, as desired, depending on the design of the various blocks of low-noise current reference 1500.

Note that one may calibrate output current, $I_{out}$, as desired. When the circuit first begins operation, one may determine an appropriate level or value for control signal 1520 (or appropriate levels or values for the bits in control signal 1520) and then freeze or hold that level or value. Thus, one may calibrate control signal 1520 at or near circuit power-up and then use the resulting control signal during operation of low-noise current reference 1500.

If the period of operation of low-noise current reference 1500 is long enough that various circuit characteristics, such as electrical attributes of low-noise current source 1510, may experience drift, one may repeat the calibration as desired to acquire new levels or values for control signal 1520 on an on-going basis. As one example, in an application that uses low-noise current reference 1500 intermittently, e.g., in burst mode, one may calibrate low-noise current reference 1500 when the circuit powers up, for instance, at the beginning of a burst.

Figure 16:
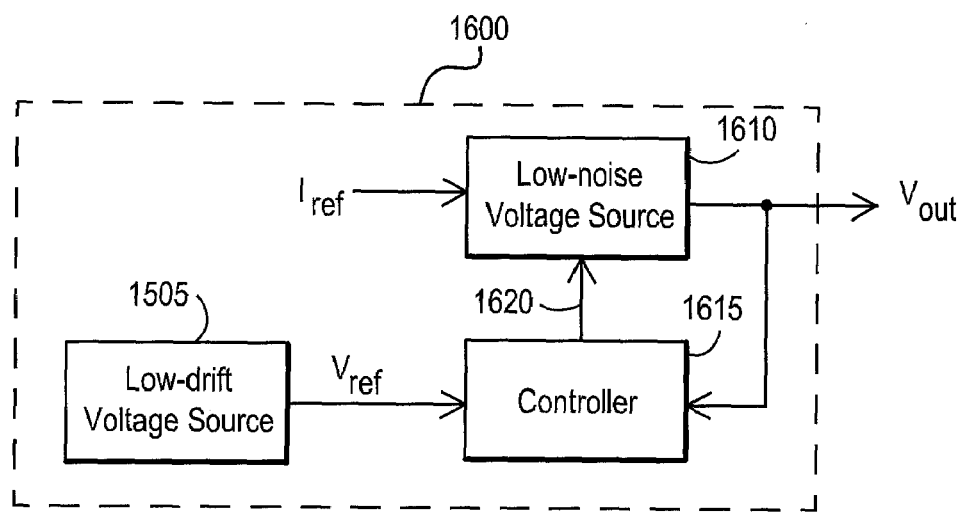
FIG. 16 illustrates an exemplary embodiment according to the invention of a low-noise voltage reference.

FIG. 16 illustrates an exemplary embodiment according to the invention of a low-noise voltage reference 1600. Low-noise voltage reference 1600 includes low-drift voltage source 1505, low-noise voltage source 1610, and controller 1615. Low-noise voltage source 1610 accepts as an input a reference current, $I_{ref}$. Reference current, $I_{ref}$, may constitute the output current, $I_{out}$, from low-noise current reference 1500 (see FIG. 15) or a current derived from it (for example, a scaled or mirrored current), or another suitable reference current, as desired. Low-noise voltage source 1610 uses reference current, $I_{ref}$, to generate a low-noise, low-drift output current, $V_{out}$.

Controller 1615 uses reference voltage, $V_{ref}$, and output voltage, $V_{out}$, (or signals derived from them) in a feedback loop to control output voltage, $V_{out}$. By comparing the level of output voltage, $V_{out}$, (or a signal derived from it) with a desired voltage level derived from reference voltage, $V_{ref}$, controller 1615 provides control signal 1620 to low-noise voltage source 1610. Low-noise voltage source 1610 generates an output voltage, $V_{out}$, that matches a desired output voltage level relatively closely. Control signal 1620 may include one or more individual control signals, depending on the design of the various blocks of low-noise voltage reference 1600.

Note that one may calibrate output voltage, $V_{out}$, as desired. When the circuit first begins to operate, one may determine an appropriate level or value for control signal 1620 (or in the case of multiple control signals, appropriate levels or values for control signals 1620). One may then freeze or hold that level or value. Thus, one may calibrate control signal 1620 at or near circuit power-up and then use the calibrated control signal during operation of low-noise voltage reference 1600.

If the period of operation of low-noise voltage reference 1600 is relatively long, various circuit characteristics, for example, electrical attributes of low-noise voltage source 1610, may experience drift. In that case, one may repeat the calibration as desired to acquire new levels or values for control signal 1620 on an on-going basis. As one example, in an application that uses low-noise voltage reference 1600 intermittently, e.g., in burst mode, one may calibrate low-noise voltage reference 1600 when the circuit powers up, for instance, at the beginning of a burst.

Figure 17:
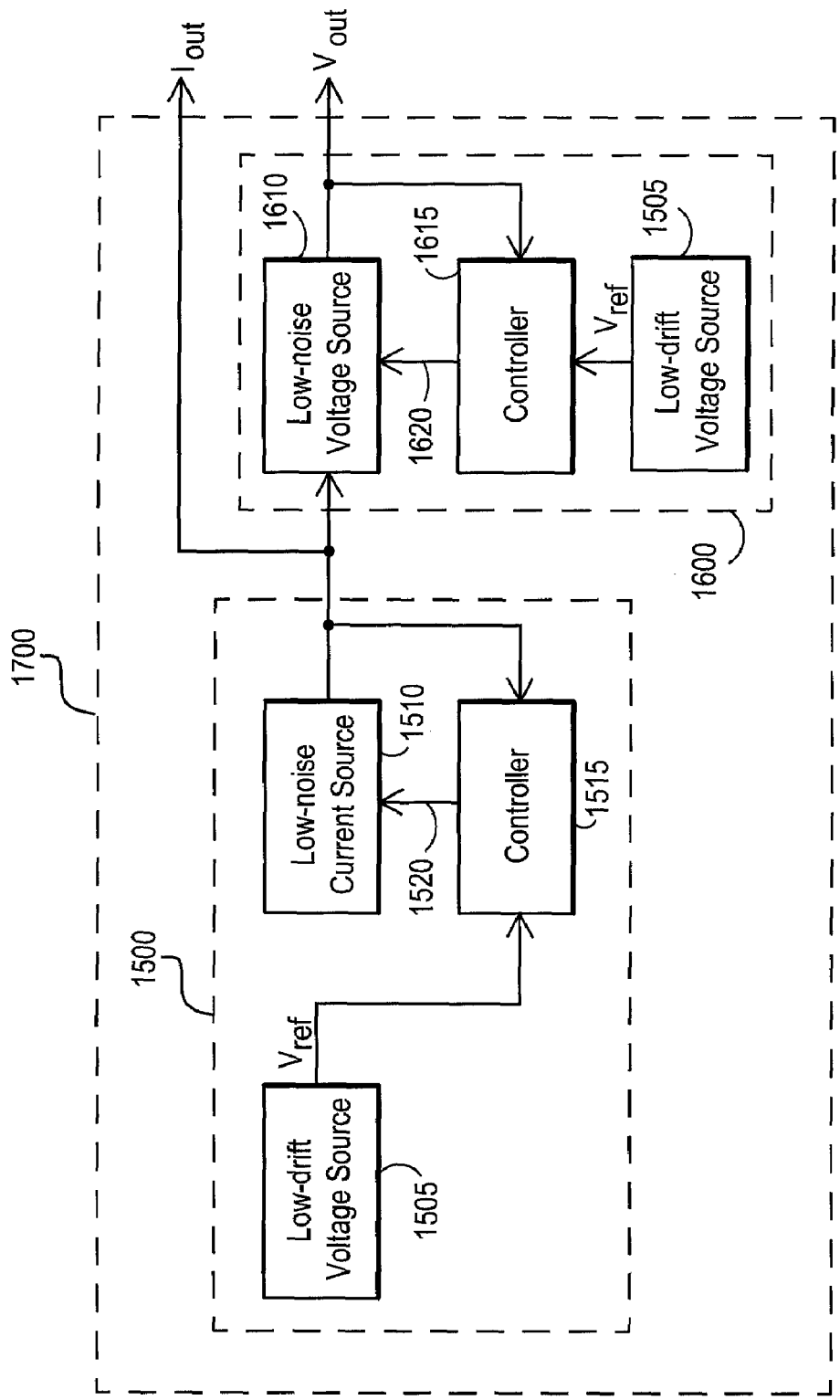
FIG. 17 shows an exemplary embodiment according to the invention of a low-noise current/voltage reference.

FIG. 17 depicts an exemplary embodiment according to the invention of a low-noise current/voltage reference 1700. By using a cascade coupling of low-noise current reference 1500 and low-noise voltage reference 1600, low-noise current/voltage reference 1700 provides both an output current, $I_{out}$, and an output voltage, $V_{out}$. Low-noise current reference 1500 and low-noise voltage reference 1600 have the circuit arrangements and operate as described above in detail. Low-noise voltage reference 1600 uses output current, $I_{out}$, or a current derived from it, such as a mirrored version of it, as its current reference signal (denoted as $I_{ref}$ in FIG. 16).

Although FIG. 17 illustrates separate low-drift voltage sources 1505 for low-noise current reference 1500 and low-noise voltage reference 1600, one may use other arrangements, as desired. For example, in exemplary embodiments, one may share a single low-drift voltage source 1505 between low-noise current reference 1500 and low-noise voltage reference 1600. In such an arrangement, the low-drift voltage source 1505 would supply reference voltage, $V_{ref}$, to low-noise current reference 1500 and low-noise voltage reference 1600. Furthermore, one may also buffer the output of low-drift voltage source 1505 (using one or more buffers) and then use the buffered signal in low-noise current reference 1500 and low-noise voltage reference 1600.

Note that one may include more than one low-noise voltage reference 1600 in cascade with low-noise current reference 1500, as desired. Each low-noise voltage reference 1600 may use the output current, $I_{out}$, as described above. Furthermore, one may include more than one low-noise current reference 1500, as desired. One may supply each of low-noise voltage references 1600 with the output current, $I_{out}$, from one of the low-noise current references 1500, as desired. Generally, one may use one or more low-noise current references 1500 and one or more low-noise voltage references 1600, which use the output current, $I_{out}$, from one or more of the low-noise current references 1500, to generate a desired number of current and voltage reference signals.

Figure 18:
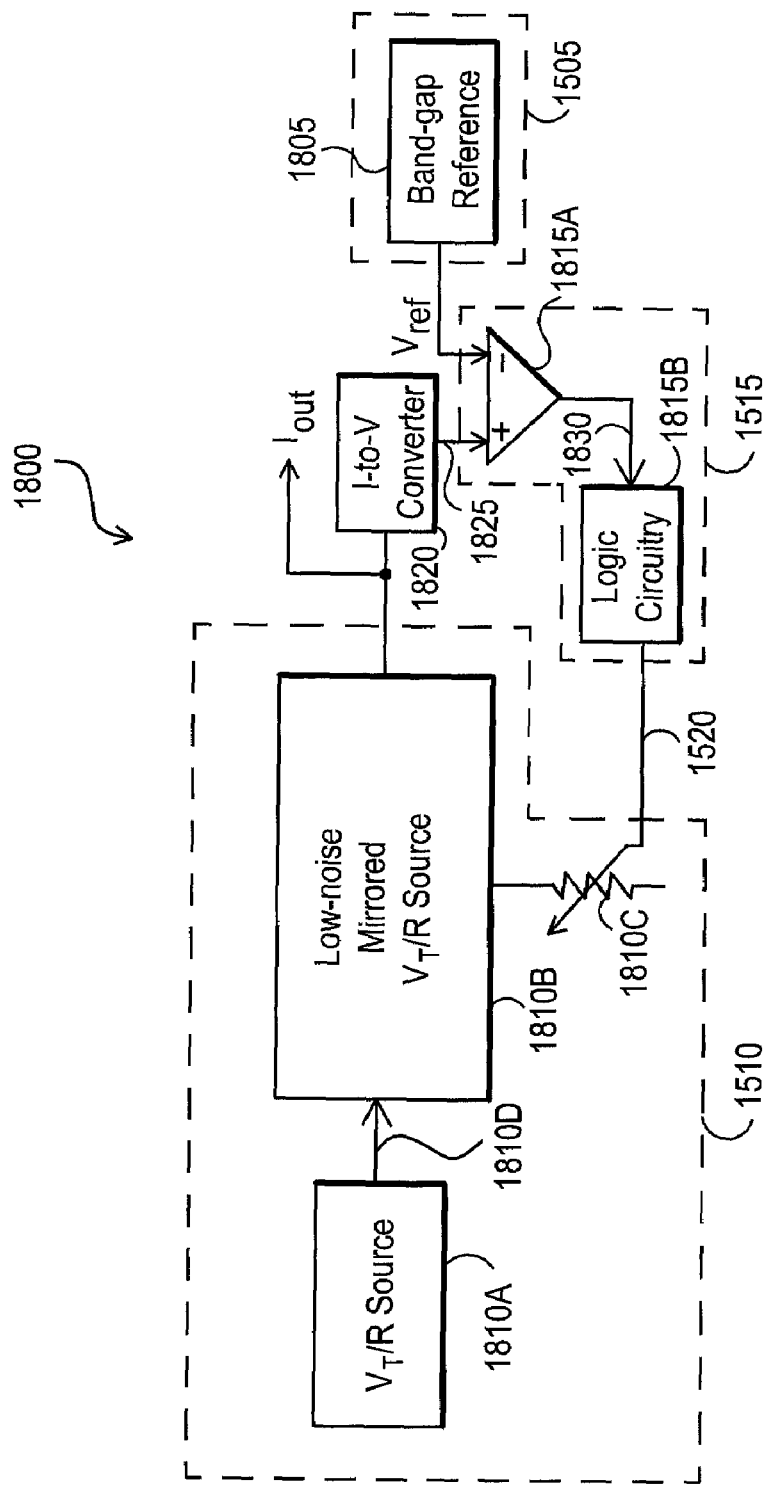
FIG. 18 depicts another exemplary embodiment according to the invention of a low-noise current reference.

FIG. 18 shows an exemplary embodiment according to the invention of a low-noise current reference 1800. Low-noise current reference 1800 generally has the same topology as does low-noise current reference 1500 (see FIG. 15) and operates in a similar manner. FIG. 18 provides more details of the circuitry shown in FIG. 15.

Low-noise current reference 1800 includes low-drift voltage source 1505, low-noise current source 1510, and controller 1515. Low-drift voltage source 1505 includes a band-gap reference 1805. Band-gap reference 1805 may constitute a conventional band-gap reference circuit, well known to persons of ordinary skill in the art.

Low-noise current source 1510 includes a $V_T/R$ source 1810A (described below in more detail). $V_T/R$ source 1810A generates and provides a current signal 1810D to low-noise mirrored $V_T/R$ source 1810B. Low-noise mirrored $V_T/R$ source 1810B couples to an adjustable resistor 1810C. Depending on current signal 1810D and the resistance of adjustable resistor 1810C, low-noise mirrored $V_T/R$ source 1810B generates low-noise output current, $I_{out}$.

As noted above, controller 1515 operates in a feedback loop to control the level of output current, $I_{out}$. Controller 1515 includes comparator 1815A and logic circuitry 1815B. A current-to-voltage converter 1820 derives a voltage signal 1825 from output current, $I_{out}$, or a current derived from it, such as a mirrored version of it, and provides that signal to comparator 1815A. Comparator 1815A compares voltage signal 1825 with reference voltage, $V_{ref}$ (i.e., output of band-gap reference 1805) or a signal derived from it (for example, by scaling) and generates output signal 1830, which it provides to logic circuitry 1815B. In response, logic circuitry 1815B adjusts the resistance of adjustable resistor 1810C. The feedback action within the circuit causes low-noise current reference 1800 to provide an output current, $I_{out}$, with a desired level. As described above, one obtains a level or value of control signal 1520 during calibration of the circuit and then uses that level or value during operation of low-noise current reference 1800.

Figure 19:
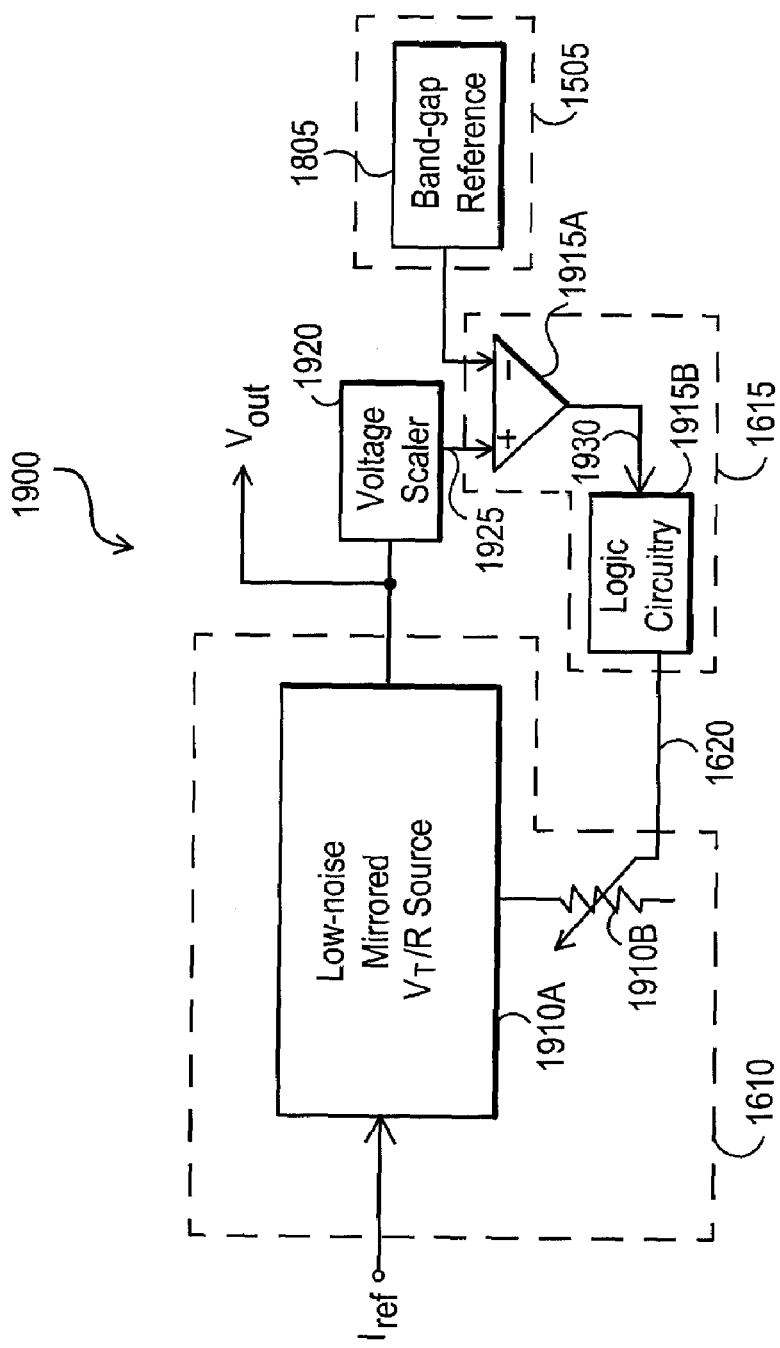
FIG. 19 illustrates another exemplary embodiment according to the invention of a low-noise voltage reference.

FIG. 19 illustrates an exemplary embodiment according to the invention of a low-noise voltage reference 1900. Low-noise current reference 1900 generally has the same topology as does low-noise voltage reference 1600 (see FIG. 16) and operates in a similar manner. FIG. 19 provides more details of the circuitry shown in FIG. 16.

Low-noise voltage reference 1900 includes low-drift voltage source 1505, low-noise voltage source 1610, and controller 1615. Low-drift voltage source 1505 includes band-gap reference 1805, as described above.

Low-noise voltage source 1610 includes low-noise mirrored $V_T/R$ source 1910A. Low-noise mirrored $V_T/R$ source 1910A receives reference current, $I_{ref}$. Reference current, $I_{ref}$, may constitute the output current, $I_{out}$, of low-noise current reference 1800 or another suitable reference current, as desired. Low-noise mirrored $V_T/R$ source 1910A couples to an adjustable resistor 1910B. Depending on reference current, $I_{ref}$, and the resistance of adjustable resistor 1910B, low-noise mirrored $V_T/R$ source 1910A generates low-noise output voltage, $V_{out}$.

As noted above, controller 1615 operates in a feedback loop to control the level of output voltage, $V_{out}$. Controller 1615 includes comparator 1915A and logic circuitry 1915B. A voltage scaler 1920 provides a voltage signal 1925 that is proportional to output voltage, $V_{out}$. Comparator 1915A compares the voltage signal 1925 with reference voltage, $V_{ref}$ (i.e., output of band-gap reference 1805) or a signal derived from it (for example, by scaling) and generates output signal 1930, which it provides to logic circuitry 1915B. In response, logic circuitry 1915B adjusts the resistance of adjustable resistor 1910B. Feedback action within the circuit causes low-noise voltage reference 1900 to provide an output voltage, $V_{out}$, with a desired level. As described above, one may obtain a level or value of control signal 1620 during calibration of the circuit and then use that level or value during operation of low-noise voltage reference 1900.

Figure 20:
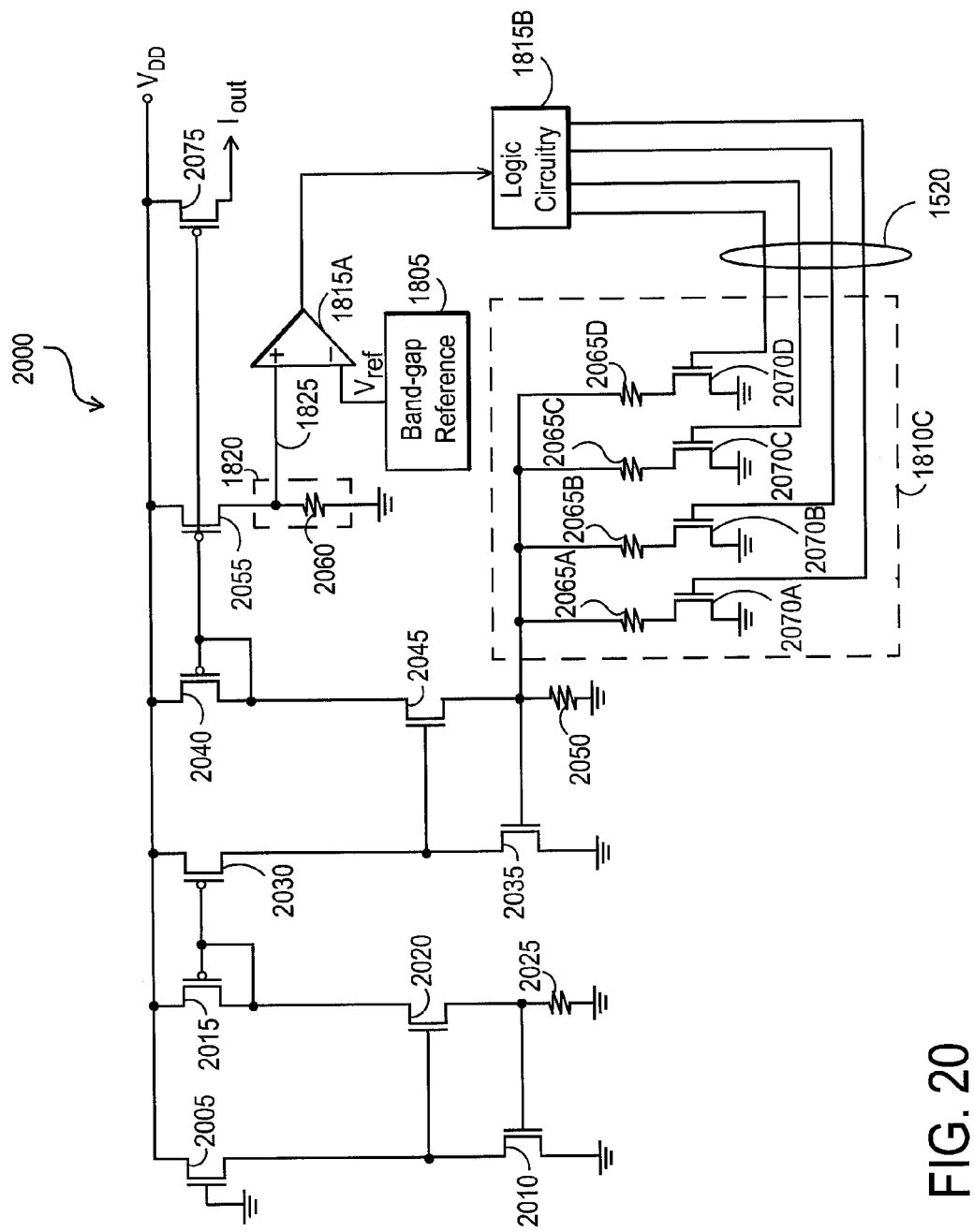
FIG. 20 shows another exemplary embodiment according to the invention of a low-noise current reference.

FIG. 20 shows another exemplary embodiment according to the invention of a low-noise current reference 2000. Low-noise current reference 2000 generally has the same topology as does low-noise current reference 1800 (see FIG. 18) and operates in a similar manner. FIG. 20 provides more details of the circuitry shown in FIG. 18.

Low-noise current reference 2000 includes a $V_T/R$ source that includes transistor 2010 and resistor 2025. Transistor 2010 has a relatively large width-to-length ratio (W/L). As a consequence, it can conduct relatively large desired currents with a gate-to-source voltage that exceeds the threshold voltage ($V_T$) of transistor 2010 by a relatively small amount.

Transistor 2020 is a feedback transistor acting as a source follower circuit. It provides an appropriate voltage at the gate terminal of transistor 2010 so as to cause a desired current to flow within transistor 2010. Transistor 2005 has a relatively long channel length (i.e., relatively small W/L), and therefore has a relatively large on-resistance. The current flowing through transistor 2020 equals the voltage across resistor 2025 divided by its resistance. The voltage across resistor 2025 equals the gate-to-source voltage of transistor 2010. The gate-to-source voltage of transistor 2010 roughly equals that transistor's threshold voltage, $V_T$, hence the name $V_T/R$ source.

Transistor 2015 is a diode-connected transistor. It acts to mirror the current flowing in transistor 2020 (i.e., the current given approximately by dividing threshold voltage of transistor 2010 by the resistance of resistor 2025) into transistor 2030. The mirrored current has low noise content or density. Because transistor 2010 and resistor 2025 have no direct connection to the supply voltage, $V_{DD}$, the mirrored current also tends to be independent of supply voltage (i.e., it has good power supply rejection).

Note that transistors 2035 and 2045 and the effective resistance from the gate of transistor 2035 to ground couple to each other in a similar manner as do transistors 2010 and 2020 and resistor 2025. In other words, the circuit includes the cascade arrangement of two stages. The first stage includes transistors 2010 and 2020 and resistor 2025, and the second stage includes transistors 2035 and 2045 and the effective resistance from the gate of transistor 2035 to ground. Thus, in effect, the circuit arrangement includes a cascade of a $V_T/R$ source and a low-noise mirrored $V_T/R$ source.

The cascading of the two stages tends to further improve the performance of the circuit (i.e., low noise, higher power supply rejection). As a result, the current flowing through transistors 2040 and 2045 constitutes a stable, low-noise current. Transistors 2040 and 2055 act as a current mirror that provides the stable, low-noise current flowing through transistors 2040 and 2045 to resistor 2060 and to the output of the circuit via transistor 2075. In conjunction with transistor 2055, resistor 2060 acts as current-to-voltage converter 1820, and generates voltage signal 1825, which it provides to comparator 1815A. Transistor 2075 provides the low-noise output current, $I_{out}$. Note that one may use more than one transistor arranged similar to transistor 2075 to provide more than one output current, as desired.

Various circuit parameters (such as the threshold voltages of transistor 2010 and transistor 2035) depend on physical and environmental changes (such as temperature changes). The current flowing through transistor 2045 and, hence, the output current, $I_{out}$, may therefore fluctuate as a result of physical and environmental changes. As noted above, one may use circuit calibration to reduce the variations of the output current, $I_{out}$, as follows.

Conceptually, the low-noise current reference 2000 uses a feedback circuit to perform calibration. By comparing a voltage derived from the output current, $I_{out}$, or a current derived from it, such as a mirrored version of it, with a reference voltage, the calibration circuitry produces control signals that adjust the effective resistance from the gate of transistor 2035 to ground. As a consequence, the output current, $I_{out}$, varies. The feedback action during the calibration process therefore adjusts the output current, $I_{out}$, to a desired level.

The current flowing through transistor 2055 flows through resistor 2060. Consequently, the voltage across resistor 2060 is proportional to the output current, $I_{out}$. Comparator 1815A compares the voltage across resistor 2060 (i.e., voltage signal 1825) to the output of band-gap reference 1805, $V_{ref}$. Comparator 1815A provides the result of the comparison to logic circuitry 1815B. As described below in more detail, logic circuitry 1815B uses the output signal of comparator 1815A to derive control signal 1520 (a four-bit digital word).

Control signal 1520 adjusts the resistance of adjustable resistance 1810C. Adjustable resistance 1810C includes the parallel coupling of four circuit legs. The circuit legs include resistors 2065A–2065D and transistors 2070A–2070D. Each circuit leg includes the series coupling of one of resistors 2065A–2065D and a respective one of transistors 2070A–2070D. Thus, in the first circuit leg, resistor 2065A couples in series with transistor 2070A, and so on.

Each of the bits in control signal 1520 drives a respective one of transistors 2070A–2070D. Transistors 2070A–2070D act as switches. When a bit in control signal 1520 has a logic high value, one of transistors 2070A–2070D that corresponds to that bit turns on, and couples a respective one of resistors 2065A–2065D between the gate terminal of transistor 2035 and ground. For example, if transistor 2070A turns on, it couples resistor 2065A between the gate terminal of transistor 2035 and ground (in words, it couples resistor 2065A in parallel with resistor 2050), and so on.

The resistance of adjustable resistor 1810C in parallel with resistor 2050 constitutes the effective resistance from the gate terminal of transistor 2035 to ground (i.e., R in $V_T/R$). By controlling the logic values of the bits within control signal 1520, one may switch a respective one of resistors 2065A–2065D into the circuit and couple it in parallel with resistor 2050. Put another way, one may adjust the effective resistance between the gate terminal of transistor 2035 and ground (i.e., R in $V_T/R$) and, hence, the output current, $I_{out}$, by controlling the logic values of the bits within control signal 1520.

During the calibration process, one may derive the logic values for the bits in control signal 1520. Those logic values represent a calibration code or word that controls transistors 2070A–2070D in adjustable resistor 1810C. Logic circuitry 1815B then freezes or holds those values during the operation of the circuit. In other words, during calibration, one uses control signal 1520 to set a value for the effective resistance between the gate terminal of transistor 2035 and ground. The circuit subsequently uses that value to control the output current, $I_{out}$.

Logic circuitry 1815B includes a finite-state machine that generates control signal 1520 from the output signal of comparator 1815A. Logic circuitry 1815B uses a binary search or successive approximation algorithm to generate control signal 1520 to control adjustable resistor 1810C.

Figure 21:
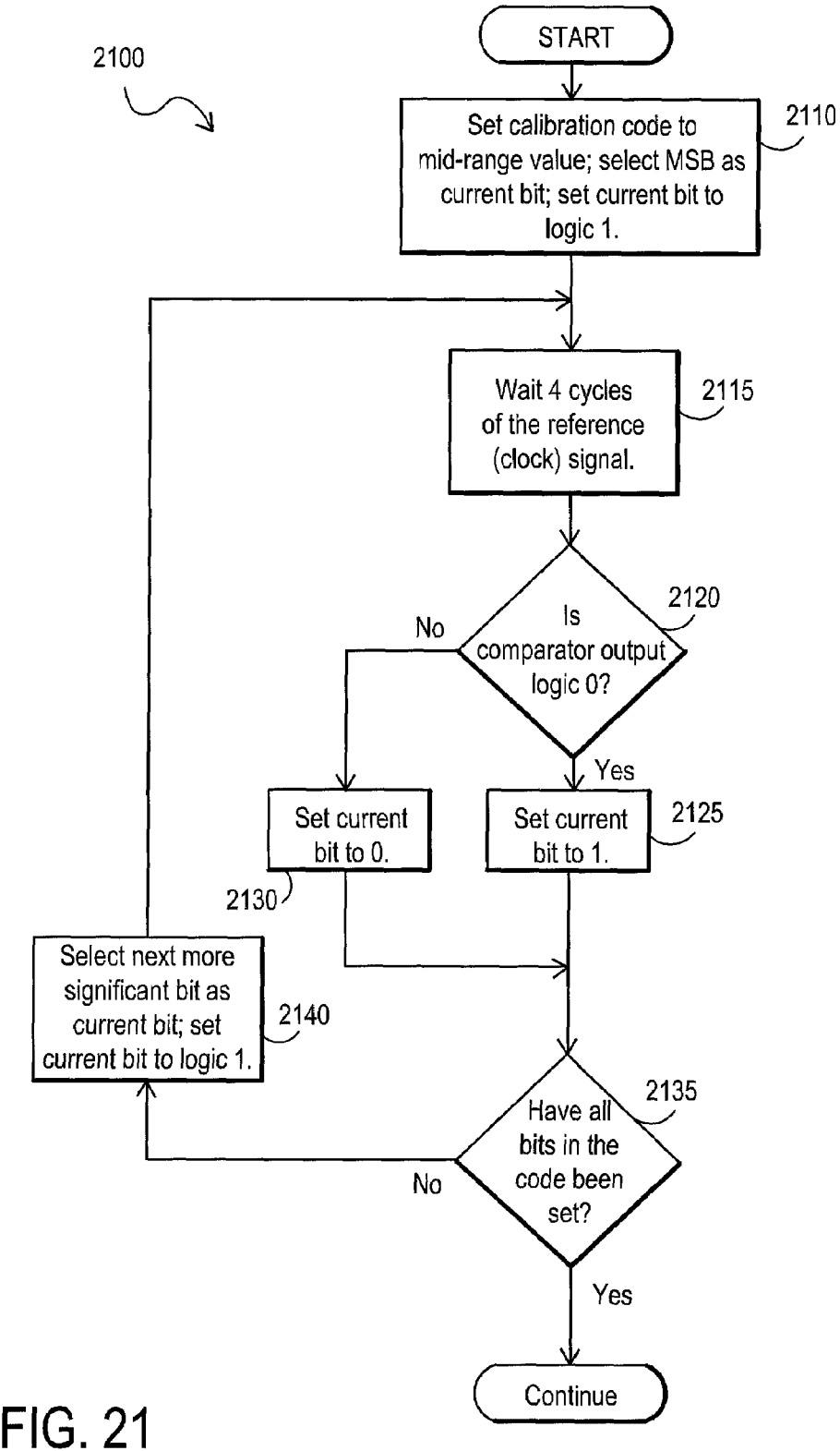
FIG. 21 depicts a flow diagram for the digital calibration operations according to the invention.

FIG. 21 illustrates a flow diagram 2100 for the digital calibration operations that logic circuitry 1815B performs. The operations of logic circuitry 1815B begin at step 2110. In that step, logic circuitry 1815B sets the calibration code or word (i.e., the bits that make up control signal 1520) to a mid-range value. The mid-range value depends on the number of bits used. For example, a 4-bit code may represent binary values in the range 0000–1111, with a binary mid-range value of 1000. Logic circuitry 1815B also selects the most-significant bit (MSB) as the current bit, and sets that bit to a logic 1 value. Control then passes to step 2115.

In step 2115, logic circuitry 1815B waits for four cycles of a reference or clock signal, such as reference signal 220 described above (see, for example, FIGS. 2A–2D and their accompanying discussion). In one embodiment, the reference or clock signal has a frequency of 13 MHz, although one may use other values, as desired. Waiting for four cycles of the reference or clock enables the calibration code or word to settle through the circuitry within low-noise current reference 2000 (e.g., comparator 1815A).

Once the circuitry has settled, low-noise current reference 2000 generates an output current, $I_{out}$, based on the calibration code or word. The number of wait cycles depends on the settling speed of the circuitry. Note that one may include a wait for fewer or more cycles than four cycles, as desired, depending on the design and performance specifications and characteristics for a particular application.

Following the completion of the wait cycle, control passes to step 2120. In that step, logic circuitry 1815B determines whether the output of the comparator 1815A has a logic 0 value or a logic 1 value. If the output of comparator 1815A has a logic 0 value, logic circuitry 1815B sets the current bit to a logic 1 value. On the other hand, if the output of comparator 1815A has a logic 1 value, logic circuitry 1815B sets the current bit to a logic 0 value. In either case, control subsequently passes to step 2135.

In step 2135, logic circuitry 1815B determines whether all bits in the calibration code or word (i.e., all bits that make up control signal 1520) have been set to an appropriate logic value. If so, the calibration process completes. If not, control passes to step 2140. In step 2140, logic circuitry 1815B selects the next more significant bit (i.e., the bit corresponding to the next highest power of 2) as the current bit, and sets that bit to a logic 1 value. Control subsequently passes to step 2115.

One embodiment of the invention includes measures within logic circuitry 1815B to properly handle situations where the ideal value of the calibrated code or word lies at the common edge of two decision boundaries in the binary search or successive approximation. Those measures within the logic circuitry 1815B help prevent chatter in the control signal 1520, i.e., the logic values of the bits in control signal 1520 changing in succession. Put another way, repeated calibrations may result in two different calibration codes even though no significant change in the circuit's parameters or attributes has occurred. The chatter may result from noise within the circuit, for example, noise or jitter at the output of comparator 1815A.

Chatter may adversely affect the performance of low-noise current reference 2000 and the system or circuit to which its supplies its output current, $I_{out}$. For example, variations in the output current, $I_{out}$, may result in changes in the transfer functions of analog circuitry that use the output current, $I_{out}$, as a biasing current. To help prevent the chatter, logic circuitry 1815B includes a memory that stores the calibration results (i.e., codes or words) of previous calibrations. If the result of a previous calibration differs from a current calibration result only in its least-significant bit (LSB), logic circuitry 1815A retains the result of the previous calibration.

On the other hand, if the results of the previous and current calibration differ by more than their LSBs, logic circuitry 1815A uses the result of the current calibration.

Figure 22:
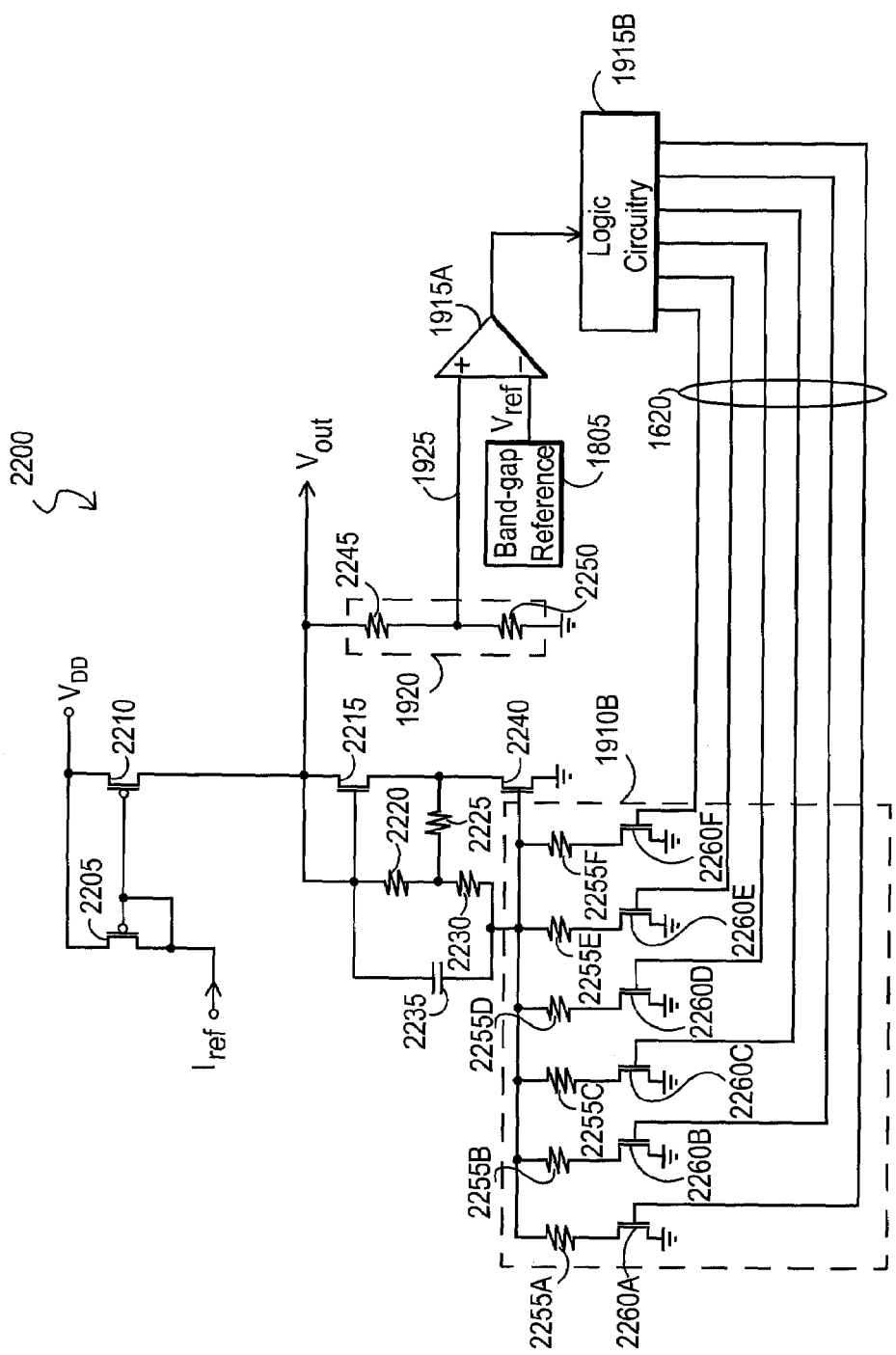
FIG. 22 illustrates another exemplary embodiment according to the invention of a low-noise voltage reference.

FIG. 22 shows another exemplary embodiment according to the invention of a low-noise voltage reference 2200. Low-noise voltage reference 2200 generally has the same topology as does low-noise voltage reference 1900 (see FIG. 19) and operates in a similar manner. FIG. 22 provides more details of the circuitry shown in FIG. 19.

Low-noise voltage reference 2200 uses a reference current, $I_{ref}$, that flows into the drain terminal of diode-connected transistor 2205. The reference current, $I_{ref}$, may constitute the output current, $I_{out}$, of low-noise current reference 2000 (see FIG. 20) or a version of it, such as a mirrored version, as desired. In such a scenario, one may first calibrate the low-noise current reference 2000 so that it produces a calibrated low-noise output current, $I_{out}$. One may then use the calibrated low-noise current, $I_{out}$, as the reference current, $I_{ref}$, in low-noise voltage reference 2200.

Transistor 2210 mirrors the reference current, $I_{ref}$. The mirrored current flows into transistors 2215 and 2240, into a resistor network that includes resistors 2220, 2225, and 2230, and into resistors 2245 and 2250. Transistor 2240 and the effective resistance between the gate terminal of transistor 2240 and ground form a $V_T/R$ source, as described above in detail. Transistor 2240 has a relatively large width-to-length ratio (W/L).

A voltage approximately equal to the threshold voltage of transistor 2240 appears at its gate terminal. Low-noise voltage source 2200 provides a desired output voltage, $V_{out}$, of about 2.25 volts. To boost the threshold voltage of transistor 2240 (typically less than 1 volt) to the desired level of output voltage, $V_{out}$, low-noise voltage source 2200 uses the resistor network that includes resistors 2220, 2225, and 2230 together with transistor 2215, as follows.

A current flows through transistor 2210, resistors 2220, 2230, and 2225, and adjustable resistor 1910B. The current flow gives rise to a voltage at the junction of resistors 2220 and 2230. Resistor 2225 reflects that voltage to the drain terminal of transistor 2240. Resistor 2225 has a relatively small value compared to resistor 2230 (consequently, resistor 2225 tends to equalize the voltages between its two terminals). The voltage at the drain terminal of transistor 2240, added to the voltage across diode-connected transistor 2215, equals the output voltage, $V_{out}$, of low-noise voltage source 2200.

Note that, rather than providing an output voltage, $V_{out}$, of 2.25 volts, one may modify the low-noise voltage reference 2200 to generate other values of the output voltage, $V_{out}$, as desired. One may do so, for example, by modifying the resistance of adjustable resistor 1910B and/or the threshold voltages of transistors 2215 and 2240. Furthermore, one may use a variety of alternative circuit arrangements, as persons of ordinary skill in the art who have the benefit of the description of the invention understand.

Capacitor 2235 provides two functions. First, it tends to improve the stability of the low-noise voltage source 2200. At high enough frequencies, capacitor 2235 appears as a low impedance path that substantially shorts the gate terminal of transistor 2215 to the gate terminal of transistor 2240, and thus provides a single dominant pole.

Second, capacitor 2235 provides current-drive capability at the output of low-noise voltage source 2200 during transient conditions, for example, when a load places relatively heavy current demands on the output. Because the voltage across capacitor 2235 does not change instantaneously, a decrease in the output voltage, $V_{out}$, because of heavy load demands causes a corresponding decrease in the gate voltage of transistor 2240. The decreased gate voltage turns off transistor 2240, which prevents current flow from transistor 2210 to ground through transistor 2240, thus helping to supply the majority of the current from transistor 2210 to the output terminal ($V_{out}$).

Various circuit parameters (such as the threshold voltage of transistor 2240) depend on physical and environmental changes (such as temperature changes). The output voltage, $V_{out}$, may therefore fluctuate as a result of physical and environmental changes. As noted above, one may use circuit calibration to reduce the variations of the output voltage, $V_{out}$.

From a conceptual point of view, the low-noise voltage reference 2200 uses a feedback circuit to perform calibration. By comparing a voltage derived from the output voltage, $V_{out}$, with a reference voltage, the calibration circuitry produces control signals that adjust the effective resistance from the gate of transistor 2240 to ground. As a consequence, the output voltage, $V_{out}$, varies. The feedback action during the calibration process therefore adjusts the output voltage, $V_{out}$, to a desired level.

Resistors 2245 and 2250 scale the nominal output voltage, $V_{out}$, to a voltage level substantially equal to the output voltage of band-gap reference 1805. In other words, resistors 2245 and 2250 serve as voltage scaler 1920 and generate voltage signal 1925. Comparator 1915A compares the voltage across resistor 2250 (i.e., voltage signal 1925) to the output of band-gap reference 1805, $V_{ref}$. Comparator 1915A provides the result of the comparison to logic circuitry 1915B. Logic circuitry 1915B uses the output signal of comparator 1915A to derive control signal 1620 (a six-bit digital code or word), as described above in detail in connection with FIG. 20 and logic circuitry 1815B.

Control signal 1620 adjust the resistance of adjustable resistance 1910B. Adjustable resistance 1910B includes the parallel coupling of six circuit legs. The circuit legs include resistors 2255A–2255F and transistors 2260A–2260F. Adjustable resistor 1910B operates in a manner similar to adjustable resistor 1810C, described above. The resistance of adjustable resistor 1910B affects the effective resistance from the gate terminal of transistor 2240 to ground (i.e., R in $V_T/R$). By controlling the logic values of the bits within control signal 1620, one may adjust the effective resistance between the gate terminal of transistor 2240 and ground (i.e., R in $V_T/R$) and, hence, the output voltage, $V_{out}$.

During the calibration process, one may derive the logic values for the bits within control signal 1620. The logic values represent a calibration code or word that controls the resistance of adjustable resistor 1910B. Logic circuitry 1915B then freezes or holds those values during the operation of the circuit. In other words, during calibration, one uses control signal 1620 to set a value for the effective resistance between the gate terminal of transistor 2240 and ground. The circuit subsequently uses that value to control the output voltage, $V_{out}$.

Logic circuitry 1915B has a similar circuitry and operates in a similar manner as does logic circuitry 1815B, described above. Note that, rather than generating a four-bit control code or word as does logic circuitry 1815B, logic circuitry 1915 provides a six-bit control word. The additional bits at the output of logic circuitry 1915B tend to improve the resolution and performance of low-noise voltage source 2200 and to provide a more stable, low-noise output voltage, $V_{out}$.

As persons skilled in the art who have the benefit of the description of the invention understand, one may modify logic circuitry 1815B to arrive at logic circuitry 1915B. Likewise, one may readily modify adjustable resistor 1810C (see FIG. 20) to provide adjustable resistor 1910B (see FIG. 22). Logic circuitry 1915B performs similar operations to those depicted in FIG. 22, except that logic circuitry 1915B operates on six bits of data, rather than four bits. Note that, rather than providing a six-bit output word, one may readily modify logic circuitry 1915B (and adjustable resistor 1910B) to generate other numbers of output bits, as persons of ordinary skill in the art understand. The choice of the number of bits depends on design and performance specifications in a given application.

One may use low-noise current and voltage references according to the invention in a variety of applications. For instance, one may bias analog circuitry, as mentioned above. Furthermore, one may supply voltage references to various blocks of analog circuitry, such as voltage comparators, analog-to-digital converters, and the like. For example, one may the reference signals in voltage regulators for various circuitry, such as VCO circuitries and output buffer circuitries (e.g., VCO circuitry 481 and output buffer circuitries 892A–892B in FIG. 8), in order to supply accurate power and low phase noise. Generally, one may use the low-noise references in any application that calls for low-drift, low-noise current and/or voltage sources, as persons of ordinary skill in the art who have the benefit of the description of the invention understand.

As examples of other applications, one may use the inventive low-noise references in a variety of applications, including RF apparatus, such as transmitters, receivers, and transceivers. Furthermore, the inventive concepts described here lend themselves to application in a variety of RF apparatus such as those described above in connection with the interfacing and partitioning concepts. One may apply the inventive concepts in RF receivers, transceivers, and/or RF transceivers, which may incorporate direct-conversion, low-IF, high-IF, or other topologies, as desired. The RF transceivers may employ a variety of architectures and circuit arrangements, such as concerns the transmitter circuitry, the local oscillator circuitry, etc., as noted above. The appropriate modifications for applying the inventive concepts to various RF apparatus are within the knowledge of persons of ordinary skill in the art who have the benefit of the description of the invention.

One particular application of the low-noise current and voltage references relates to RF apparatus for use in time division multiple access (TDMA) systems, such as GSM. GSM systems operate in burst mode. During a burst, a GSM-compliant transceiver circuitry either transmits or receives RF signals. A GSM burst has a 577-microsecond duration. In order to provide a low-drift, low-noise output current, $I_{out}$, and/or low-drift, low-noise output voltage, $V_{out}$, one may calibrate the low-noise current reference and/or low-noise voltage reference according to the invention to a low-drift source (the band-gap reference) before a burst commences. Any drift resulting from physical and environmental changes occurs relatively slowly compared to the duration of a burst. Hence, within each burst the low-noise output current, $I_{out}$, and/or low-drift, low-noise output voltage, $V_{out}$, have relatively little drift and one may consider them essentially drift-free.

In one embodiment of the invention for use in an RF transceiver circuitry for GSM applications, one calibrates the current reference in both receive and transmit modes. On the other hand, the RF transceiver circuitry uses the voltage reference during the receive mode (for example, to set full-scale values for analog-to-digital converters), so one calibrates the voltage reference during the receive mode. Furthermore, to conserve power in portable applications, such as mobile telephony, one may power down and power up the band-gap reference for each burst, as desired.

Figure 23:
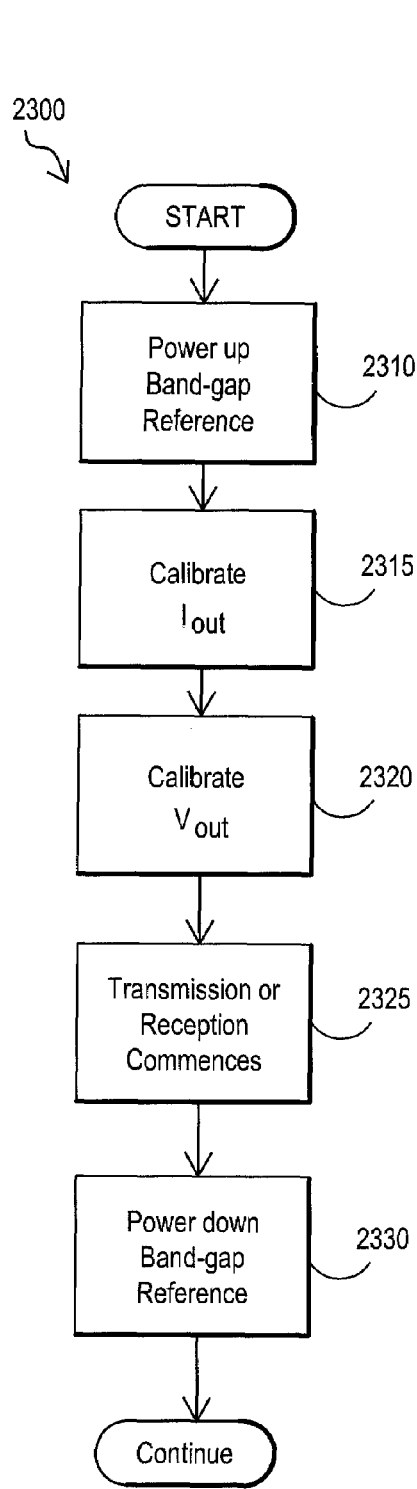
FIG. 23 shows a flow diagram for operating current and/or voltage references in exemplary embodiments according to the invention.

FIG. 23 shows a flow diagram 2300 for operating current and voltage references for use in exemplary embodiments according to the invention, such as burst-mode RF apparatus, as used in GSM systems. Operation of the current and voltage references begins by powering up the band-gap reference in step 2310. Next, in step 2315, the current reference calibrates the output current, $I_{out}$, as described above. Similarly, if the RF apparatus will receive data in the upcoming burst, in the next step, step 2320, the voltage reference calibrates the output voltage, $V_{out}$, as described above in detail. Subsequently, transmission or reception commences in step 2325. At the conclusion of transmission or reception, the band-gap reference powers down in step 2330 to conserve power. One may thereafter repeat steps 2310–2330, as desired.

Figure 24:
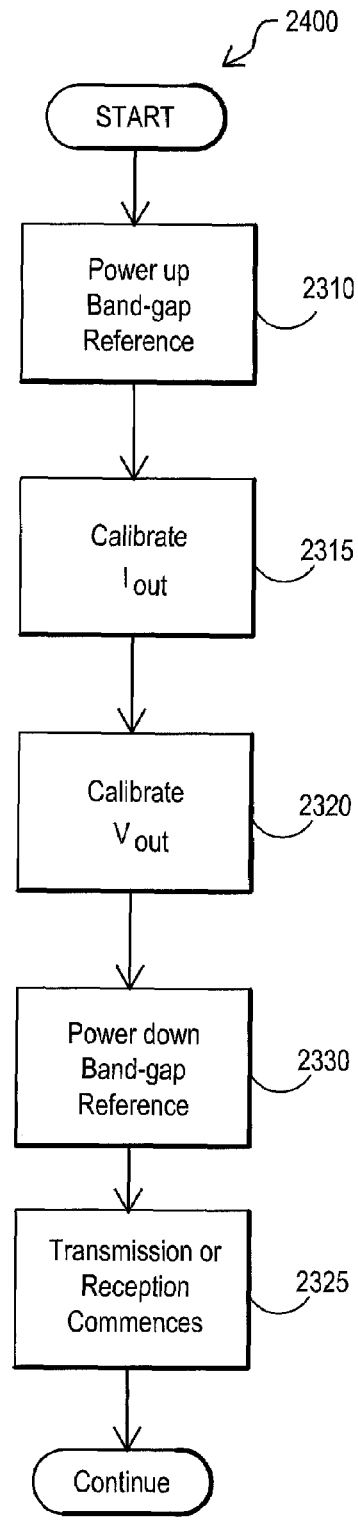
FIG. 24 depicts another flow diagram for operating current and/or voltage references in exemplary embodiments according to the invention.

Note that one may make various modifications to the process shown in FIG. 23, as desired. For example, in one embodiment, one may power down the band-gap reference before transmission or reception begins. Thus, once calibration has completed according to steps 2315 and 2320, one may power down or turn off the band-gap reference before reception or transmission commences. Put another way, one may reverse the order of steps 2325 and 2330, as desired. FIG. 24 shows a flow diagram 2400 for such an exemplary embodiment.

Furthermore, with respect to FIGS. 23 and 24, one may select a subset of steps 2310–2330, as desired. For example, in one embodiment, one may choose to not power down the band-gap reference by skipping step 2330, as desired. Other embodiments may use either a current reference or a voltage reference alone. In those embodiments, one would perform step 2315 and not implement or use step 2320, or vice-versa, respectively.

Note that one may use the inventive concepts to provide current and/or voltage references that provide more than one current and/or voltage reference. In other words, one may provide reference circuitry that provides one or more low-noise reference current as well as one or more low-noise reference voltage. Furthermore, one may calibrate any of the reference currents and/or voltages, as desired.

Rather than or in addition to using the embodiments provided here, one may use many other embodiments of the various circuit blocks and arrangement of circuitry. As persons of ordinary skill in the art who have read the description of the invention will understand, one may use a variety of implementations of the invention, depending on factors such as design and performance specifications. For example, one may design the logic circuitry within the controllers and the adjustable resistors to provide a desired number of control bits (calibration codes). Furthermore, one may implement the logic circuitry in a variety of ways, such as, micro-controllers, microprocessors, general sequential logic, and the like, to produce control signals with various numbers of bits, as desired.

Referring to the figures, the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and specifications for a given implementation, as persons of ordinary skill in the art who have read the disclosure of the invention will understand.

Further modifications and alternative embodiments of the invention will be apparent to persons skilled in the art in view of this description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. A radio-frequency (RF) apparatus, comprising:
a first integrated circuit, including:
a reference current generator configured to generate a reference output current, the reference current generator comprising:
a reference voltage source configured to provide a reference voltage;
a controllable current source configured to provide the reference output current in response to a first plurality of signals; and
a first controller configured to provide the first plurality of signals, the first plurality of signals being derived from the reference voltage and the reference output current,
wherein a noise content of the reference output current is lower than a noise content of the reference voltage.

2. The radio-frequency apparatus according to claim 1, wherein the reference voltage source comprises a low-drift reference voltage source.

3. The radio-frequency apparatus according to claim 2, wherein the reference output current is calibrated by calibrating the first plurality of signals.

4. The radio-frequency apparatus according to claim 3, wherein the signals in the first plurality of signals are configured to be held constant after calibrating the first plurality of signals.

5. The radio-frequency apparatus according to claim 4, wherein the controllable current source comprises a first adjustable resistor.

6. The radio-frequency apparatus according to claim 5, wherein the first adjustable resistor comprises a first plurality of switchable resistors configured to adjust a resistance of the first adjustable resistor in response to the first plurality of signals.

7. The radio-frequency apparatus according to claim 6, wherein the first controller uses successive approximation to generate the first plurality of signals.

8. The radio-frequency apparatus according to claim 7, wherein the reference voltage source comprises a band-gap reference.

9. The radio-frequency apparatus according to claim 8, wherein the first integrated circuit further comprises radio-frequency receiver circuitry.

10. The radio-frequency apparatus according to claim 9, further comprising a second integrated circuit coupled to the first integrated circuit, the second integrated circuit comprising digital signal processing circuitry, the digital signal processing circuitry further configured to accept a digital output of the radio-frequency receiver circuitry.

11. The radio-frequency apparatus according to claim 10, wherein the reference current generator supplies the reference output current to the radio-frequency receiver circuitry.

12. The radio-frequency apparatus according to claim 11, wherein the radio-frequency receiver circuitry and the reference current generator are powered up before a reception of a burst by the radio-frequency receiver circuitry.

13. The radio-frequency apparatus according to claim 12, wherein the reference output current is calibrated at power up.

14. The radio-frequency apparatus according to claim 2, wherein the first integrated circuit further comprises:
a reference voltage generator configured to generate a reference output voltage, the reference voltage generator comprising:

a controllable voltage source configured to provide the reference output voltage in response to a second plurality of signals; and a second controller configured to provide the second plurality of signals, the second plurality of signals being derived from the reference voltage and the reference output voltage, wherein a noise content of the reference output voltage is lower than a noise content of the reference voltage.

15. The radio-frequency apparatus according to claim 14, wherein the reference output voltage is calibrated by calibrating the second plurality of signals.

16. The radio-frequency apparatus according to claim 15, wherein the signals in the second plurality of signals are configured to be held constant after calibrating the second plurality of signals.

17. The radio-frequency apparatus according to claim 16, wherein the controllable voltage source comprises a second adjustable resistor.

18. The radio-frequency apparatus according to claim 17, wherein the second adjustable resistor comprises a second plurality of switchable resistors configured to adjust a resistance of the second adjustable resistor in response to the second plurality of signals.

19. The radio-frequency apparatus according to claim 18, wherein the second controller uses successive approximation to generate the second plurality of signals.

20. The radio-frequency apparatus according to claim 19, wherein the controllable voltage source is further configured to provide the reference output voltage in response to a signal derived from the reference output current.

21. The radio-frequency apparatus according to claim 20, wherein the first integrated circuit further comprises radio-frequency receiver circuitry.

22. The radio-frequency apparatus according to claim 21, further comprising a second integrated circuit coupled to the first integrated circuit, the second integrated circuit comprising digital signal processing circuitry configured to accept a digital output of the radio-frequency receiver circuitry.

23. The radio-frequency apparatus according to claim 22, wherein the reference voltage generator supplies the reference output voltage to the radio-frequency receiver circuitry.

24. The radio-frequency apparatus according to claim 23, wherein the radio-frequency receiver circuitry and the reference voltage generator are powered up before a reception of a burst by the radio-frequency receiver circuitry.

25. The radio-frequency apparatus according to claim 24, wherein the reference output voltage is calibrated at power up.

* * * * *